US009557462B2

(12) United States Patent
Minemura et al.

(10) Patent No.: US 9,557,462 B2
(45) Date of Patent: Jan. 31, 2017

(54) OPTICAL ELEMENT AND OPTICAL APPARATUS

(71) Applicant: Hitachi Maxell, Ltd., Osaka (JP)

(72) Inventors: Hiroyuki Minemura, Tokyo (JP); Yumiko Anzai, Tokyo (JP)

(73) Assignee: HITACHI MAXELL, LTD., Osaka (JP)

( * ) Notice: Subject to any disclaimer, the term of this patent is extended or adjusted under 35 U.S.C. 154(b) by 136 days.

(21) Appl. No.: 14/190,132

(22) Filed: Feb. 26, 2014

(65) Prior Publication Data

US 2014/0293195 A1    Oct. 2, 2014

(30) Foreign Application Priority Data

Mar. 28, 2013    (JP) .................. 2013-070266

(51) Int. Cl.
   *G02F 1/1335* (2006.01)
   *G02B 5/30* (2006.01)

(52) U.S. Cl.
   CPC ....... *G02B 5/3058* (2013.01); *G02F 1/133528* (2013.01); *G02F 2001/133548* (2013.01)

(58) Field of Classification Search
   CPC ............. G02B 5/3058; G02F 1/133528; G02F 2001/133548
   USPC ................... 359/485.05, 487.03; 349/96, 104
   See application file for complete search history.

(56) References Cited

U.S. PATENT DOCUMENTS

| | | | |
|---|---|---|---|
| 6,243,199 B1 | 6/2001 | Hansen et al. | |
| 6,251,297 B1 | 6/2001 | Komuro et al. | |
| 7,227,689 B2 * | 6/2007 | Yokoyama | G02B 5/3083 359/489.06 |
| 8,350,992 B2 | 1/2013 | Sawaki | |
| 2006/0061862 A1 * | 3/2006 | Mi | G02B 5/3058 359/485.05 |
| 2008/0316599 A1 | 12/2008 | Wang et al. | |
| 2011/0205457 A1 * | 8/2011 | Sawaki | G02B 5/008 349/5 |
| 2013/0242391 A1 | 9/2013 | Minemura et al. | |

FOREIGN PATENT DOCUMENTS

| | | |
|---|---|---|
| JP | H11-183727 A | 7/1999 |
| JP | 2003-508813 A | 4/2003 |

(Continued)

OTHER PUBLICATIONS

Notification of Reasons for Refusal, mailed Apr. 26, 2016, which issued during the prosecution of Japanese Patent Application No. 2013-070266, which corresponds to the present application (English translation attached).

*Primary Examiner* — Edward Glick
*Assistant Examiner* — David Chung
(74) *Attorney, Agent, or Firm* — Baker Botts L.L.P.

(57) ABSTRACT

A technology that allows improvement in the performance of an optical element a representative example of which is a polarizing element is provided. In a split wire element according to an embodiment of the invention, each of a plurality of split wires (SPW) has gaps formed in a y direction at a period $\Lambda$, and the period $\Lambda$ is greater than or equal to a Rayleigh wavelength ($\lambda/n$). According to the thus configured split wire element of the embodiment of the invention, optical performance can be improved as compared with a wire-grid element formed of straight wires having no periodic structure in the y direction.

13 Claims, 42 Drawing Sheets

SPW : SPLIT WIRE
$\Lambda$ : PERIOD

(56) References Cited

FOREIGN PATENT DOCUMENTS

| | | |
|---|---|---|
| JP | 2007-148344 A | 6/2007 |
| JP | 2009-104074 A | 5/2009 |
| JP | 2010-060795 A | 3/2010 |
| JP | 2010-530995 A | 9/2010 |
| JP | 2011-123474 A | 6/2011 |

* cited by examiner p-POLARIZED LIGHT s-POLARIZED LIGHT

SPW : SPLIT WIRE
Λ : PERIOD

WAVELENGTH λ =460nm,
WIRE PITCH p1=150nm, WIRE WIDTH w=50nm

WAVELENGTH λ = 460nm, WIRE PITCH p1 = 150nm, WIRE WIDTH w = 50nm
WIRE HEIGHT h = 150nm, PERIOD Λ = 400nm $$1\% \leqq \frac{s}{\Lambda} \leqq 10\%$$

WAVELENGTH λ = 460nm, WIRE PITCH p1 = 150nm, WIRE WIDTH w = 50nm
WIRE HEIGHT h = 150nm, PERIOD Λ = 400nm

OPTICAL ELEMENT AND OPTICAL APPARATUS

CROSS-REFERENCE TO RELATED APPLICATION

This application claims the priority of Japanese Patent Application No. 2013-070266, filed Mar. 28, 2013, which is incorporated herein by reference in its entirety.

BACKGROUND OF THE INVENTION

1. Technical Field

The present invention relates to an optical element and an optical apparatus.

2. Related Art

H. Tamada, et al., "Al wire-grid polarizer using the s-polarizationresonance", Opt. Lett. 22, 6, pp. 419-421 (1997) and JP-T-2003-508813 describe technologies of a polarizing element (polarizing filter) formed of a wire-gird element having a metal wire structure on a light-transmissive substrate.

JP-T-2010-530995 describes a technology of a wire-grid element that has a wire structure formed of a metal portion, a transparent dielectric portion, a light absorbing portion, and another transparent dielectric portion on a light-transmissive substrate and selectively suppresses reflection of polarized light.

JP-A-2011-123474 describes a technology of a polarizing element having an additional function of selectively absorbing unnecessary polarized light. The additional function is achieved by forming a wire-grid element having a metal wire structure on a light-transmissive substrate and shaping the upper end of the metal wire structure to have periodic protrusions.

JP-A-2009-104074 describes a technology of an optical element that has metal portions disposed in a glass layer in what is called a checker flag pattern so that one type of polarized light is converted into another type of polarized light.

Optical apparatus are widely used for ordinary use. For example, a liquid crystal projector, a display, an optical pickup, and an optical sensor use many optical elements that control light. As these apparatus advance in terms of functionality, an optical element is also required to have more advanced functionality, higher added values, and lower cost.

A representative example of such an optical apparatus is a liquid crystal projector. A liquid crystal projector includes a first polarizing element that receives a light flux emitted from a light source and selectively transmits specific polarized light out of the received light flux, a liquid crystal panel that receives the polarized light from the first polarizing element and changes the polarization direction of the incident polarized light in accordance with image information, and a second polarizing element that receives the polarized light having the polarization direction changed by the liquid crystal panel. In the liquid crystal projector, the polarized light having emitted out of the second polarizing element described above is incident on a projection lens, which forms an optical image (image light) and projects the image light on a screen or any other surface for image display. In the thus configured liquid crystal projector, the first polarizing element and the second polarizing element are so disposed that they sandwich the liquid crystal panel. That is, a polarizing element (polarizing filter) having a function of selectively transmitting specific polarized light is disposed both on the light incident side and the light exiting side of the liquid crystal panel.

In recent years, the optical density on the liquid crystal panel is increased to achieve a reduced size of a liquid crystal projector and increased brightness of a projected image, and a polarizing element is desired to have excellent heat and light resistance in correspondence with the increased optical density. In this regard, for example, it can be said that a wire-grid element made of an inorganic material is suitable for such a polarizing element.

H. Tamada, et al., "Al wire-grid polarizer using the s-polarization resonance", Opt. Lett. 22, 6, pp. 419-421 (1997) describes a definition of a wire-grid element as follows: "A wire grid is a simple one-dimensional metal grating and is quite promising as a microminiaturized polarization component in the field of integrated optics." That is, a wire-grid element is a simple one-dimensional metal grating.

For example, from a viewpoint of improving image quality provided by an optical apparatus (image projection apparatus) a representative example of which is a liquid crystal projector, it is desired to improve performance of selecting specific polarization (hereinafter referred to as p-polarization) and polarization perpendicular thereto (hereinafter referred to as s-polarization), that is, a transmittance ratio, which is one of primary performance indices of a polarizing element. In the present specification, a polarization contrast ratio (Tp/Ts), where Tp represents p-polarization transmittance and Ts represents s-polarization transmittance, (also called extinction ratio) is used as a performance index of the polarization selectivity. In this case, the higher the polarization contrast ratio, the more excellent polarization selectivity a polarizing element has.

As described above, a wire-grid element has linear metal wires arranged in equal periodicity on a light-transmissive substrate. In the thus configured wire-grid element, the performance thereof depends on the period and shape of the metal wires, and constraints are imposed thereon. For example, it is known that the period between the metal wires has an upper limit determined by a Rayleigh resonance phenomenon. As a specific example, when the wavelength to be used is 450 nm, the period between the metal wires needs to be smaller than or equal to about 210 nm, as described in the paragraph in JP-T-2003-508813. Further, in a wire-grid element, Tp and the polarization contrast ratio, which are performance indices, are related to the width and height of the metal wires in a tradeoff relationship. In view of the fact described above, a wire-grid element is typically so designed that the width of the metal wires is set to be about one-third the period (pitch) therebetween and the height of the metal wires is set at about 150 nm.

The constraints described above on the shape of the metal wires and the period between the arranged metal wires make it difficult to greatly change design conditions under which a wire-grid element is designed. Therefore, for example, even when it is attempted to improve the image quality of an optical apparatus a representative example of which is a liquid crystal projector by improving the polarization contrast ratio of a polarizing element, it is difficult to improve the current performance of the polarizing element or the optical apparatus unless the metal wire structure of a wire-grid element is changed.

SUMMARY OF THE INVENTION

An object of the invention is to provide a technology that allows improvement in the performance of an optical element a representative example of which is a polarizing element. Another object of the invention is to improve the performance of an optical apparatus using an optical element a representative example of which is a polarizing element by improving the performance of the optical element.

Other challenges and novel features of the invention will be clarified by the following description in the present specification and the accompanying drawings.

An optical element in an embodiment is an optical element that functions as a polarizing filter and includes (a) a substrate transparent to an electromagnetic wave incident thereon and (b) a plurality of metal wires formed on a principal surface of the substrate, arranged at first period intervals in a first direction, and extend in a second direction perpendicular to the first direction. In the optical element, among the plurality of metal wires, at least part of the metal wires has a plurality of gaps formed at second period intervals in the second direction. The second period interval between the plurality of gaps is greater than or equal to $\lambda/n$, where $\lambda$ represents the wavelength of the electromagnetic wave and n represents the refractive index of the substrate.

An optical apparatus in another embodiment includes (a) a light source, (b) a first polarizing element that receives light emitted from the light source and selectively transmits specific polarized out of the received light, and (c) a liquid crystal panel that receives the polarized light having emitted out of the first polarizing element and changes the polarization direction of the polarized light. The optical apparatus further includes (d) a second polarizing element that receives the polarized light having the polarization direction changed when the polarized light passes through the liquid crystal panel and (e) a projection lens that receives the polarized light having emitted out of the second polarizing element and projects the polarized light to form an image. Each of the first polarizing element and the second polarizing element is an optical element that functions as a polarizing filter and includes a substrate transparent to an electromagnetic wave incident thereon and a plurality of metal wires formed on a principal surface of the substrate, arranged at first period intervals in a first direction, and extend in a second direction perpendicular to the first direction. Among the plurality of metal wires, at least part of the metal wires has a plurality of gaps formed at second period intervals in the second direction. The second period interval between the plurality of gaps is greater than or equal to $\lambda/n$, where $\lambda$ represents the wavelength of the electromagnetic wave and n represents the refractive index of the substrate.

According to the embodiments, the performance of the optical element, a representative example of which is a polarizing element, can be improved. Further, the performance of the optical apparatus using the optical element, a representative example of which is a polarizing element, by improving the performance of the optical element.

DESCRIPTION OF PREFERRED EMBODIMENTS

Figure 1:
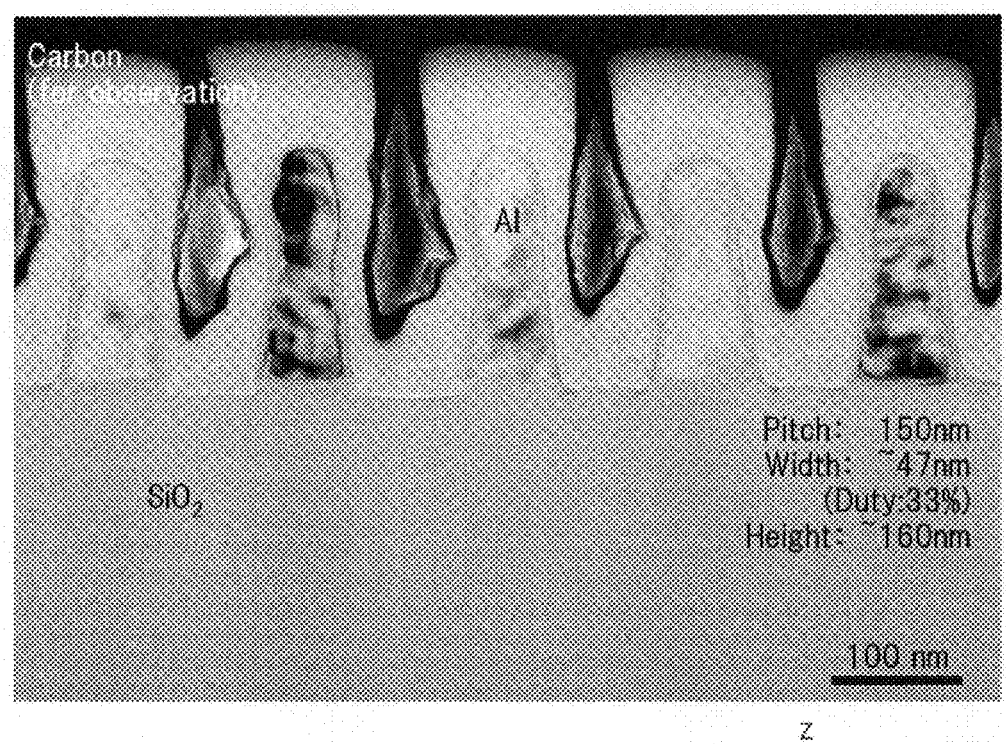
FIG. 1 is a TEM image showing a cross section of a wire-grid element.

When necessary for convenience in the following embodiment, a description will be made in a plurality of sections or embodiments, but these sections or embodiments are not independent of each other unless otherwise noted, and one of the sections or embodiments is part or the entirety of, for example, a variation, an application, a detailed description, or a supplemental description of the other.

Further, in the following embodiment, when any numeral related to an element (including the number of elements, the value of the element, the quantity thereof, the range thereof, and other factors thereof) is mentioned, a specific numeral is not intended but any numeral greater than or equal to or smaller than or equal to the specific numeral may be used, for example, unless otherwise noted or except a case where the specific numeral needs to be used in principle.

Moreover, in the following embodiment, the components thereof (including element steps) are not necessarily essential, for example, unless otherwise noted or except a case where they are obviously essential.

Similarly, in the following embodiment, when the shape, positional relationship, and other factors of a component or any other object are mentioned, the shape and the other factors include those substantially approximate or similar thereto, for example, unless otherwise noted or except a case where an approximate or similar shape and other factors of the component are obviously excluded in principle. The same holds true for the numerals (including the number of elements, the value of the element, the quantity thereof, the range thereof, and other factors thereof) described above.

In the drawings used in the embodiment, the same members have as a rule the same reference characters and no redundant description will be made. A hatched portion may be present even in a plan view in some cases for ease of illustration.

An xyz coordinate system having a z axis extending in the thickness direction of a light-transmissive substrate and a y axis extending in the longitudinal direction of metal wires (direction in which metal wires extend) is used throughout the following description of the present specification. When an electromagnetic wave is incident on an object in the direction perpendicular thereto, p-polarized light (TM (transverse magnetic) polarized light) has only an electric field component in the x direction, and s-polarized light (TE (transverse electric) polarized light) has only an electric field component in the y direction. Further, the description will be made assuming that incident light (incident electromagnetic wave) is incident on an optical element in the direction perpendicular thereto unless otherwise specified. Since the definition of polarization depends on an incident surface, p-polarized light and s-polarized light as well as TM-polarized light and TE-polarized light may be called differently in cited references in some cases, but no contradiction associated with physical effects and advantages will occur as long as the description is made in accordance with the coordinate system described above, which is based on the longitudinal direction of the metal wires (direction in which metal wires extend).

As an numerical solution of Maxwell's equation, which describes an electromagnetic wave, an FDTD (finite differential time domain) method is used.

The refractive indices of metal and semiconductor materials are those listed in Palik's Handbook, "Palik E. D. (ed.) (1991) Handbook of Optical Constants of Solids II. Academic Press, New York," unless otherwise specified. Further, the following description will be made assuming that the light-transmissive substrate is made of a standard glass material having a refractive index of 1.525 and the metal wires are made of aluminum.

First Embodiment

A technical idea in a first embodiment is widely applicable to an electromagnetic wave described by Maxwell's equation. The first embodiment, in particular, will be described with reference to light (visible light), which is one type of electromagnetic wave. Before the technical idea in the first embodiment is described, a wire-grid element will be first described, and the technical idea in the first embodiment will then be described.

<Wire-Grid Element>

FIG. 1 is a TEM image showing a cross section of a wire-grid element. FIG. 1 shows that the wire-grid element has metal wires each formed of an aluminum (Al) film formed on a quartz substrate ($SiO_2$) as a light-transmissive substrate. In FIG. 1, the metal wires have, for example, the following dimensions: The pitch thereof (in x direction) is 150 nm; the width thereof is 47 nm; and the height thereof is 160 nm. In the following sections, diagrammatic views of the wire-grid element are presented, and a description will be made to show that the wire-grid element functions as a polarizing element.

Figure 2:
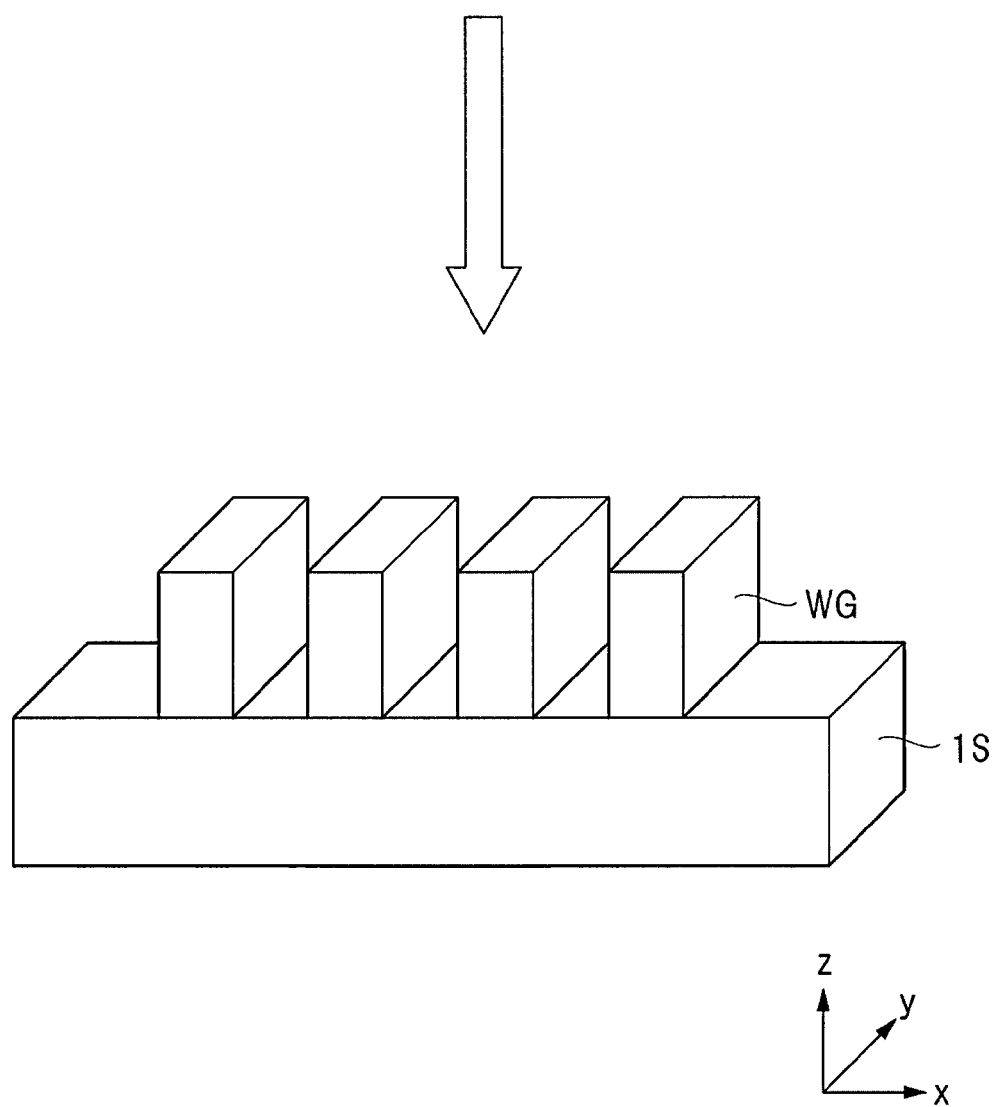
FIG. 2 is a perspective view showing a diagrammatic configuration of a wire-grid element having a metal thin wire structure.

FIG. 2 is a perspective view showing a diagrammatic configuration of the wire-grid element having a metal thin wire structure. In FIG. 2, the wire-grid element has a wire grid (labeled with WG in FIG. 2) formed on a light-transmissive substrate 1S formed of a glass substrate, a quartz substrate, or a plastic substrate, and the wire grid is formed of a protruding/recessed portion having a periodic structure. Specifically, the wire grid is a metal comb-shaped structure in which metal thin wires extending in the y direction are arranged in the x direction at predetermined intervals, as shown in FIG. 2. In other words, it can be said that the wire grid is formed of a protruding/recessed portion having a plurality of metal thin wires periodically arranged at predetermined intervals. In the present specification, each of the metal wires that form the wire-grid element is called a straight wire in some cases.

When light containing a plurality of types of polarized light is incident on thus configured wire-grid element from above the plane of view (in +z-axis direction), the wire-grid element can transmit polarized light polarized only in a specific direction through a lower portion of the substrate 1S. That is, the wire-grid element functions as a polarizing element (polarizing plate, polarizing filter). A mechanism based on which the wire-grid element functions as a polarizing element will be briefly described below with reference to the drawings.

Figure 3:
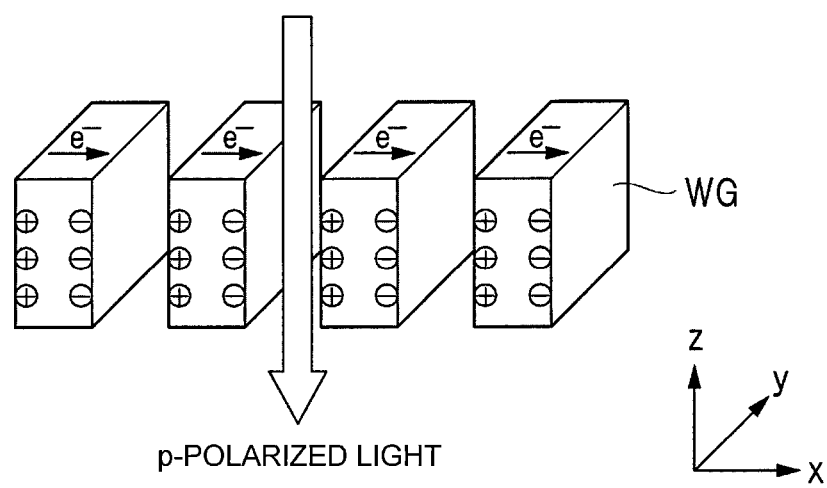
FIG. 3 describes a mechanism based on which p-polarized light passes through the wire-grid element.

First, when p-polarized light having an electric field that oscillates in the x-axis direction is incident on the wire grid, free electrons in each of the metal thin wires that form the wire grid gather on one side of the metal thin wire in accordance with the direction in which the electric field oscillates, whereby each of the metal thin wires is polarized, as shown in FIG. 3. When p-polarized light is thus incident on the wire grid, simply followed by polarization of the metal thin wires, the p-polarized light passes through the wire grid and reaches the light-transmissive substrate 1S. Since the substrate 1S is transparent to light incident thereon, the p-polarized light passes also through the substrate 1S. As a result, the p-polarized light passes through the wire grid and the substrate 1S.

Figure 4:
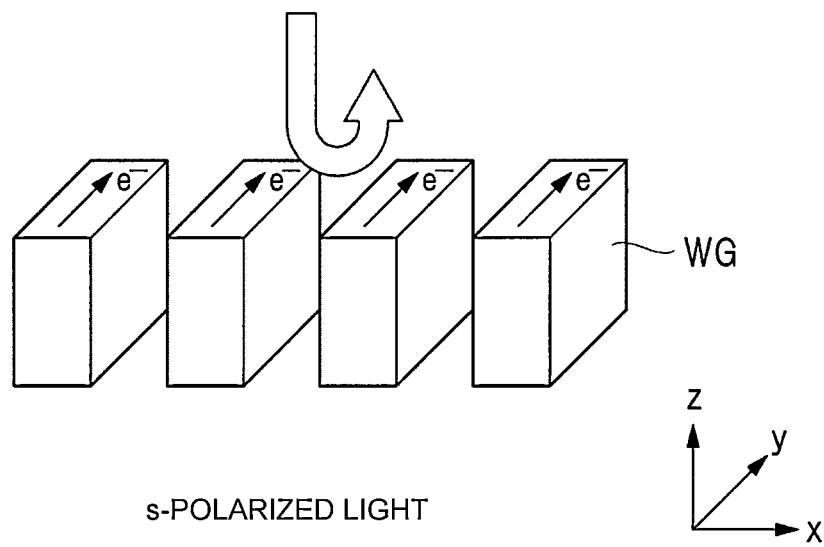
FIG. 4 describes a mechanism based on which s-polarized light is reflected off the wire-grid element.

On the other hand, when s-polarized light having an electric field that oscillates in the y direction is incident on the wire grid, the free electrons in each of the metal thin wires can oscillate with no restriction imposed by the sidewall of the metal thin wire, as shown in FIG. 4. This means that s-polarized light incident on the wire grid causes the same phenomenon that occurs when light is incident on a continuous metal film. Therefore, when s-polarized light is incident on the wire grid, the s-polarized light is reflected off the wire grid as in the case where light is incident on a continuous metal film. In this process, when the thickness of the metal thin wires in the z direction is greater than a depth through which light can penetrate into the metal (skin depth), the wire grid has a polarization separation function having high separation performance (extinction ratio) in p-polarized light transmission and s-polarized light reflection. That is, when the metal thin wires are thick in the z direction, the wire grid transmits p-polarized light by a large amount but transmits s-polarized light by a small amount or has a high polarization contrast ratio.

As described above, the wire-grid element, on which for example, light containing a variety of types of polarized light is incident, has a function of transmitting polarized light polarized only in a specific direction, which means that the wire-grid element functions as a wire-grid element.

Figure 5:
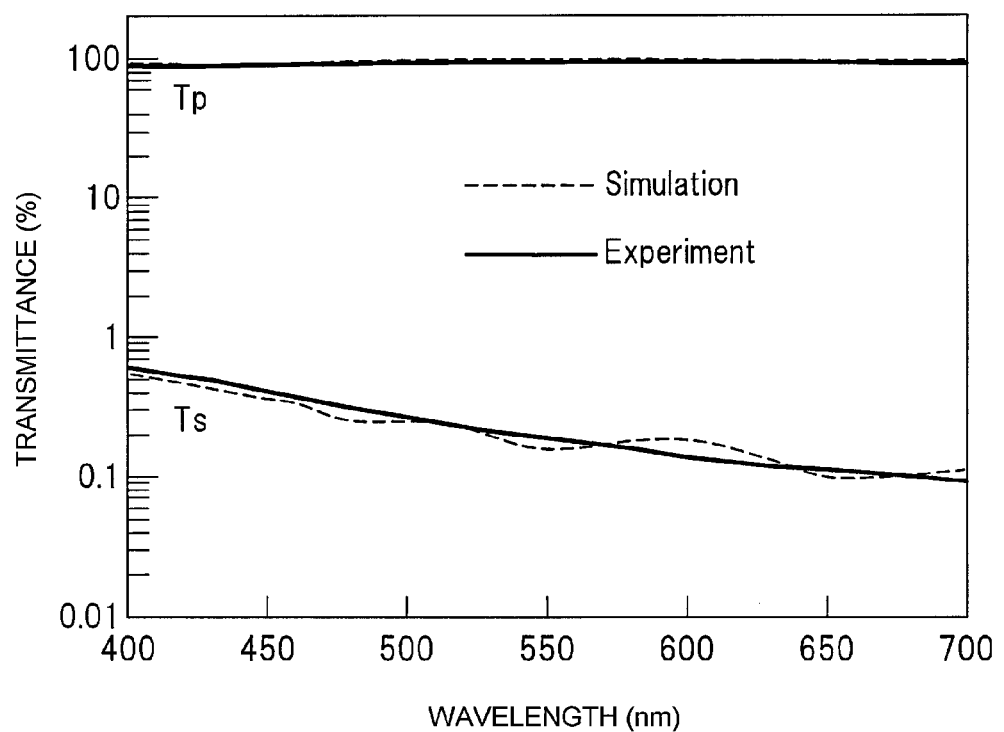
FIG. 5 shows measurement results and calculation results illustrating the dependence of the transmittance of the wire-grid element on wavelength.

Next, FIG. 5 shows measurement results and calculation results illustrating the dependence of the transmittance of the wire-grid element on wavelength. Spectral transmittance was measured with a spectrophotometer (manufactured by Hitachi, Ltd., Model U4100). Further, to measure the transmittance for p-polarized light and s-polarized light separately, two Gran-Tayler prisms manufactured by Karl Lambrecht Corporation were used, and one was used as an analyzer and the other was used as a polarizer.

In FIG. 5, the vertical axis represents the transmittance (%), and the horizontal axis represents the wavelength (nm) of the incident light. Further, Tp represents the transmittance for the p-polarized light, and Ts represents the transmittance for the s-polarized light. Under the above definitions, the solid lines show the measurement results, and the broken lines show the calculation results.

The calculation results satisfactorily agree with the measurement results as seen from FIG. 5, which supports that a calculation method used in the first embodiment is reliable. It is assumed in the following description that a calculation result derived from the calculation method used in the first embodiment is based on a light wave incident on a polarizing element in the direction perpendicular thereto for ease of description unless otherwise specified.

<Constraint Imposed on Wire-Grid Element Design>

A description will subsequently made of a constraint imposed on wire-grid element design. For example, the wire-grid element interacts with an incident light wave, followed by a resonance or diffraction phenomenon of the light wave. In this process, the structural period of the wire-grid element is closely related to the resonance or diffraction phenomenon of the light wave. The resonance or diffraction phenomenon of the light wave then greatly affects the polarization contrast ratio of the wire-grid element. Therefore, to manufacture a wire-grid element having high polarization contrast, it is necessary to adequately consider the resonance or diffraction phenomenon of the light wave. In particular, a considerable constraint resulting from the resonance or diffraction phenomenon of the light wave is imposed on the structural period of the wire-grid element. A description will be made of this point.

In a wire-grid element, the structural period between the metal wires is simply the structural period between metal wires adjacent to each other in the x direction (called structural period p). It is known that when the structural period p is greater than a predetermined value, a Rayleigh resonance phenomenon occurs and significantly lowers the polarization separation performance of the wire-grid element. That is, the Rayleigh resonance phenomenon, which is an interaction between the structural period p of the wire-grid element and a light wave, is an important phenomenon in determining characteristics of the wire-grid element, a representative example of which is the polarization contrast ratio.

Specifically, a period pr that causes the Rayleigh resonance phenomenon to occur is given by the following expression:

$$pr=\lambda/(ns \pm \sin\theta x) \quad \text{(Expression 1)}$$

where p represents the structural period of the wire-grid element, ns represents the refractive index of the light-transmissive substrate, $\lambda$ represents the wavelength of the incident light wave, and $\theta x$ represents the angle of incidence with respect to the x direction. The condition defined by Expression 1 is the same as a condition under which diffracted light occurs in the light-transmissive substrate.

Figure 6:
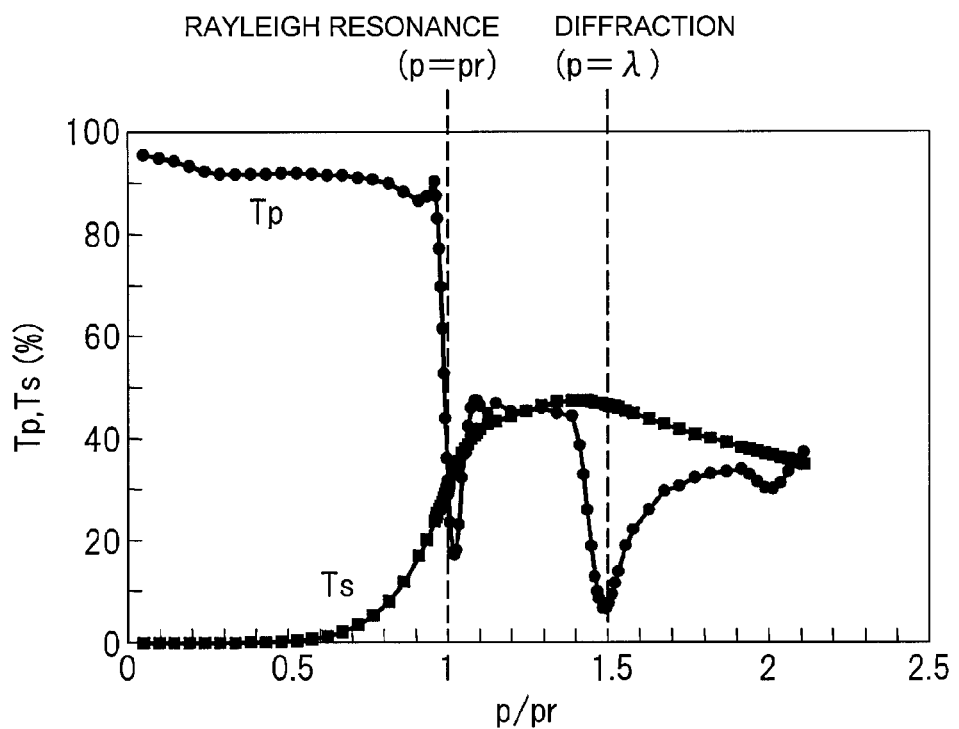
FIG. 6 shows a calculation result of the relationship between a structural period P and optical performance of the wire-grid element for perpendicularly incident light by using an FDTD calculation method.
Figure 7:
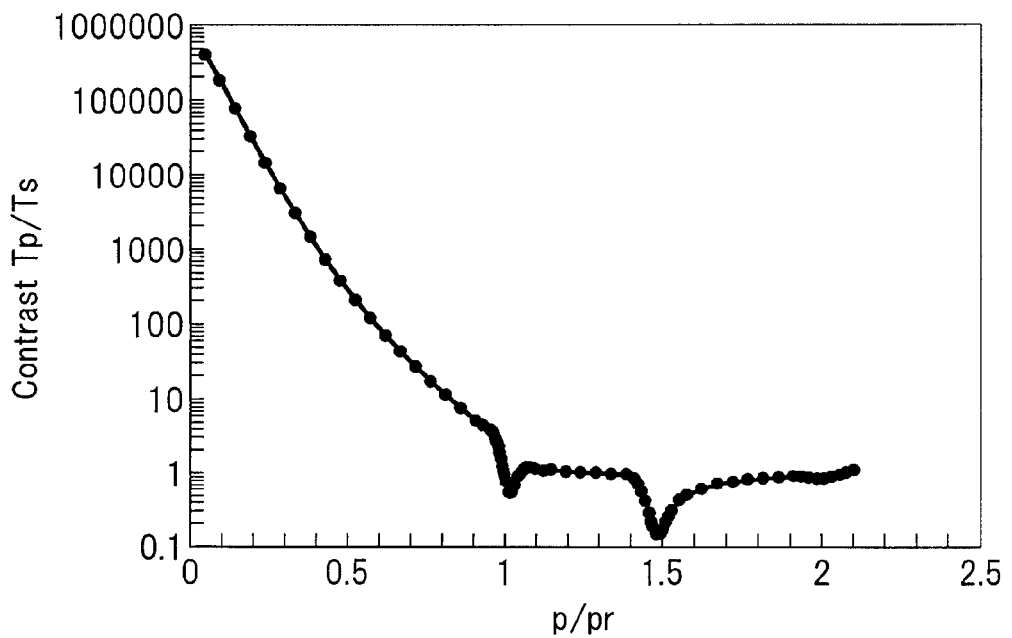
FIG. 7 shows a calculation result of the relationship between the structural period P and another type of optical performance of the wire-grid element for perpendicularly incident light by using the FDTD calculation method.

FIGS. 6 and 7 show calculation results of the relationship between the structural period p of the wire-grid element and the optical performance thereof for perpendicularly incident light ($\theta x=0$) by using the FDTD calculation method described above. In the calculation, the parameters described above and other conditions are set as follows: The structural period p of the wire-grid element is 150 nm; the metal wires are made of aluminum; the width of the metal wires is 50 nm; the height of the metal wires is 150 nm; a quartz substrate (ns=1.47) is used as the light-transmissive substrate; and the wavelength of the incident light wave is 460 nm.

FIG. 6 shows graphs illustrating the relationship between the structural period p and the transmittance Tp, Ts of the wire-grid element. FIG. 7 shows a graph illustrating the relationship between the structural period p and the polarization contrast ratio of the wire-grid element. In both the figures, FIGS. 6 and 7, the horizontal axis represents a structural period (p/pr) that is the structural period p normalized by the period pr, which causes the Rayleigh resonance phenomenon to occur.

In FIG. 6, the vertical axis represents the transmittance for p-polarized light and the transmittance for s-polarized light. When p/pr<0.5, no significant change in Tp or Ts is observed, whereas in the vicinity of a point where p/pr=1, a steep fall in Tp and a steep rise in Ts resulting from the Rayleigh resonance phenomenon occur, as seen from FIG. 6, which indicates that the Rayleigh resonance phenomenon significantly lowers the performance of the wire-grid element as a polarizing filter. In this regard, when the wavelength $\lambda$ of the incident light wave is 450 nm, pr is about 210 nm and the structural period p of the wire-grid element needs to be smaller than or equal to 210 nm, as described in JP-T-2003-508813. The value pr is derived from (Expression 1).

FIG. 6 shows that the curve of the transmittance for p-polarized light has two local minimums. A first local minimum (at p=pr) results from the Rayleigh resonance phenomenon, and a second local minimum (at p=$\lambda$) results from generation of diffracted light that passes through the substrate. It is, however, noted that generation of diffracted light does not need to be taken into account in a wire-grid element having a structural period p limited to p<pr.

Further, FIG. 7 ascertains that the polarization contrast ratio decreases as the structural period p of the wire-grid element increases and becomes smaller than 1 when the Rayleigh resonance phenomenon occurs, which means that the wire-grid element does not function as a polarizing filter any more. The fact described above explains the reason why a constraint on the structural period p of the wire-grid element is imposed from a viewpoint of avoiding the Rayleigh resonance phenomenon to ensure a satisfactory polarization contrast ratio of the wire-grid element. Specifically, the constraint imposed on the structural period p of the wire-grid element is given by the following (Expression 2):

$$p<pr \quad \text{(Expression 2)}$$

<Novel Point Introduced by Present Inventor>

As described above, the constraint defined by (Expression 2) is imposed on the structural period p of the wire-grid element from the viewpoint of ensuring that the wire-grid element adequately functions as a polarizing element. In further consideration of a constraint imposed by a fabrication process, the current wire-grid element (linear metal grating) is found to have a difficulty in achieving further improvement in the polarization contrast ratio.

To overcome the difficulty, the present inventor has contemplated introducing a structural period also in the y direction, along which the metal wires extend as well as in the x direction. However, the skilled in the art who have expert knowledge naturally come to think or readily infer that introducing a structural period in the y direction will also cause the same phenomenon as in the case of the structural period in the x direction. That is, when a structural period is introduced in the y direction, and the introduced structural period in the y direction is greater than or equal to a Rayleigh wavelength ($\lambda/n$), it is expected that the polarization contrast ratio significantly decreases as in the case of the structural period in the x direction (see FIG. 6). Therefore, to introduce a structural period in the y direction, the skilled in the art consider as common sense that the structural period in the y direction also needs to be smaller than or equal to the Rayleigh wavelength. Further, as common sense of the skilled in the art, no theoretical ground that supports that introduction of a structural period in the y direction improves the polarization contrast ratio of a polarizing element has been established. Moreover, since the result shown in FIG. 6 and the constraint defined by (Expression 2) are known to the skilled in the art who have expert knowledge as common sense, in the current status of a related-art polarizing element formed of a metal-wire-based microscopic structure formed on a light-transmissive substrate, no element response in a region where the structural period is greater than or equal to the Rayleigh wavelength has been clarified.

In this regard, the present inventor has disproved the expectation of the skilled in the art described above and found that when a structural period is introduced also in the y direction and the introduced structural period in the y direction is greater than or equal to the Rayleigh wavelength, the polarization contrast ratio of the polarizing element is improved. That is, the present inventor has disproved the expectation of the skilled in the art and has found that introduction of a structural period greater than or equal to the Rayleigh wavelength in the y direction can achieve a polarizing element having a polarization contrast ratio greater than a limit imposed by a wire-grid element having a linear metal wire structure. A description will be made of a polarizing element in the first embodiment attained by the present inventor.

<Configuration of Polarizing Element in First Embodiment>

Figure 8:
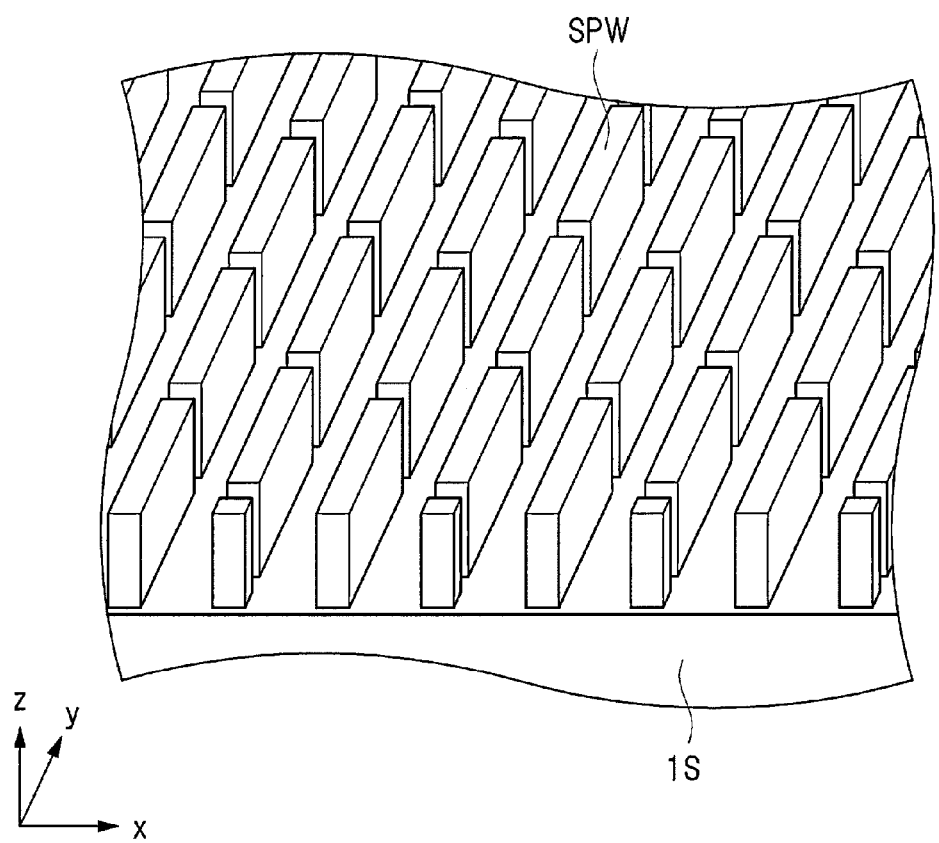
FIG. 8 is a perspective view showing an exterior configuration of a polarizing element in a first embodiment.

FIG. 8 is a perspective view showing an exterior configuration of a polarizing element in the first embodiment. FIG. 8 shows that the polarizing element in the first embodiment has a plurality of split wires SPW arranged in the x direction on a light-transmissive substrate 1S, and that each of the plurality of split wires SPW extends with periodic intervals in the y direction. In the present specification, a metal wire extending with periodic intervals in the y direction as shown in FIG. 8 is called a split wire (labeled as SPW in FIG. 8), and a polarizing element formed of the split wires is called a split wire element.

Figure 9:
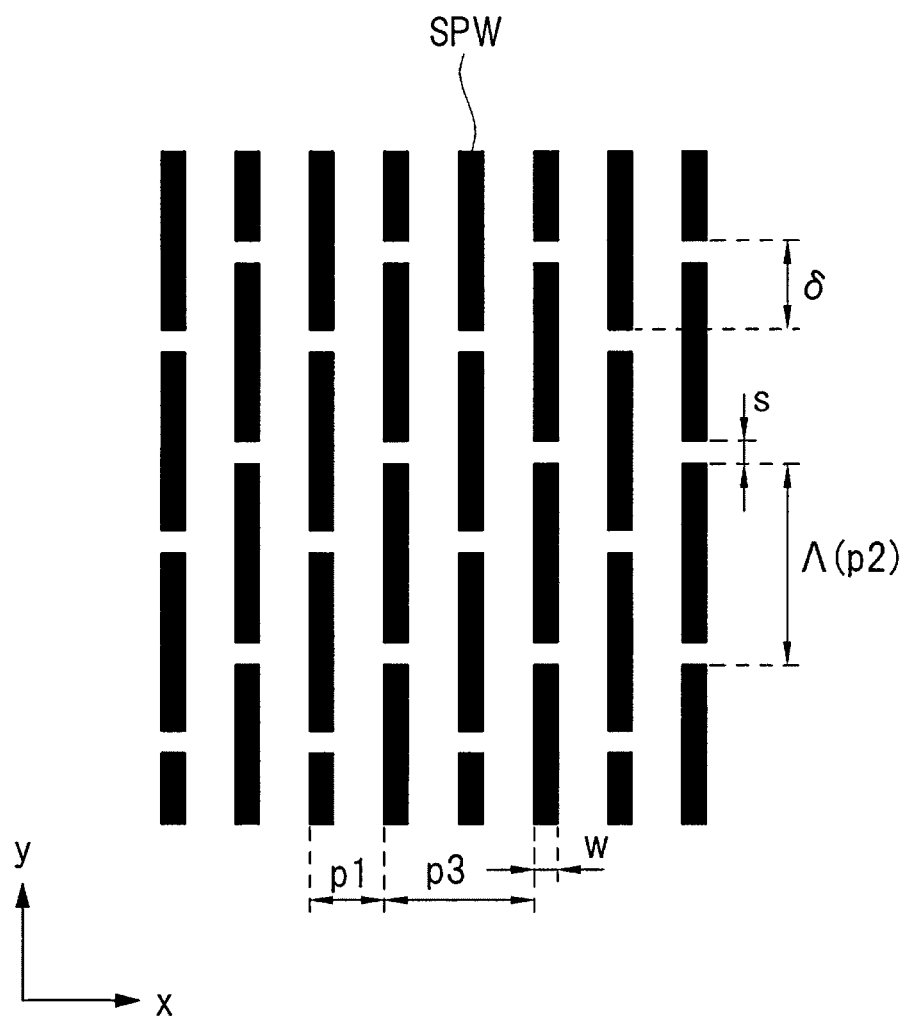
FIG. 9 shows a plan-view configuration of a plurality of split wires formed in a split wire element in the first embodiment.

FIG. 9 shows a plan-view configuration of the plurality of split wires SPW formed in the split wire element in the first embodiment. In the split wire element in the first embodiment, the split wires SPW, each of which has gaps s periodically formed in the y direction, are arranged in the x direction at equal intervals, as shown in FIG. 9. That is, the split wires SPW in the first embodiment are defined as a structure extending in the form of a periodic structure in the y direction. In the thus configured split wire element, the structural period includes a period p1 between the split wires SPW adjacent to each other, a period Λ (p2) between the gaps s in the y direction, and a period p3 (=2×p1) between a pair of split wires SPW that sandwich gaps s in the x direction. Further, the length of the gaps s and the difference in distance δ in the y direction between the gaps s formed in split wires SPW adjacent to each other in the x direction are added as shape parameters as well as the width w of the split wires SPW and the height (h) (not shown) of the split wires SPW.

As described above, the split wire element in the first embodiment includes the substrate 1S, which is transparent to an electromagnetic wave incident thereon, and the plurality of split wires SPW, which are so formed on a principal surface of the substrate 1S that they are arranged in the x direction at the period p1 (first periodic intervals) and extend in the y direction perpendicular to the x direction, as shown in FIGS. 8 and 9. In the first embodiment, each of the plurality of split wires SPW has a plurality of gaps s formed at the period Λ(second periodic intervals) in the y direction, and the period Λ between the plurality of gaps s is greater than or equal to $\lambda/n$, where $\lambda$ represents the wavelength of an incident electromagnetic wave and n represents the refractive index of the substrate 1S, ($\Lambda \geq \lambda/n$).

Further, in the split wire element in the first embodiment, a first formation position in the y direction where each of the plurality of gaps s is formed in a first split wire, among the plurality of split wires SPW, and a second formation position in the y direction where each of the plurality of gaps is formed in a second split wire adjacent to the first split wire are shifted from each other, as shown in FIG. 9. The shift is indicated by the difference in distance δ in the y direction in FIG. 9. In particular, FIG. 9 shows a case where the difference in distance δ in the y direction is Λ/2.

Further, in the split wire element in the first embodiment, a third split wire is disposed on the opposite side of the second split wire to the first split wire, among the plurality of split wires SPW, in a position adjacent to the second split wire, and the first formation position in the y direction where each of the plurality of gaps s is formed in the first split wire coincides with a third formation position in the y direction where each of the plurality of gaps s is formed in the third split wire. In this configuration, the period p3 (third periodic intervals) in the x direction between the first split wire and the third split wire is twice the period p1 (first periodic intervals) in the x direction. The period p1 in the x direction is smaller than $\lambda/n$, whereas the period p3 in the x direction is greater than $\lambda/n$.

The thus configured split wire element in the first embodiment is characterized in that the gaps are formed at the period Λ in the y direction in each of the plurality of split wires SPW and the period Λ is greater than or equal to the Rayleigh wavelength as shown in FIG. 9. The thus characterized split wire element in the first embodiment has improved optical performance as compared with a wire-grid element formed of straight wires having no periodic structure in the y direction. That is, the split wire element in the first embodiment can achieve a polarizing element having a polarization contrast ratio greater than a limit imposed by the wire-grid element. A description will be made of an outline of a mechanism based on which the split wire element in the first embodiment allows improvement in the polarization contrast ratio.

<Outline of Mechanism Based on which Polarization Contrast Ratio is Improved>

For example, an antenna used to receive an electromagnetic wave is typically formed of a plurality of metal wires, and the structure of the antenna is expressed by an equivalent circuit in some cases. On the other hand, the split wire element in the first embodiment, which is also formed of metal wires, can be expressed by an equivalent circuit, as in the case of the antenna. That is, in the first embodiment, in which the incident light is a light wave, which is one type of electromagnetic wave, it is believed that the split wire element in the first embodiment that interacts with an electromagnetic wave can also be expressed by an equivalent circuit. In the following sections, a qualitative mechanism based on which the split wire element in the first embodiment allows improvement in the polarization contrast ratio will be described by using an equivalent circuit.

Figure 10:
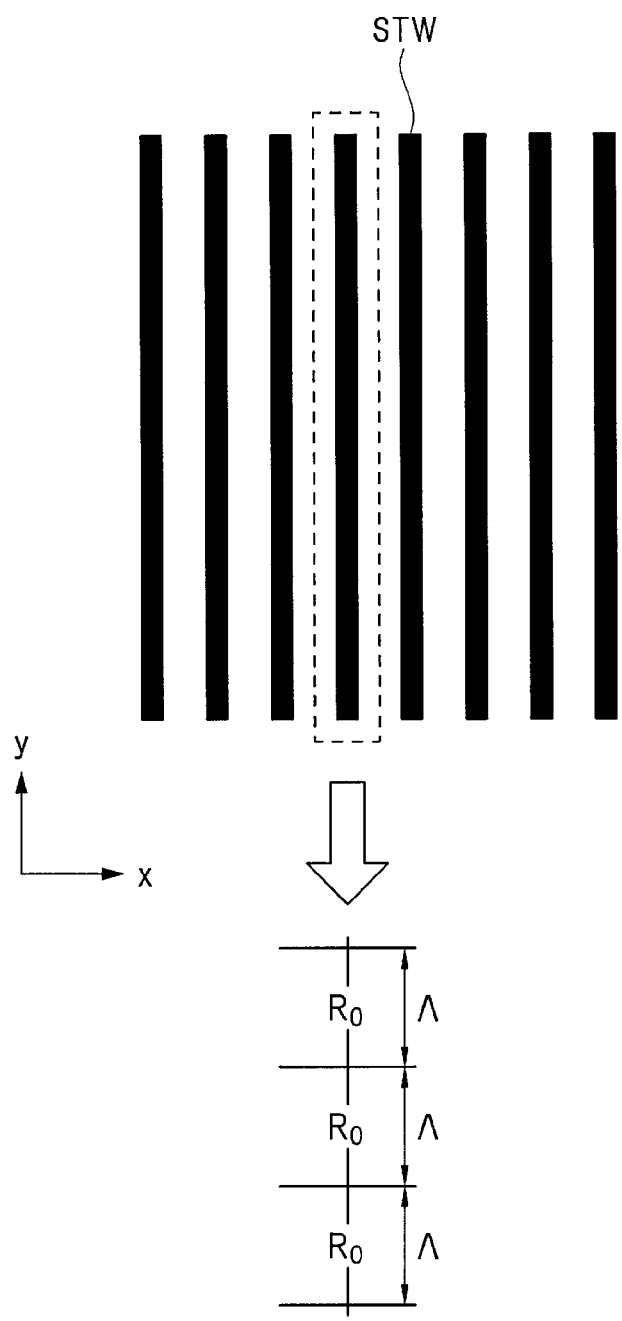
FIG. 10 shows an equivalent circuit of a wire-grid element that interacts with a light wave.

FIG. 10 shows an equivalent circuit of a wire-grid element that interacts with a light wave. FIG. 10 shows an equivalent circuit of only a single straight wire STW in the y direction, that is, a single straight wire STW that interacts with s-polarized light for ease of description, and the period Λ is shown as a unit. The equivalent circuit of the wire-grid element is, as readily understood, a circuit in which resistors $R_0$ are periodically connected in series to each other, as shown in FIG. 10. In this case, since the response of the circuit to s-polarized light is determined by a fixed, frequency-independent impedance determined by the resistance $R_0$, the equivalent circuit has a flat frequency characteristic. That is, the wire-grid element responds to s-polarized light with no frequency dependence.

Figure 11:
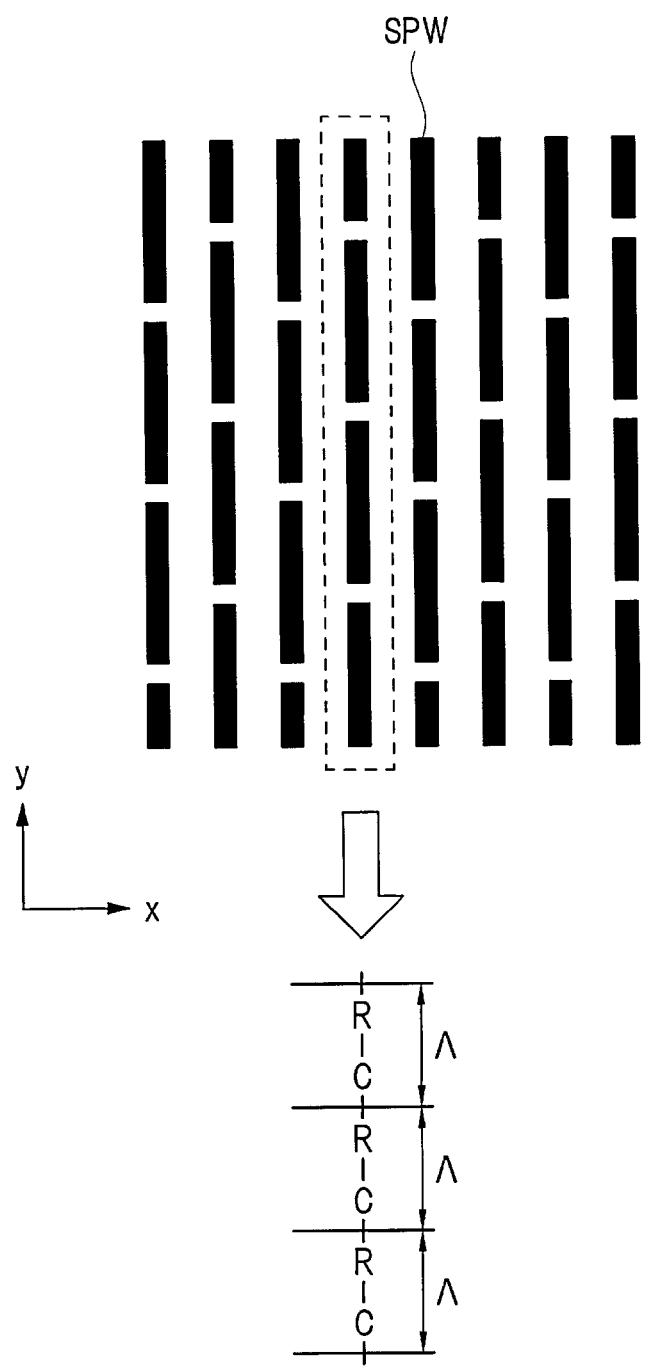
FIG. 11 shows an equivalent circuit of the split wire element in the first embodiment that interacts with a light wave.

In contrast, FIG. 11 shows an equivalent circuit of the split wire element in the first embodiment that interacts with a light wave. FIG. 11 also shows an equivalent circuit of only a single split wire SPW in the y direction, that is, a single split wire SPW that interacts with s-polarized light for ease of description, and the period Λ is shown as a unit. The equivalent circuit of the split wire element in the first embodiment, in which each of the gaps forms a capacitive element (capacitor), is a circuit in which a resistor R and a capacitive element C are connected in series to each other as a component and the component is repeatedly connected in series to another, as shown in FIG. 11. In this case, the response of the split wire element to s-polarized light is a response of an RC series circuit and hence is frequency dependent, that is, wavelength dependent. For example, the impedance of each of the components is $Z=R+1/j\omega C$, and the impedance Z, which contains an angular frequency ($\omega=2\pi f$), is frequency dependent. This means that the impedance corresponding to the split wire SPW changes with the wavelength of the light wave incident on the split wire element. The impedance therefore changes whenever a light wave having a different wavelength is incident, whereby, for example, an s-polarized light wave having a predetermined wavelength can be selectively reflected or absorbed instead of being transmitted. That is, the split wire element in the first embodiment can cause a resonance phenomenon that allows an s-polarized light wave having a predetermined wavelength to be reflected or absorbed to occur. It is believed that the resonance phenomenon described above can be handled as a resonance phenomenon different from the Rayleigh resonance phenomenon.

Figure 12:
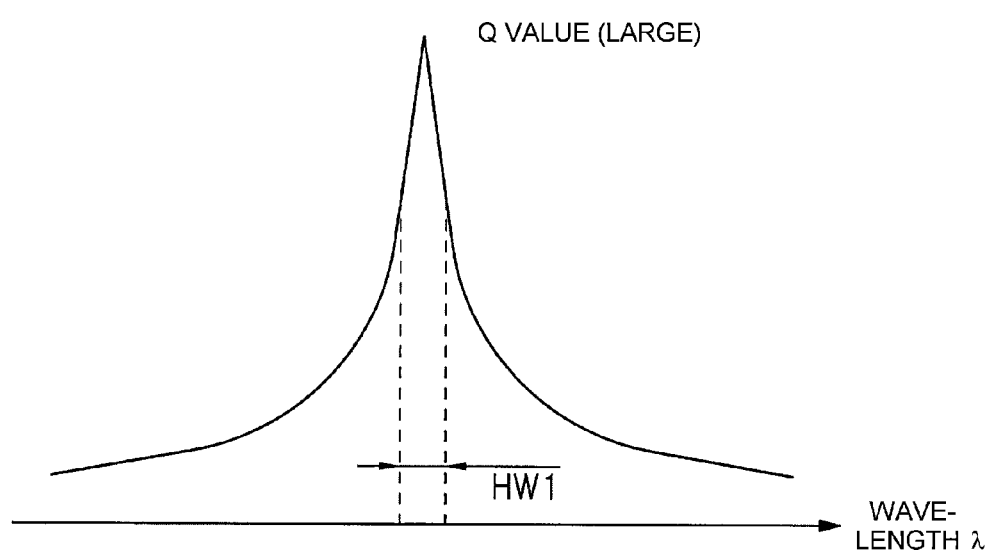
FIG. 12 diagrammatically shows a resonance phenomenon in the first embodiment.

Specifically, FIG. 12 diagrammatically shows the resonance phenomenon in the first embodiment. In FIG. 12, when the wavelength of a light wave incident on the split wire element in the first embodiment falls within a half width HW1, the impedance corresponding to that specific wavelength allows s-polarized light to be reflected or absorbed. As a result, the resonance phenomenon occurs. For example, FIG. 12 shows a case where the resonance phenomenon has a steep shape, which means that the resonance phenomenon has a large Q value, which represents the steepness of the resonance curve. In this case, for example, the half width HW1, which represents a wavelength region where the height of the resonance curve is greater than or equal to ½, is narrow. That is, when the Q value of the resonance increases, the half width HW1 narrows.

In the following sections, a description will be made of the resonance phenomenon described above followed by an improvement in the polarization contrast ratio of the split wire element in the first embodiment. For example, the split wire element in the first embodiment transmits p-polarized light and reflects s-polarized light basically based on the same mechanism based on which a wire-grid element transmits p-polarized light and reflects s-polarized. Ideally, the entire s-polarized light is desirably reflected, but an actual split wire element transmits part of the s-polarized light as a leakage light component. The magnitude of the s-polarized light leakage component primarily determines the polarization contrast ratio of the split wire element.

For example, when the amount of s-polarized light leakage component increases, the polarization contrast ratio is lowered, whereas when the amount of s-polarized light leakage component decreases, the polarization contrast ratio is improved. In this regard, it is assumed in the first embodiment that impedance adjustment is, for example, so made that the resonance phenomenon described above occurs at the wavelength of an incident light wave. In this case, s-polarized light incident on the split wire element in the first embodiment causes the resonance phenomenon described above to occur, which means that the s-polarized light is reflected or absorbed by a greater amount than in a case where the resonance phenomenon does not occur. That is, the resonance phenomenon replaces generation of the s-polarized light leakage component that passes through the split wire element with reflection or absorption of the s-polarized light. As a result, according to the split wire element in the first embodiment, the amount of s-polarized light leakage component decreases, whereby the polarization contrast ratio is improved.

The basic mechanism based on which the split wire element in the first embodiment provides a polarization contrast ratio higher than that of a wire-grid element of related art has been described. Based on the mechanism, the periodic gaps s are provided in the y direction in each of the split wires SPW of the split wire element in the first embodiment, for example, as shown in FIG. 9. In the following sections, simulations are performed on the basic configuration described above under a variety of conditions from a viewpoint of improving the polarization contrast ratio in order to conduct further detailed studies to achieve a desirable configuration. In the following sections, a description will be made of results of the simulations.

Further, for example, a metal material can be used as a perfect conductor in an electromagnetic wave wavelength band for broadcasting, whereas a metal material responds to light in the visible light wavelength band in the form of reflection, absorption, or transmission according to the type of the metal material in accordance with a model representative examples of which are a Lorentz model and a Drude model. However, since Maxwell's equation can handle the refractive index in the form of an complex number, the FDTD method allows calculation of characteristics of the responses described above.

<Relationship Between Wire Height and Optical Performance>

Figure 13A:
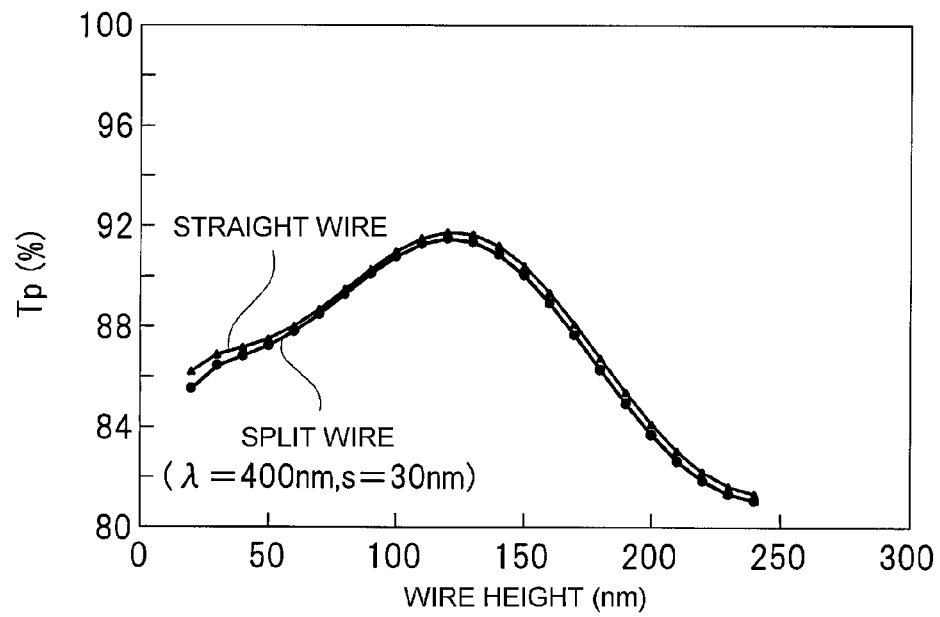
FIG. 13A shows graphs illustrating the relationship between the height of the split wires and the transmittance for p-polarized light, and FIG. 13B show graphs illustrating the relationship between the height of the split wires and a polarization contrast ratio.
Figure 13B:
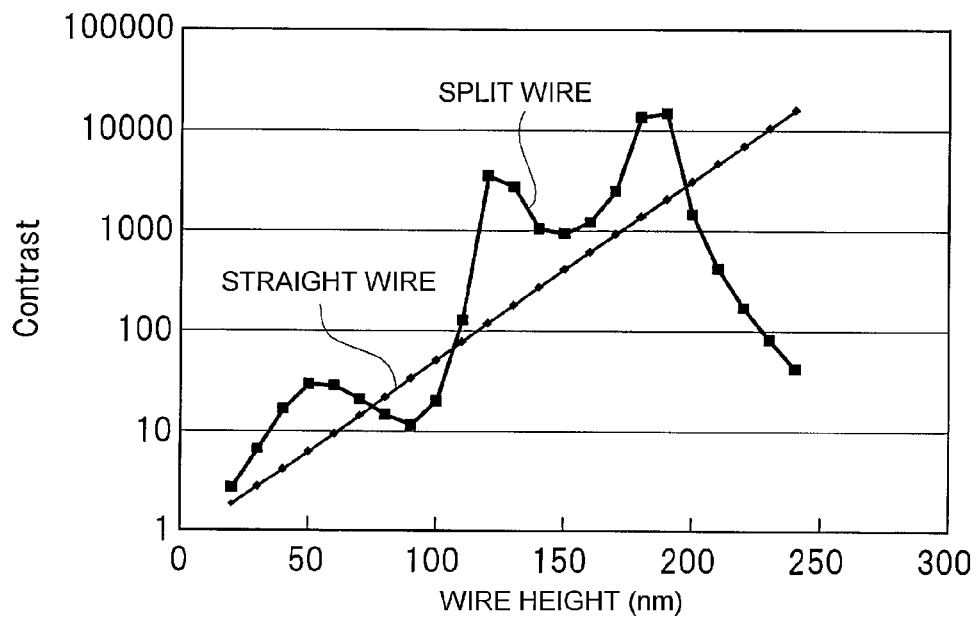

FIGS. 13A and 13B show simulation results illustrating the relationship between the height the wires and the optical performance of the split wire element in the first embodiment. FIGS. 13A and 13B also show results of the simulation on a wire-grid element formed of straight wires having no gap for comparison purposes. Parameters necessary for the simulation are set as follows: The wavelength λ of incident light is 460 nm; the period p1 in the x direction between split wires adjacent to each other is 150 nm; the width w of the split wires is 50 nm; the period Λ in the y direction is 400 nm; and the size of the gaps s is 30 nm. It is further assumed that the light-transmissive substrate has a refractive index of 1.525, and the split wires are made of aluminum.

FIG. 13A shows graphs illustrating the relationship between the height of the split wires and the transmittance for p-polarized light. FIG. 13A shows that Tp of the split wire element in the first embodiment substantially agrees with Tp of the wire-grid element formed of straight wires having the same width, height, and pitch, which indicates that the periodic structure introduced in the y direction in the first embodiment does not greatly affect the transmission of p-polarized light. This point is important. That is, introduction of a structural period in the y direction into split wires hardly change the transmittance for p-polarized light. As a result, the first embodiment allows improvement in the polarization contrast ratio of the split wire element.

For example, introduction of a periodic structure formed of gaps in the y direction reduces the amount of s-polarized light leakage component, as explained with reference to the mechanism described above. In this case, however, if the introduction of a periodic structure formed of gaps in the y direction also lowers the transmittance for p-polarized light, the decrease in the amount of s-polarized light leakage component is accompanied by the decrease in the transmittance for p-polarized light, resulting in a difficulty in improving the polarization contrast ratio.

In this regard, the introduction of the periodic structure formed of gaps in the y direction hardly changes the transmittance for p-polarized light, as shown in FIG. 13A. Therefore, the first embodiment provides a significant advantageous effect of improvement in the polarization contrast ratio not only because the introduction of the periodic structure formed of gaps in the y direction does not change the transmittance for p-polarized light but also because the introduction of the periodic structure formed of gaps in the y direction reduces the amount of s-polarized light leakage component.

FIG. 13B show graphs illustrating the relationship between the height of the split wires and the polarization contrast ratio. FIG. 13B shows that in the case of straight wires, the polarization contrast ratio increases monotonously with the height of the straight wires. Since the vertical axis is expressed in a logarithmic scale, it is understood that the phenomenon is equivalent to the response of an absorbent film in terms of transmittance and that the wire-grid element responds to s-polarized light in the same manner as a typical metal thin film.

On the other hand, in the case of the split wire element in the first embodiment, it is found that a plurality of peaks indicating resonance with s-polarized light are present and that the height of each of the peaks is greater than the polarization contrast ratio of the wire-grid element by at least one order of magnitude, which indicates that the resonance phenomenon explained by using the equivalent circuit expressed by the RC series circuit described above greatly affects the response of the split wire element to s-polarized light. FIG. 13B shows that the resonance phenomenon in the split wire element in the first embodiment noticeably occurs when the height of the split wires is 20 nm or greater.

<Relationship Between Period in y Direction and Polarization Contrast Ratio>

Figure 14:
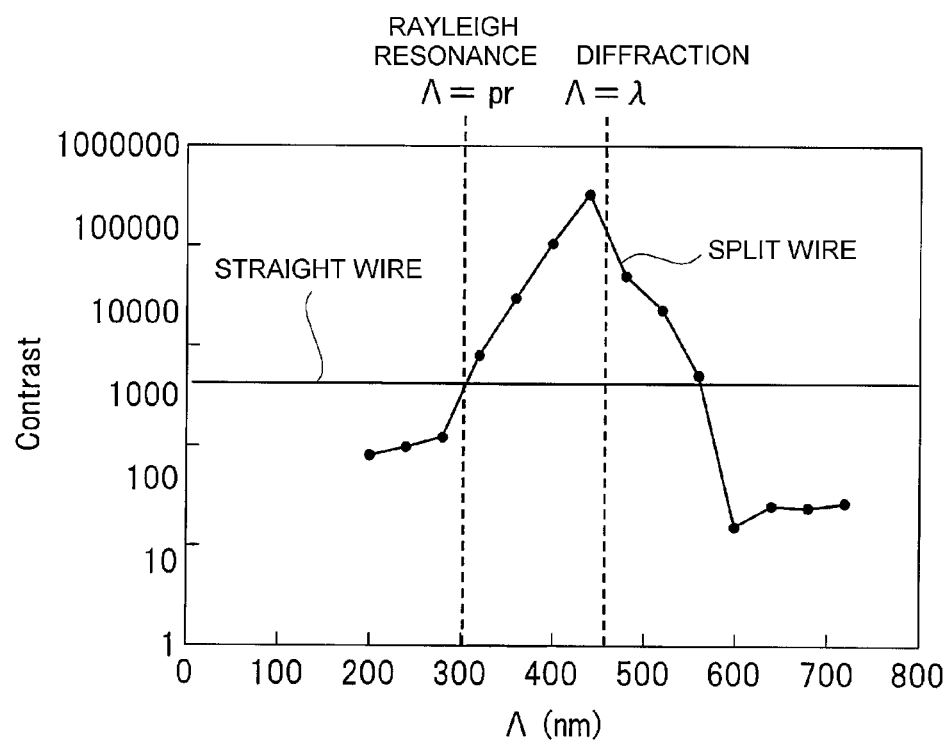
FIG. 14 shows a graph illustrating a simulation result showing the relationship between the period between gaps in a y direction and the polarization contrast ratio of the split wire element in the first embodiment.

FIG. 14 shows a graph illustrating a simulation result showing the relationship between the period $\Lambda$ in the y direction and the polarization contrast ratio of the split wire element in the first embodiment. Parameters necessary for the simulation are set as follows: The wavelength $\lambda$ of incident light is 460 nm; the period p1 in the x direction between split wires adjacent to each other is 150 nm; the width w of the split wires is 50 nm; the height h of the split wires is 150 nm; and the size of the gaps s is 25 nm. The period pr, which causes the Rayleigh resonance phenomenon corresponding to perpendicular incidence to occur, is 301 nm. FIG. 14 shows that the polarization contrast ratio is greater than that of the wire-grid element having the same width, height, and pitch in a region where the period $\Lambda$ in the y direction is within a range from 300 to 560 nm. Therefore, the polarization contrast ratio improvement effect of the split wire element in the first embodiment increases in a region where the period $\Lambda$ in the y direction is greater than or equal to the period that causes the Rayleigh resonance phenomenon to occur ($\Lambda$=pr), is maximized in the vicinity of a point where diffracted light occurs and exits through the rear surface of the light-transmissive substrate ($\Lambda$=$\lambda$), and continues to a point where $\Lambda$ is approximately 2×pr.

The characteristics of the split wire element in the first embodiment described above indicate that setting the period $\Lambda$ in the y direction at a value greater than or equal to the Rayleigh wavelength, where the Rayleigh resonance phenomenon occurs, but smaller than or equal to 2×pr allows s-polarized light to be selectively reflected or absorbed whereas hardly affecting p-polarized light, achieving a large polarization contrast ratio. The is a basic idea in the first embodiment.

The change in the polarization contrast ratio with the period $\Lambda$ in the y direction shown in FIG. 14 can be qualitatively interpreted as follows: For example, when the period $\Lambda$ in the y direction is smaller than or equal to the Rayleigh wavelength, it is conceivable that the periodic structure in the y direction is a sub-resolution structure for incident light having the wavelength $\lambda$ and hence cannot be expressed by the equivalent circuit in the form of the RC series circuit described above. It is therefore believed that a phenomenon that cannot be explained by the s-polarized-light reflection or absorption related resonance phenomenon described by using the equivalent circuit is likely to occur, and that the phenomenon prevents improvement in the polarization contrast ratio, resulting in a decrease in the polarization contrast ratio.

On the other hand, when the period $\Lambda$ in the y direction is greater than or equal to the Rayleigh wavelength, it is believed that the equivalent circuit in the form of the RC series circuit described above is valid, and that the polarization contrast ratio is improved primarily due to the s-polarized-light reflection or absorption related resonance phenomenon described by using the equivalent circuit.

FIG. 14, however, shows that when the period $\Lambda$ in the y direction is greater than the wavelength of the incident light wave, the improvement in the polarization contrast ratio is limited. The reason for this can be described as follows: That is, an increase in the period $\Lambda$ results in a greater effect of the length of the metal wire portions of the split wires on the impedance $Z=R+1/j\omega C$ than the effect of the gap portions. This is believed to limit the improvement in the polarization contrast ratio. That is, it is believed that as a result of an increase in the length of the metal wire portions, the resistance R relatively increases, which reduces the effect of ($1/j\omega C$) on the impedance adjustment range. It is therefore believed that a specific impedance that allows the resonance phenomenon in response to s-polarized light to occur is unlikely to be achieved and hence the resonance phenomenon in response to s-polarized light is unlikely to occur.

On the other hand, the reason why the split wire element in the first embodiment provides a high polarization contrast as compared with the wire-grid element even when the period $\Lambda$ in the y direction is greater than the wavelength of incident light wave is conceivably that another mechanism also contributes when the period $\Lambda$ in the y direction is greater than the wavelength of incident light wave. That is, when the period $\Lambda$ in the y direction is greater than the wavelength of the incident light wave, a phenomenon in which diffracted light is hardly produced from p-polarized light whereas diffracted light is produced from s-polarized light is seen. In this case, it is believed that part of the s-polarized light leakage component produces diffracted light that passes through the substrate. This means that the amount s-polarized light leakage component that passes through the substrate and travels straightforward decreases, whereby the polarization contrast ratio increases. It is therefore believed that even when the period $\Lambda$ in the y direction is greater than the wavelength (λ) of incident light wave but does not exceed a value about 2×pr, the effect of the s-polarized diffracted light described above maintains a high polarization contrast ratio although the resonance phenomenon in response to s-polarized light is unlikely to occur.

When the period Λ in the y direction further increases, and even when part of the s-polarized light leakage component produces diffracted light that passes through the substrate, the diffracted light cannot be separated from an s-polarized light leakage component that travels straightforward because the angle of diffraction of the diffracted light decreases. As a result, it is believed that no improvement in the polarization contrast ratio based on the fact that part of the s-polarized light leakage component produces diffracted light that passes the substrate is expected, and that some phenomena that lowers the polarization contrast ratio occur. It is therefore believed that when the period Λ in the y direction is greater than 2×pr, the polarization contrast ratio of the split wire element in the first embodiment becomes smaller than the polarization contrast ratio of the wire-grid element.

<Relationship Between Gaps and Optical Performance>

A description will subsequently be made of the relationship between the gaps formed in the split wires and the optical performance. As described above, since each of the gaps formed in the split wires functions as a capacitive element, the capacitance of the capacitive element changes with the size of the gap and the impedance expressed by $Z=R+1/j\omega C$ changes accordingly. As a result, the resonance phenomenon related to reflection or absorption of s-polarized light is also believed to depend on the size of the gaps formed in the split wires. This point will be described below.

Figure 15A:
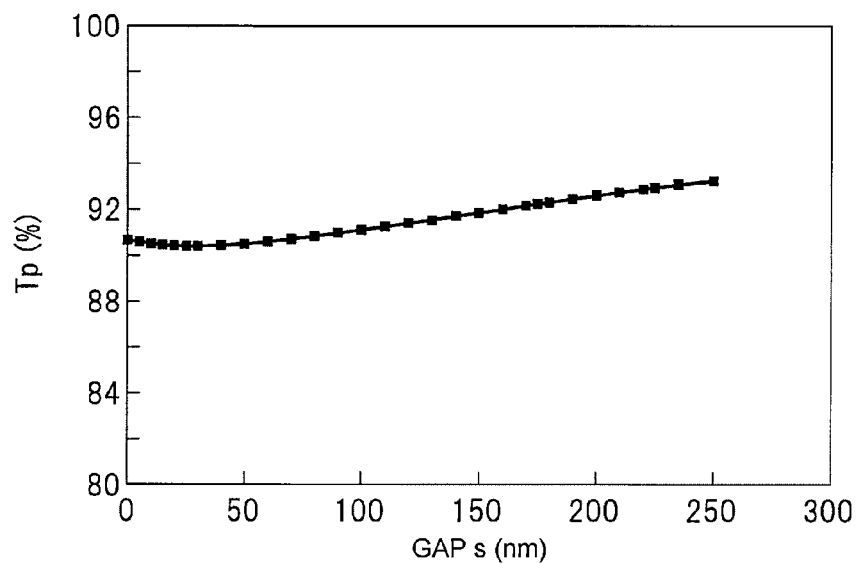
FIG. 15A shows a graph illustrating the relationship between the gaps and the transmittance for p-polarized light.
Figure 15B:
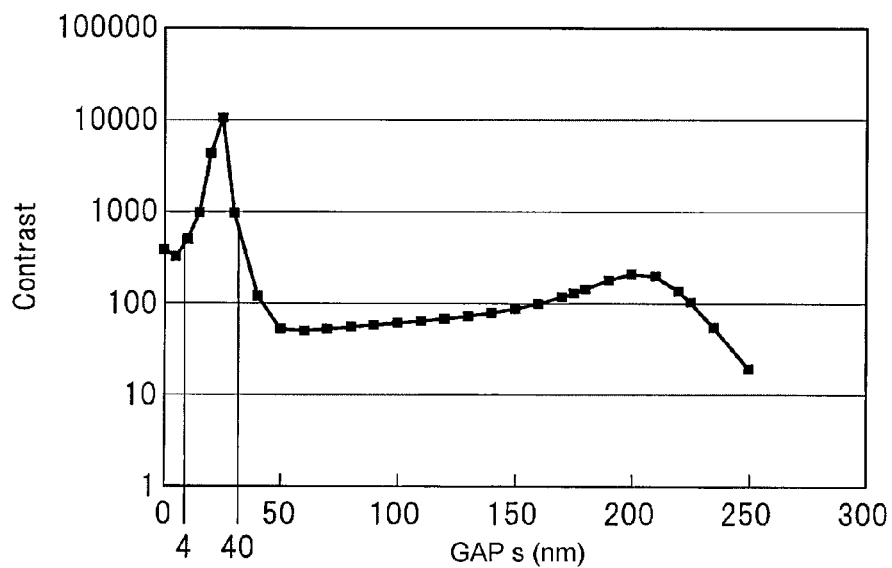
FIG. 15B shows a graph illustrating the relationship between the gaps and the polarization contrast ratio.

FIGS. 15A and 15B show simulation results illustrating the relationship between the gaps and the optical performance of the split wire element in the first embodiment. Parameters necessary for the simulation are set as follows: The wavelength λ of incident light is 460 nm; the period p1 in the x direction between split wires adjacent to each other is 150 nm; the width w of the split wires is 50 nm; the height h of the split wires is 150 nm; and the period Λ in the y direction is 400 nm. FIG. 15A shows a graph illustrating the relationship between the gaps and the transmittance for p-polarized light. FIG. 15A shows that Tp tends to increase mildly as the size of the gaps increases. It can be qualitatively understood that the increase results from a decrease in the metal area of the split wires or an increase in the proportion of the opening to the entire split wire element according to the increase in the size of the gaps.

FIG. 15B shows a graph illustrating the relationship between the gaps and the polarization contrast ratio. The point where the size of the gaps s is zero corresponds to a wire-grid element formed of straight wires. FIG. 15B shows that the polarization contrast ratio strongly depends on the size of the gaps, and, for example, that the polarization contrast ratio is maximized when the size of the gaps s is 25 nm and does not exceed the polarization contrast ratio of the wire-grid element in a range where the size of the gaps s is greater than 50 nm.

Specifically, FIG. 15B shows that the polarization contrast ratio of the split wire element in the first embodiment is greater than the polarization contrast ratio of the wire-grid element within a range where the size of the gaps ranges from 4 to 40 nm. In particular, the simulation result in FIG. 15B, which is obtained on the condition that the period Λ in the y direction is 400 nm, shows that the polarization contrast ratio of the split wire element in the first embodiment is greater than the polarization contrast ratio of the wire-grid element within a range of 4/400 (1%)≤s/Λ≤40/400 (10%). Based on the fact described above, the size of the gaps s formed in the split wires is desirably set, in the relationship between the gaps and the period Λ in the y direction, at a value within the range of 1%≤s/Λ≤10% from the viewpoint of improving the polarization contrast ratio.

<Effect of δ>

A description will next be made of an effect of the difference in distance δ in the y direction between the gaps formed in split wires adjacent to each other in the x direction.

Figure 16:
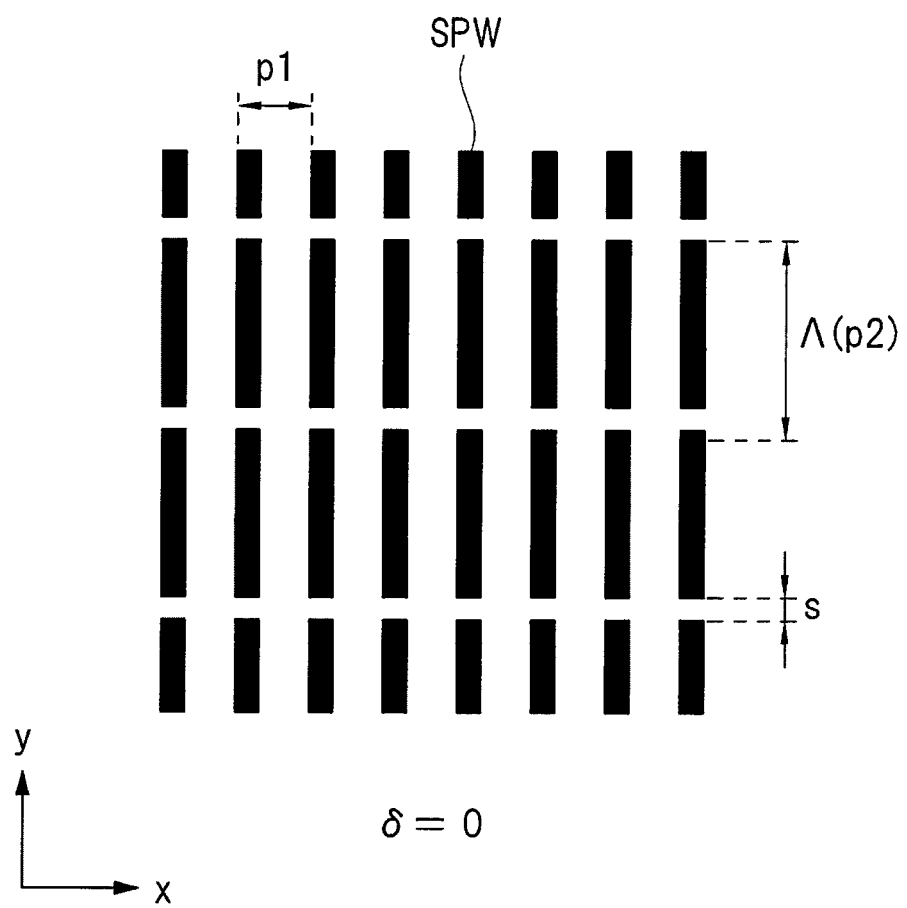
FIG. 16 is a diagrammatic view showing a split wire element having a structure in which gaps are aligned with each other in an x direction.
Figure 17A:
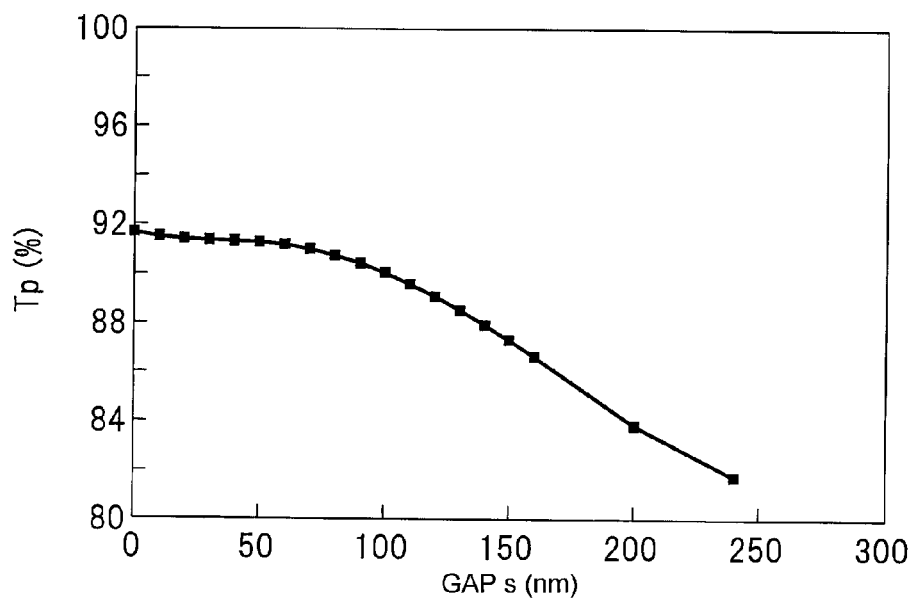
FIG. 17A shows a graph illustrating the relationship between the gaps and the transmittance for p-polarized light.
Figure 17B:
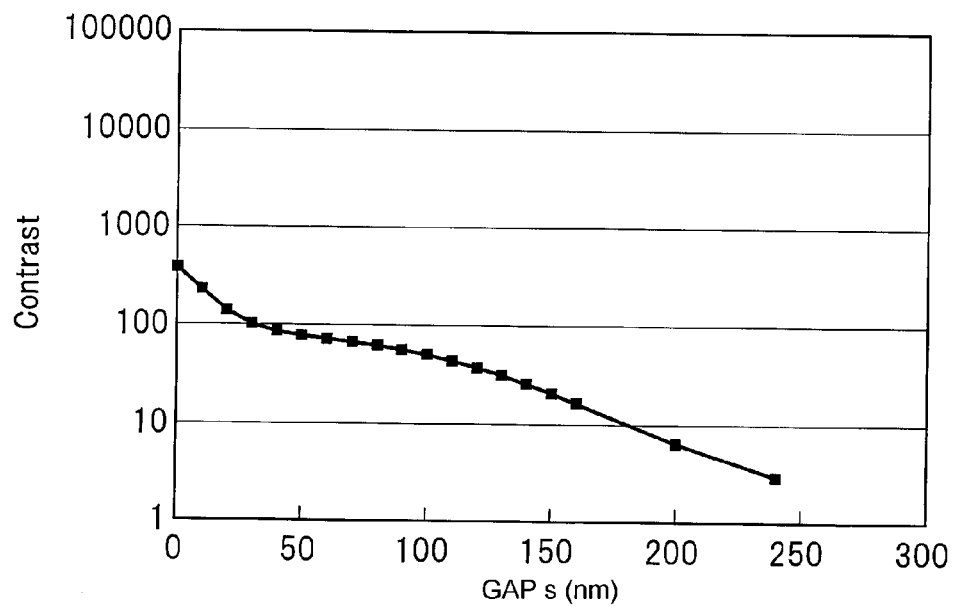
FIG. 17B shows a graph illustrating the relationship between the gaps and the polarization contrast ratio.

FIG. 16 is a diagrammatic view showing a split wire element having a structure obtained by changing the structure of the split wire element shown in FIG. 9 in such a way that the difference in distance δ in the y direction is set at 0 and the period p3 in the x direction is set at ∞ to align the gaps s with each other in the x direction. FIGS. 17A and 17B show results of a simulation on the relationship between the gaps s and the optical performance of the split wire element shown in FIG. 16 and are similar to FIGS. 15A and 15B in that the conditions other than the difference in distance δ in the y direction and the period p3 in the x direction are equal to those in FIGS. 15A and 15B.

FIG. 17A shows a graph illustrating the relationship between the gaps s and the transmittance for p-polarized light. As shown in FIG. 17A, Tp decreases as the size of the gaps s increases although it changes mildly. The result cannot be explained by the effect of a decrease in the metal area of the split wires or the effect of an increase in the proportion of the opening to the entire split wire element according to the increase in the size of the gaps S.

FIG. 17B shows a graph illustrating the relationship between the gaps s and the polarization contrast ratio. The point where the size of the gaps s is zero corresponds to a wire-grid element formed of straight wires. FIG. 17B shows that the polarization contrast ratio in this case is characterized in that it monotonously decreases as the size of the gaps s increases. That is, when the difference in distance δ in the y direction is zero, changing the size of the gaps s does not increase the polarization contrast ratio of the split wire element as compared with the polarization contrast ratio of the wire-grid element.

It is found based on the fact described above that the split wire element related to the first embodiment but having a structure in which the gaps s are aligned with each other in the x direction (δ=0) does not cause the phenomenon in which the split wire element selectively interacts with s-polarized light to lower the transmittance for s-polarized light to occur. It is therefore found that when the split wire element in the first embodiment is manufactured, it is desirable to avoid a condition of δ=0 although the value of δ can be set as appropriate depending on process conditions and other factors.

<Wavelength Dependence of Split Wire Element>

Figure 18A:
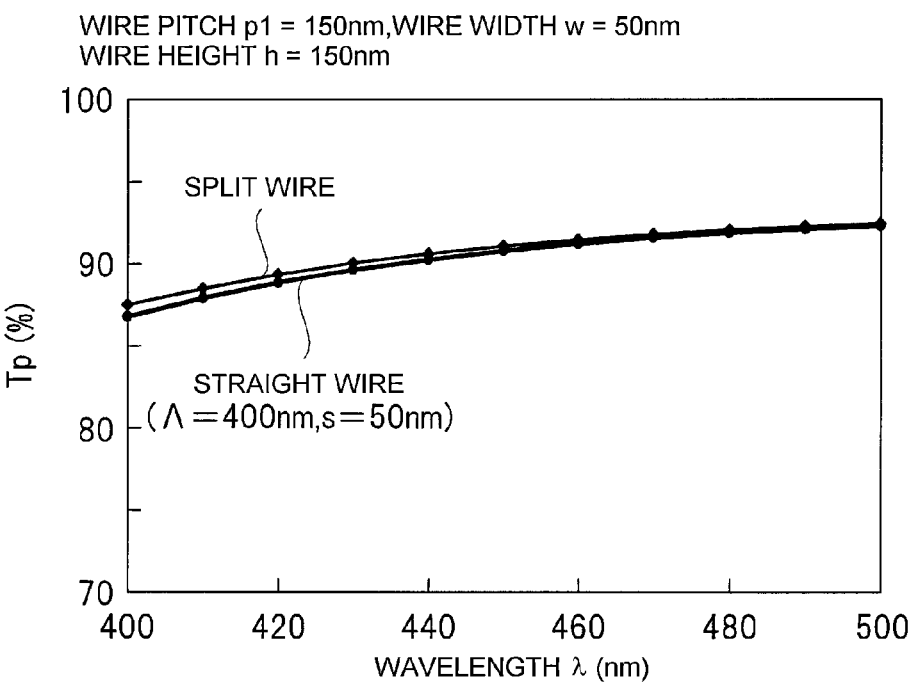
FIG. 18A shows graphs illustrating the relationship between the wavelength of incident light and the transmittance for p-polarized light.
Figure 18B:
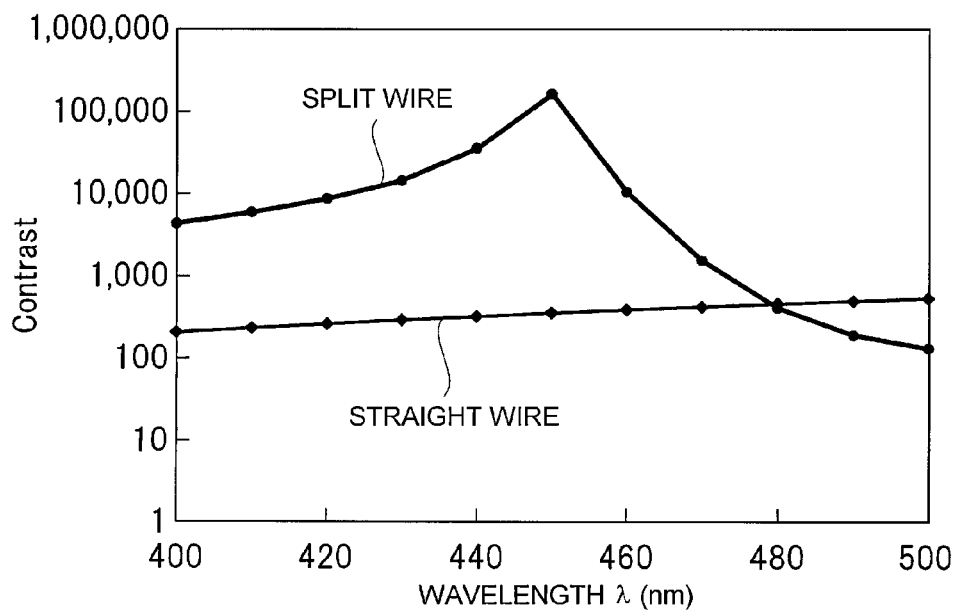
FIG. 18B shows graphs illustrating the relationship between the wavelength of the incident light and the polarization contrast ratio.

A description will subsequently made of wavelength dependence of the split wire element in the first embodiment. FIGS. 18A and 18B show graphs illustrating results of a simulation on the wavelength dependence of the split wire element in the first embodiment shown in FIG. 9 in a blue wavelength band of visible light. Parameters necessary for the simulation are set as follows: The period p1 in the x direction between split wires adjacent to each other is 150 nm; the width w of the split wires is 50 nm; the height h of the split wires is 150 nm; the period Λ in the y direction is 400 nm; and the size of the gap s is 25 nm. FIGS. 18A and 18B also show results of the simulation on a wire-grid element formed of straight wires for comparison purposes.

FIG. 18A shows graphs illustrating the relationship between the wavelength of incident light and the transmittance for p-polarized light. As shown in FIG. 18A, Tp of the split wire element in the first embodiment agrees with Tp of the wire-grid element within an error of 0.30.

FIG. 18B shows graphs illustrating the relationship between the wavelength of the incident light and the polarization contrast ratio. As shown in FIG. 18B, in the case of the wire-grid element formed of straight wires, the polarization contrast ratio mildly increases as the wavelength increases. The increase primarily results from a wavelength dependence of the complex refractive index of an aluminum material. On the other hand, in the case of the split wire element formed of split wires in the first embodiment, the polarization contrast ratio is characterized in that it peaks in accordance with the effect of a resonance phenomenon in response to s-polarized light. In particular, as shown in FIG. 18B, the polarization contrast ratio is maximized at a wavelength of 450 nm and has a value of about 200,000. The value is about 1000 times greater than that of the wire-grid element, which shows that the split wire element in the first embodiment provides an excellent polarization contrast ratio as compared with the wire-grid element. Further, the polarization contrast ratio is at least 10,000 in the vicinity of the peak wavelength, specifically, over a wavelength range of ±10 nm on both sides of the peak wavelength. As described above, the split wire element in the first embodiment can provide excellent polarization contrast performance for light having a narrow wavelength range, such as light from a laser, an LED, or any other similar light source to be used.

<Outline of Primary Characteristics in First Embodiment>

The split wire element in the first embodiment is characterized, for example, in that gaps are formed in the y direction at the period Λ in each of a plurality of split wires SPW as shown in FIG. 9. The split wire element in the first embodiment is further characterized in that the period Λ is greater than or equal to the Rayleigh wavelength as shown in FIG. 14. The split wire element in the first embodiment can therefore improve the optical performance as compared with a wire-grid element formed of straight wires having no periodic structure in the y direction. That is, the split wire element in the first embodiment can achieve a polarizing element having a polarization contrast ratio greater than a limit imposed by the wire-grid element.

The thus characterized split wire element in the first embodiment differs from the wire-grid element having only one structural period in that the split wire element has at least three structural periods.

For example, the wire-grid element has only one structural period or the period p1 between straight wires adjacent to each other in the x direction, and the period p1 is smaller than the Rayleigh wavelength. In contrast, the structural period of the split wire element in the first embodiment includes at least the period p1 between split wires adjacent to each other in the x direction, the period Λ between the gaps arranged in the y direction, and the period p3 between a pair of split wires that sandwiches gaps. Further, in the split wire element in the first embodiment, the period Λ and the period p3 are greater than or equal to the Rayleigh wavelength.

As described above, it can be said that the split wire element in the first embodiment has a novel structure characterized in that optical performance a representative example of which is the polarization contrast ratio is improved by introducing a structural period greater than or equal to the Rayleigh wavelength. That is, as shown, for example, in FIGS. 6 and 7, an expectation that introduction of a structural period greater than or equal to the Rayleigh wavelength lowers the polarization contrast ratio is technical common sense for the skilled in the art, and it is typical to impose a constraint on the structural period in such a way that the structural period is smaller than the Rayleigh wavelength from a viewpoint of ensuring a sufficient polarization contrast ratio. In contrast, the technical idea in the first embodiment is so novel that it disproves the technical common sense that a structural period greater than or equal to the Rayleigh wavelength should not be introduced from a viewpoint of improving the polarization contrast ratio but improves optical performance a representative example of which is the polarization contrast ratio by introducing a structural period greater than or equal to the Rayleigh wavelength. That is, it can be said that the structure of the split wire element in the first embodiment is a structure unimaginable based on the technical common sense for the skilled in the art, that is, a structure based on the novel technical idea that is not bound to the technical common sense, and that the optical element provided by the first embodiment is highly valuable in that it can achieve performance that exceeds performance limitation imposed by a wire-grid element of related art.

<Method for Manufacturing Split Wire Element in First Embodiment>

The split wire element in the first embodiment is configured as described above, and a method for manufacturing the same will be described below with reference to the drawings.

To manufacture the split wire element in the first embodiment, which has a periodic structure in the y direction, interference exposure applied to a method for manufacturing a typical wire-grid element cannot be used. Instead, the split wire element in the first embodiment can be manufactured by forming a resist mask, for example, by using nano-imprinting and then processing a metal film by using RIE (reactive ion etching). The manufacturing method will be described below.

Figure 19:
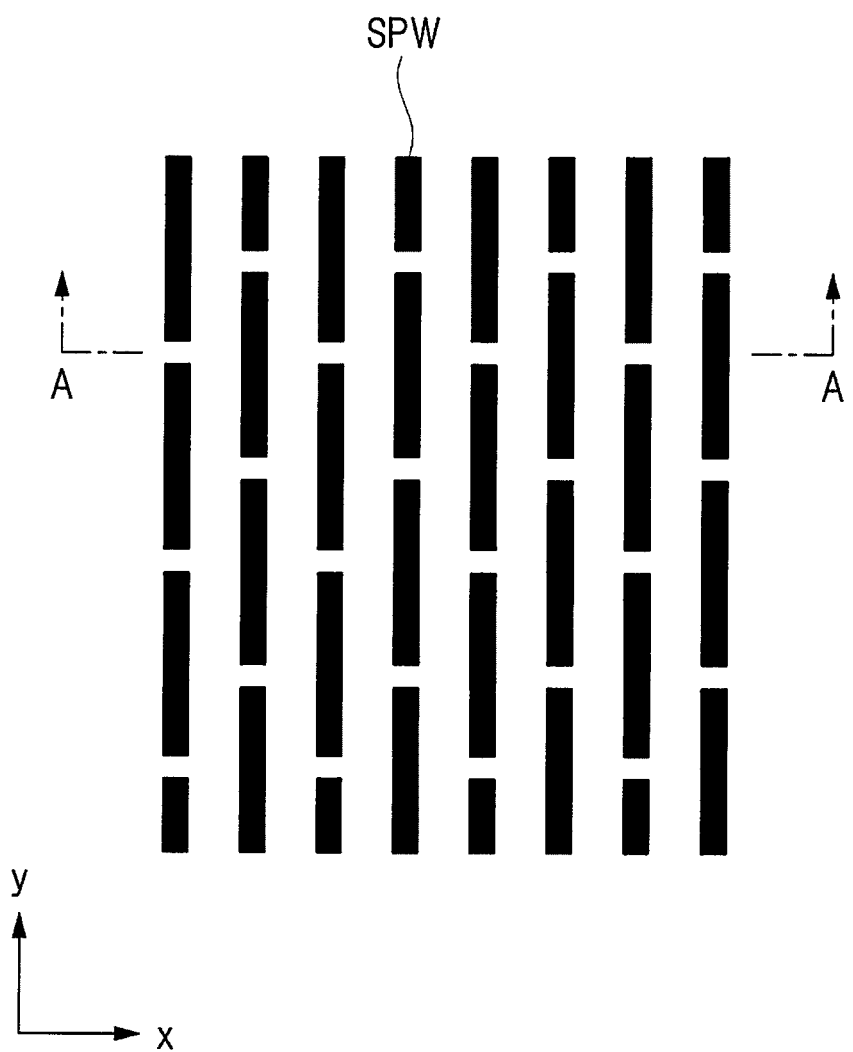
FIG. 19 is a plan view showing a plan-view configuration of the split wire element in the first embodiment.

FIG. 19 is a plan view showing a plan-view configuration of the split wire element in the first embodiment. FIG. 19 shows that a plurality of split wires SPW are arranged in the x direction. Steps of manufacturing the split wire element in the first embodiment will be described with reference to the cross section taken along the line A-A shown in FIG. 19.

In the first embodiment, the split wire element is formed by using nano-imprinting. The nano-imprinting is a technology for micro-processing a substrate by pressing a stamper against the substrate. Since the method for manufacturing the split wire element based on nano-imprinting uses a stamper that is a die for nano-imprinting, a description will first be made of a step of forming the stamper, and a description will then be made of steps of manufacturing the split wire element.

(1) Stamper Formation Step

Figure 20:
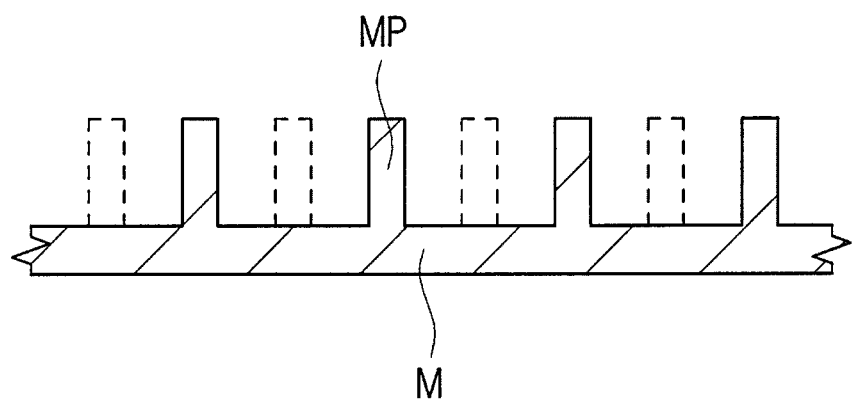
FIG. 20 is a cross-sectional view showing a step of manufacturing the split wire element in the first embodiment.

A master substrate M, which will form a stamper die, is first formed, as shown in FIG. 20. For example, the maser substrate M formed, for example, of a silicon (Si) substrate is so processed that protrusions MP corresponding to the shape of split wires are formed. Specifically, a photoresist film (not shown) is formed on the silicon substrate, and a photolithography technique, in which exposure and development processes are carried out, is used to leave the photoresist film only in regions where the protrusions are formed. The photoresist film is then used as a mask to etch the surface of the silicon substrate to a predetermined depth to form the protrusions MP. The photoresist film left on the protrusions MP is then removed, for example, in an ashing process.

In the step described above, in which the photolithography technique is used, an electron beam drawing method may instead be used. For example, a resist film for electron beam drawing may be formed on the silicon substrate, followed by electron beam drawing for processing the resist film.

Figure 21:
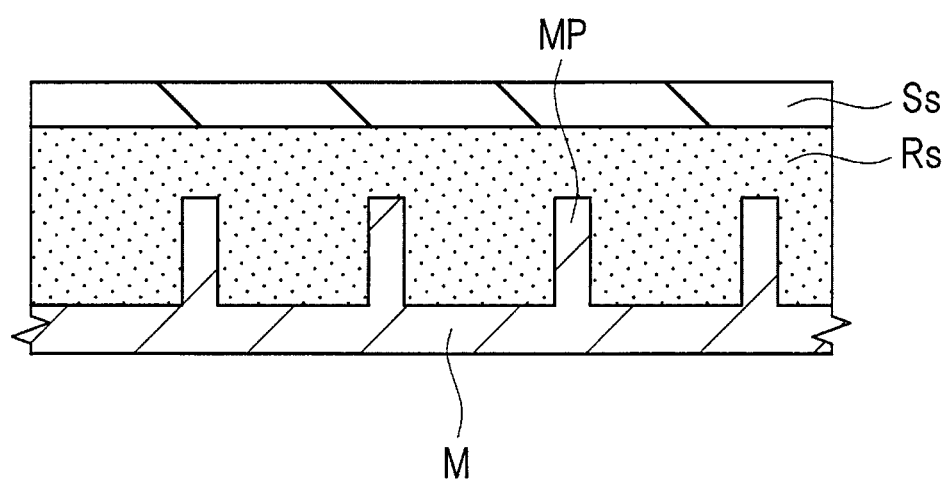
FIG. 21 is a cross-sectional view showing a step of manufacturing the split wire element that follows the step in FIG. 20.
Figure 22:
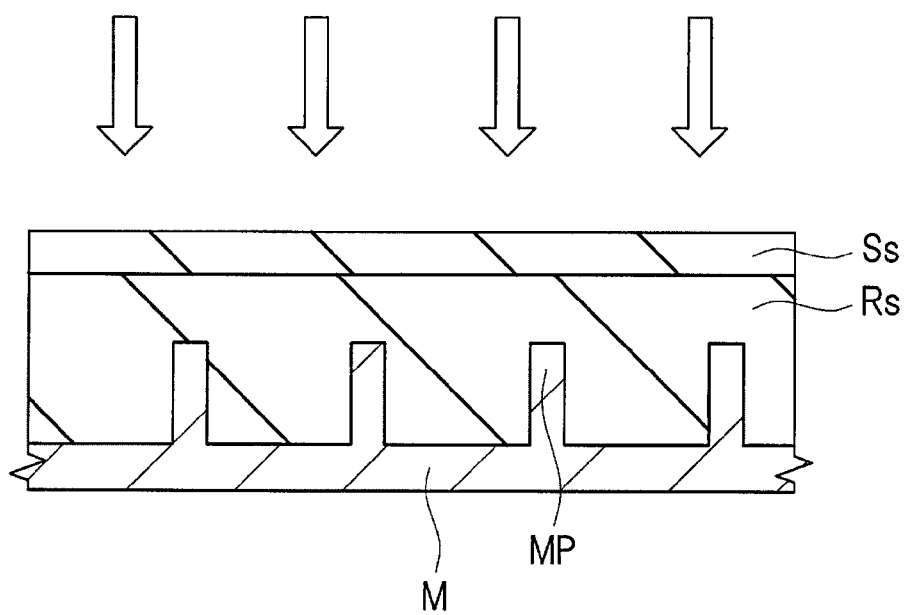
FIG. 22 is a cross-sectional view showing a step of manufacturing the split wire element that follows the step in FIG. 21.

A UV curable resin Rs, which cures when irradiated with UV light, is subsequently applied onto the master M, as shown in FIG. 21. A stamper support substrate Ss is then placed on the UV curable resin Rs. The support substrate Ss is formed, for example, of a light-transmissive resin substrate. The UV curable resin Rs is then irradiated with UV light through the support substrate Ss, as shown in FIG. 22. The applied UV curable resin Rs thus cures.

Figure 23:
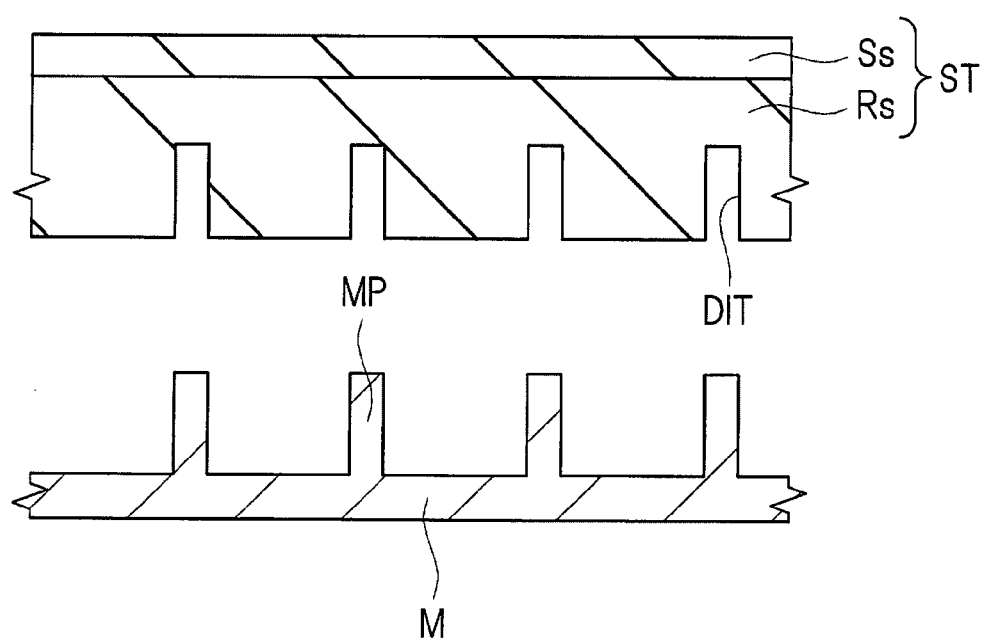
FIG. 23 is a cross-sectional view showing a step of manufacturing the split wire element that follows the step in FIG. 22.

The UV curable resin Rs and the support substrate Ss are then stripped off the master M, as shown in FIG. 23. A stamper ST formed of the support substrate Ss and the UV curable resin Rs is thus formed. At this point, the protrusions MP of the master M are transferred to the UV curable resin Rs of the stamper ST, whereby ditches (recesses) DIT corresponding to the protrusions MP are formed.

(2) Split Wire Element Formation Step

The split wire element is subsequently formed by using the nano-imprinting used to form the stamper ST described above. The step of forming the split wire element will be described below.

Figure 24:
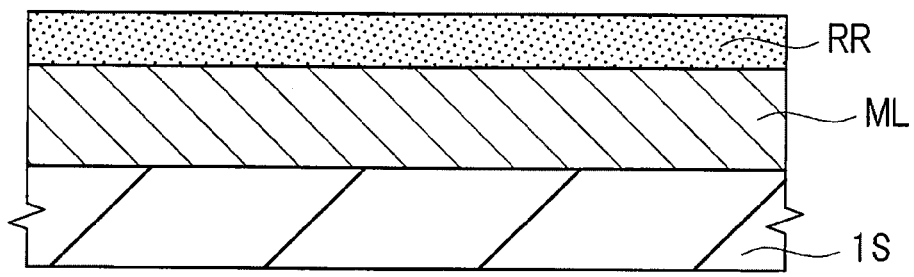
FIG. 24 is a cross-sectional view showing a step of manufacturing the split wire element that follows the step in FIG. 23.

A glass substrate or any other suitable substrate is first provided as a light-transmissive substrate 1S, as shown in FIG. 24. The substrate 1S has, for example, the shape of a substantially disk-shaped wafer. An aluminum layer (Al layer) or any other suitable layer is formed as a metal layer ML on the substrate 1S, for example, in a sputtering process. A resist resin RR is then applied onto the metal layer ML. The resist resin RR can, for example, be a UV curable resin.

Figure 25:
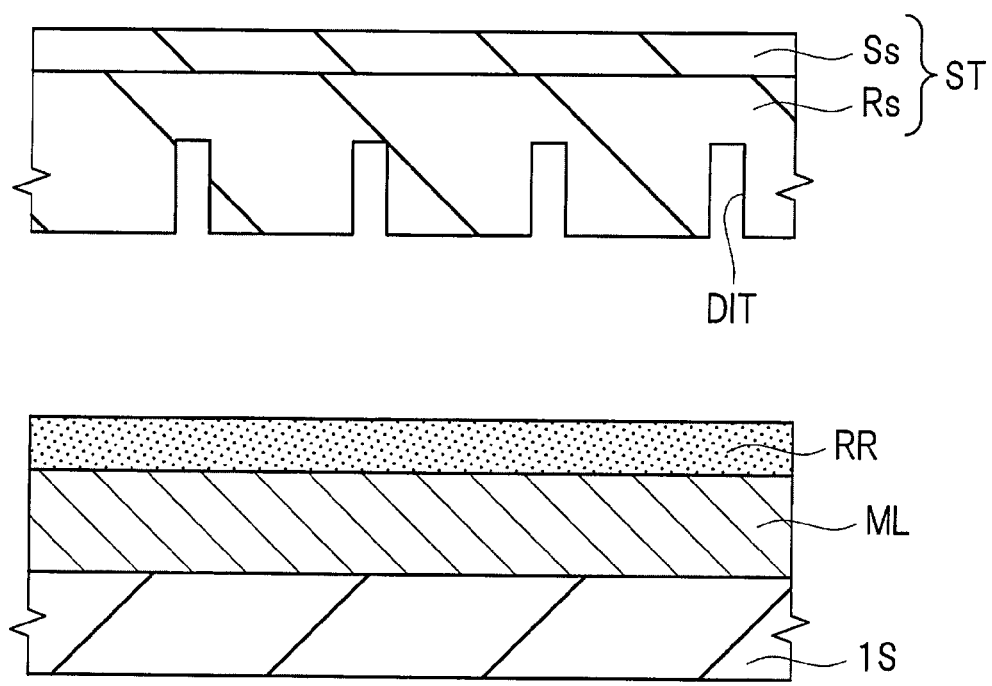
FIG. 25 is a cross-sectional view showing a step of manufacturing the split wire element that follows the step in FIG. 24.

The stamper ST is then placed on the upper side of the substrate 1S and pressed against the upper surface of the substrate 1S, as shown in FIG. 25. The interior of each of the ditches DIT of the stamper ST are therefore filled with the resist resin RR. In this process, the amount of applied resist resin RR and the pressure at which the stamper ST is pressed against the substrate 1S are so adjusted that the interior of each of the ditches DIT is filled with the resist resin RR in a precise manner.

Figure 26:
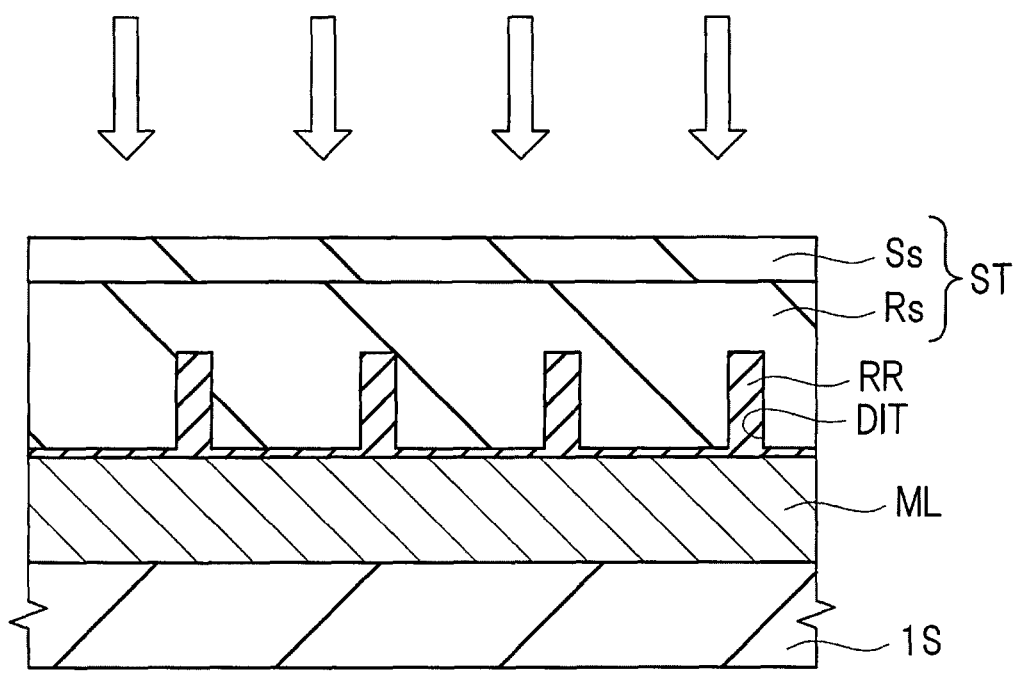
FIG. 26 is a cross-sectional view showing a step of manufacturing the split wire element that follows the step in FIG. 25.

The resist resin RR is subsequently irradiated with UV light through the stamper ST, as shown in FIG. 26. The resist resin RR thus cures. The UV light used in this step is, for example, UV light having a wavelength longer than that of the UV light used in the step of manufacturing the stamper ST. Carrying out the present step by using UV light having a wavelength longer than the wavelength of the UV light used in the step of manufacturing the stamper ST, that is, the wavelength of UV light for curing the stamper ST prevents the stamper ST from deteriorating.

Figure 27:
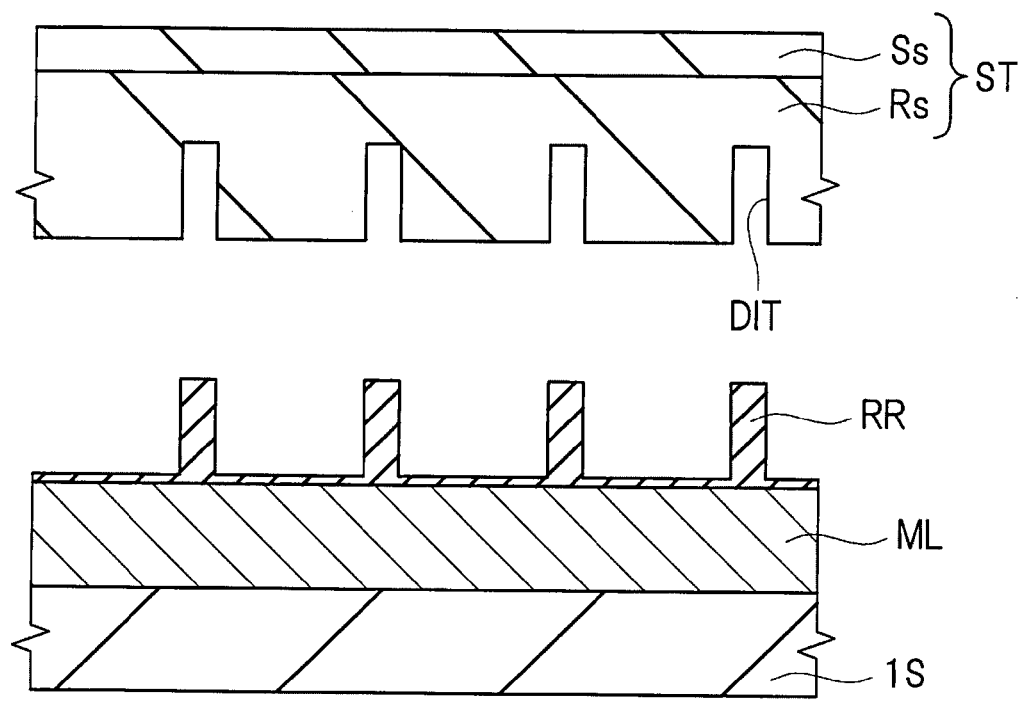
FIG. 27 is a cross-sectional view showing a step of manufacturing the split wire element that follows the step in FIG. 26.

The resist resin RR is then stripped off the stamper ST, as shown in FIG. 27. The shape of the ditches DIT of the stamper ST is thus transferred to the resist resin RR. That is, the resist resin RR formed on the metal layer ML has protrusions corresponding to the ditches DIT.

Figure 28:
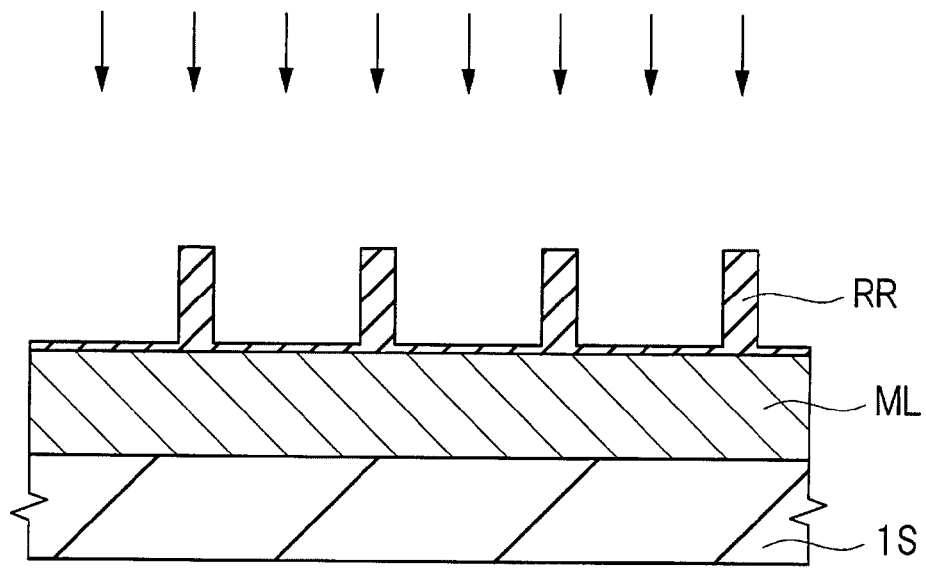
FIG. 28 is a cross-sectional view showing a step of manufacturing the split wire element that follows the step in FIG. 27.
Figure 29:
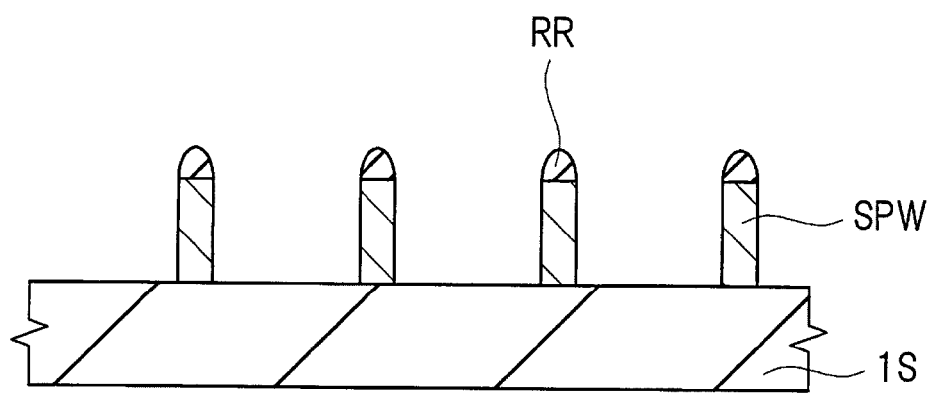
FIG. 29 is a cross-sectional view showing a step of manufacturing the split wire element that follows the step in FIG. 28.

The metal layer ML is then dry etched by using the processed resist resin RR as a mask, as shown in FIG. 28. An etching gas can, for example, be a $Cl_2$ gas (chlorine gas), a $BCl_3$ gas, or a gas that is a combination thereof. The etching gas may be ionized. The dry etching allows formation of split wires SPW, which form a pattern of the metal layer ML, in correspondence with the protrusions of the resist resin RR, as shown in FIG. 29.

Figure 30:
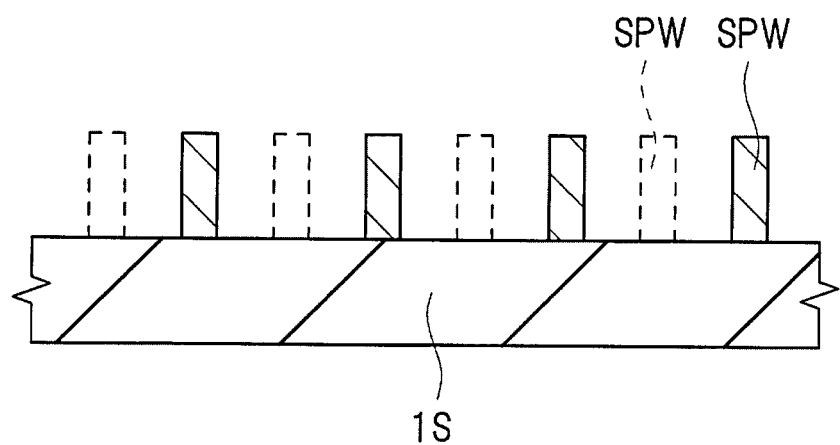
FIG. 30 is a cross-sectional view showing a step of manufacturing the split wire element that follows the step in FIG. 29.

The resist resin RR left on the upper side of the split wires SPW formed of the metal layer ML is then removed, for example, in an ashing process. An ashing gas can, for example, be a gas primarily made of an $O_2$ gas (oxygen gas). The substrate 1S is then diced along dicing lines to form the split wire element in the first embodiment, as shown in FIG. 30. As described above, in the first embodiment, the split wire element can be manufactured at low cost by using nano-imprinting.

<Comparison with Related Technologies>

The split wire element in the first embodiment will now be compared with related technologies to clarify differences therebetween.

Figure 31:
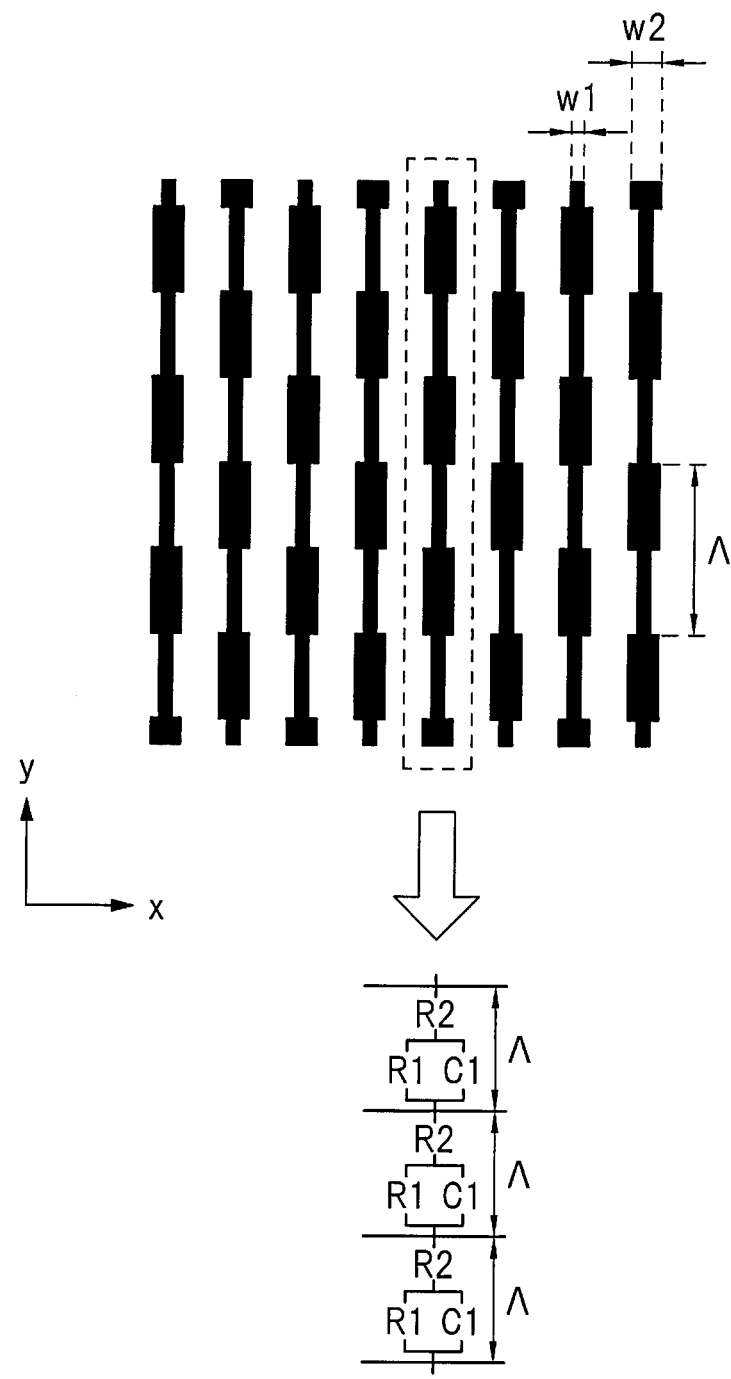
FIG. 31 shows an equivalent circuit of an optical element having a periodic structure in the y direction that interacts with light incident thereon.

FIG. 31 shows an equivalent circuit of an optical element having a periodic structure in the y direction that interacts with light incident thereon. As shown in FIG. 31, in the optical element, the width of each metal wire is modulated in the y direction, which is the longitudinal direction of the metal wire, in such a way that the width is formed of a width w1 and a width w2 (width w1<width w2), and the period between the two widths is Λ. The equivalent circuit of the thus configured optical element is formed of a resistor R2 and a component formed of a resistor R1 and a capacitive element C1 connected in parallel to each other to show, among others, that the portion having the width w2 has a capacitive element, and the resistor R2 and the component are periodically connected in series to each other. In the optical element expressed by the equivalent circuit described above, the impedance of the metal wire that interacts with s-polarized light can also be adjusted. However, in the optical element, which includes the resistor R1 connected in parallel to the capacitive element C1, the impedance adjustment range is narrower than that in the split wire element in the first embodiment. Based on the fact described above, it is believed that optical performance a representative example of which is the polarization contrast ratio and other types of performance of the optical element are inferior to those of the split wire element in the first embodiment.

A description will be made of a difference between the technology described in JP-A-2011-123474 and the technical idea in the first embodiment. JP-A-2011-123474 describes a technology of an optical element that is a wire-grid element having metal wires on a light-transmissive substrate and has an additional function of selectively absorbing unnecessary polarized light based on periodic protrusions formed on the upper end of each of the metal wires. An equivalent circuit of the optical element is the same as that shown in FIG. 31 because it can be said that the width of the metal wires are modulated in the optical element shown in FIG. 31 whereas the height of the metal wires are modulated in the optical element described in JP-A-2011-123474. As a result, it is believed that the optical performance a representative example of which is the polarization contrast ratio and other types of performance of the optical element described in JP-A-2011-123474 are inferior to those of the split wire element in the first embodiment.

Further, in JP-A-2011-123474, since the height of the protrusions is limited to a value within a range from 10 to 50 nm, and the height of the protrusions is smaller than the height of the metal wires, no perfect gaps, such as those in the split wire element in the first embodiment, are formed. In this regard, the optical element described in JP-A-2011-123474 greatly differs from the split wire element in the first embodiment in terms of configuration.

A description will next be made of a difference between the technology described in JP-A-2009-104074 and the split wire element in the first embodiment. JP-A-2009-104074 describes a technology of an optical element that has metal wires disposed in a glass layer in what is called a checker flag pattern so that one type of polarized light is converted into another type of polarized light.

In this regard, the split wire element in the first embodiment differs from the optical element described in JP-A-2009-104074 in terms of the following points: That is, a first difference is a function provided by the optical element. Specifically, the optical element described in JP-A-2009-104074 has a function of converting one type of polarized light into another type of polarized light, whereas the split wire element in the first embodiment provides a function as a polarizing filter that selectively transmits specific polarized light. A second difference is the pattern of the metal wires. Specifically, JP-A-2009-104074 describes that the interval between metal wires described therein (L1) is desirably smaller than or equal to $\lambda/4$, where $\lambda$ represents the wavelength of incident light. Since the wavelength $\lambda$ of incident light is 688 nm in JP-A-2009-104074, the interval (L1) is desirably smaller than or equal to 172 nm. In this case, in the technology described in JP-A-2009-104074, the period $\Lambda$ is 300 nm+172 nm=472 nm, and L1/$\Lambda$ is 36%. As a result, the technology described in JP-A-2009-104074 includes a condition that does not satisfy the relationship of $1\% \leq S/\Lambda \leq 10\%$, which is the desirable range from the viewpoint of improving the polarization contrast ratio, in the first embodiment. In this regard, the split wire element in the first embodiment differs from the optical element described in JP-A-2009-104074 in terms of configuration.

Second Embodiment

<Basic Idea in Second Embodiment>

As described in the first embodiment, the split wire element in the first embodiment, which receives light having a narrow wavelength range from a light source used with the split wire element, such as a laser and an LED, can provide an excellent polarization contrast ratio. For example, as shown in FIG. 18B, when the wavelength of incident light is 450 nm, the split wire element in the first embodiment described above can provide a polarization contrast ratio of as high as about 200,000. On the other hand, when the wavelength of the incident light is greater than or equal to 480 nm, the polarization contrast ratio of the split wire element in the first embodiment described above is smaller than the polarization contrast ratio of the wire-grid element formed of straight wires, as shown in FIG. 18B. That is, when it is necessary to achieve a satisfactory polarization contrast ratio over a wider wavelength range, the split wire element in the first embodiment described above cannot adequately meet the requirement, which means that there is room for further improvement.

To meet the requirement, in a second embodiment, a description will be made of a split wire element that can provide an excellent polarization contrast ratio over a wide wavelength range including, for example, a blue wavelength band having a wavelength range from 400 to 500 nm.

As described in the first embodiment, it is believed that the polarization contrast ratio of the split wire element is improved because a resonance phenomenon that occurs in response to s-polarized light incident on the split wire element increases the amount of reflection or absorption of the s-polarized light, resulting in a decrease in the amount of s-polarized light leakage component that passes through the split wire element. It is therefore conceivable that the polarization contrast ratio can be improved over a wider wavelength range if the resonance phenomenon that allows an increase in the amount of reflection or absorption of s-polarized light is allowed to occur over a wide wavelength region. That is, a basic idea in the second embodiment resides in a configuration that allows the resonance phenomenon that increases the amount of reflection or absorption of s-polarized light to occur over a wide wavelength region. An outline of the basic idea will be described below.

Figure 32:
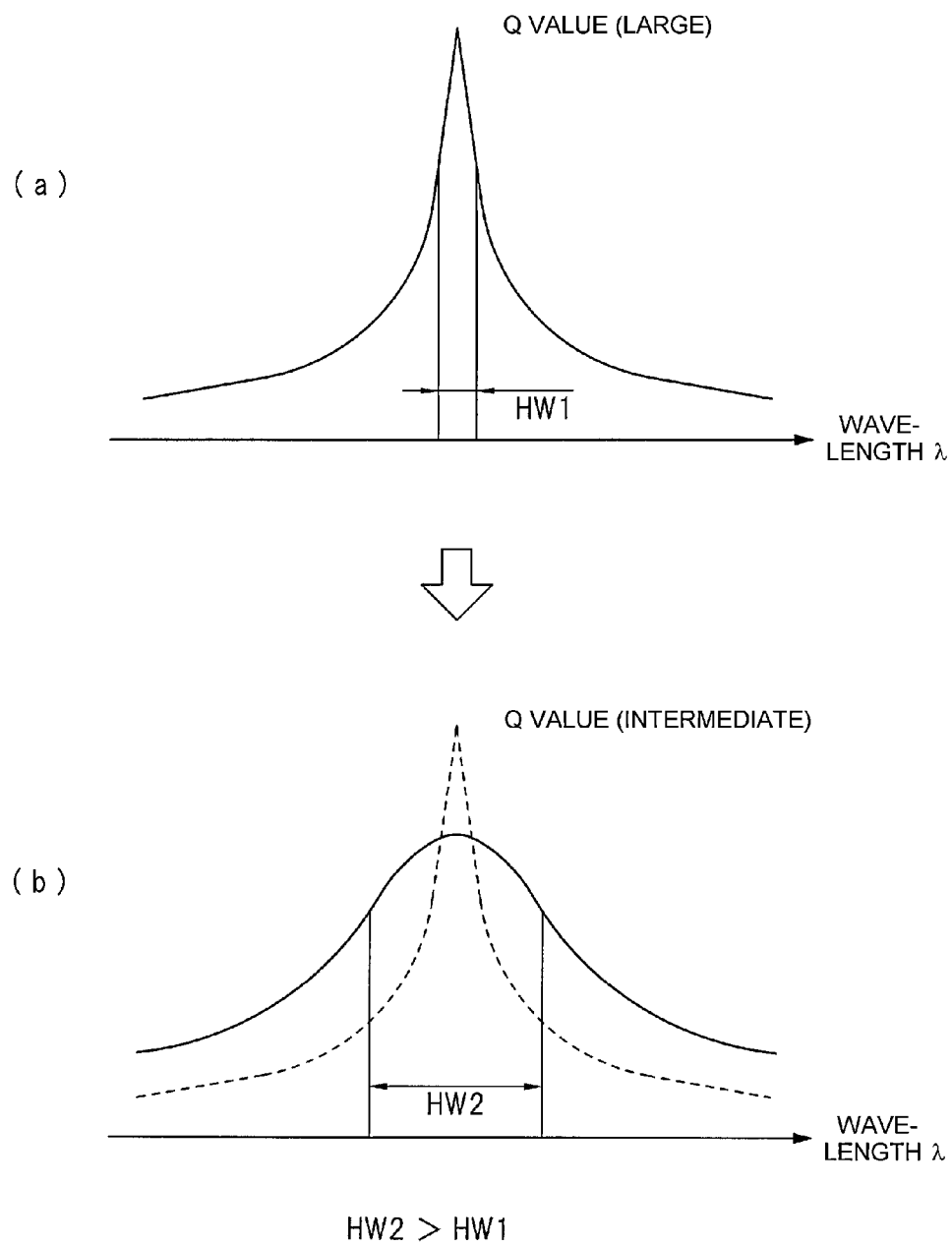
FIG. 32 shows diagrammatic views wherein (a) shows a case where the resonance phenomenon has a large Q value, and (b) shows a case where the resonance phenomenon has a Q value smaller than in the case shown in (a) in FIG. 32.

(a) in FIG. 32 is a diagrammatic view showing a case where the resonance phenomenon has a large Q value. As shown in (a) in FIG. 32, a large Q value results in a steep peak and a narrow half width HW1. This means that the wavelength range within the half width HW1 is narrow, which means that the wavelength region where the resonance phenomenon occurs narrows. It is understood in this case that the wavelength region where the resonance phenomenon that allows an increase in the amount of reflection or absorption of s-polarized light occurs narrows, and that the wavelength region where the polarization contrast ratio is improved is restricted accordingly.

In this regard, (b) in FIG. 32 is a diagrammatic view showing a case where the resonance phenomenon has a Q value smaller than in the case shown in (a) in FIG. 32. As shown in (b) in FIG. 32, an intermediate Q value results in a gentle peak and a half width HW2 wider than the half width HW1 shown in (a) in FIG. 32. This means that the wavelength range within the half width HW2 increases, which means that the wavelength region where the resonance phenomenon occurs increases. It is believed in this case that the wavelength region where the resonance phenomenon that allows an increase in the amount of reflection or absorption of s-polarized light occurs increases, whereby the wavelength region where the polarization contrast ratio is improved increases.

As described above, according to the basic idea in the second embodiment, the resonance phenomenon that allows an increase in the amount of reflection or absorption of s-polarized light is allowed to occur over a widened wavelength range by lowering the Q value to some extent to increase the wavelength range within the half width HW2. A description will be made of the configuration of the split wire element in the second embodiment that realizes the basic idea.

<Configuration of Split Wire Element in Second Embodiment>

Figure 33:
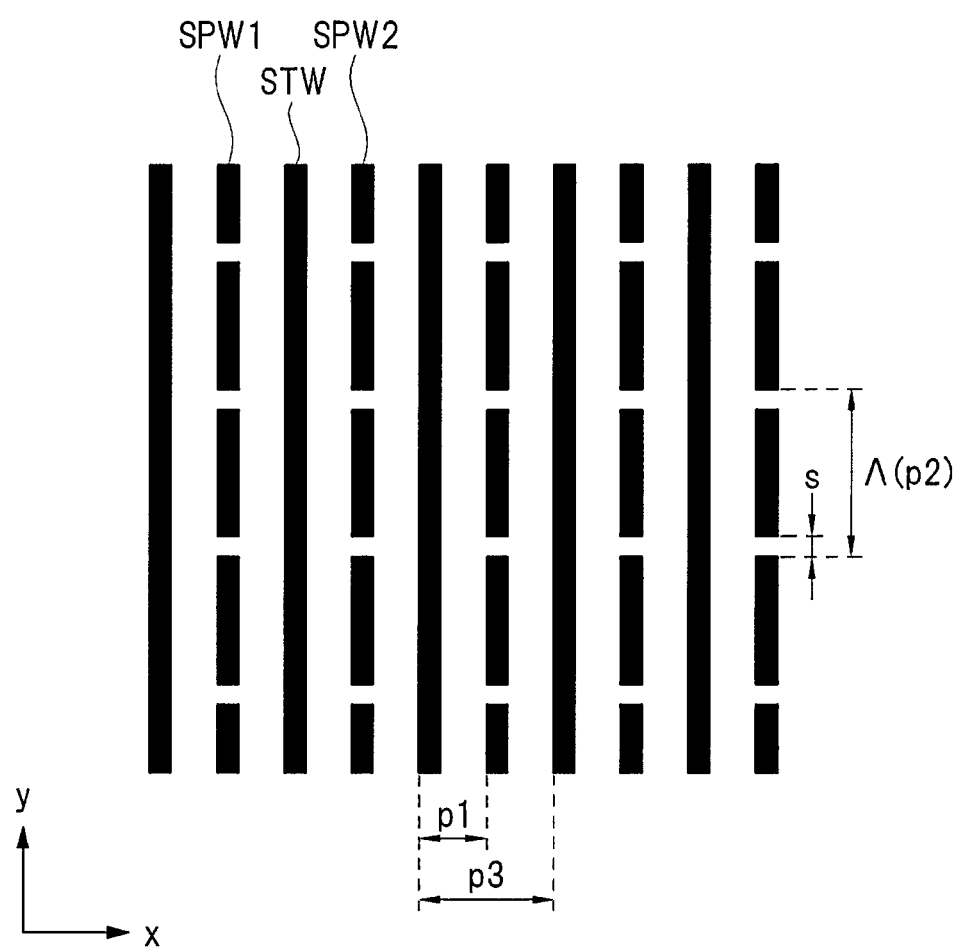
FIG. 33 is a plan view showing the configuration of a split wire element in a second embodiment.

FIG. 33 is a plan view showing the configuration of the split wire element in the second embodiment. As shown in FIG. 33, in the split wire element in the second embodiment, a single straight wire STW is so disposed that it is sandwiched between a split wire SPW1 and a split wire SPW2, each of which has gaps periodically formed in the y direction. In the thus configured split wire element in the second embodiment, the structural period includes a period p1 between the split wire SPW1 and the straight wire STW adjacent to each other, a period $\Lambda$ between the gaps s in the y direction, and a period p3 between the split wire SPW1 and the split wire SPW2, which sandwich gaps s in the x direction.

In this configuration, the period $\Lambda$ is greater than or equal to $\lambda/n$, where $\lambda$ represents the wavelength of an incident electromagnetic wave and n represents the refractive index of the substrate. Further, the period p1 in the x direction is smaller than $\lambda/n$, whereas the period p3 in the x direction is greater than $\lambda/n$.

The second embodiment is characterized in that the single straight wire STW is so disposed that it is sandwiched between the split wire SPW1 and the split wire SPW2. Therefore, the split wire element in the second embodiment is not formed only of split wires but has a configuration in which split wires and straight wires that differ from each other in terms of structure are mixed with each other, unlike the split wire element in the first embodiment described above.

In this case, since each of the split wires can be expressed, for example, by an equivalent circuit in the form of an RC series circuit, the impedance of the split wire that interacts with s-polarized light is frequency dependent (in other words, wavelength dependent), which allows the resonance phenomenon that allows an increase in the amount of reflection or absorption of s-polarized light to occur. On the other hand, since each of the straight wires can be expressed by an equivalent circuit in the form of a resistor series circuit, the impedance of the straight wire that interacts with s-polarized light is not frequency dependent but is flat, which does not allow the resonance phenomenon to occur.

It is qualitatively understood based on the above description that the more the number of split wires that affect the resonance phenomenon, the greater the Q value of the resonance phenomenon. That is, in the split wire element in the first embodiment described above, in which all the metal wires are each formed of a split wire, the resonance phenomenon has a large Q value. On the other hand, in the split wire element in the second embodiment, in which a single straight wire is inserted or sandwiched between a pair of split wires, the number of split wires that affect the resonance phenomenon substantially decreases. As a result, according to the split wire element in the second embodiment, the Q value of the resonance phenomenon can be lowered to an intermediate value. This means that the half width HW2 increases, as described with reference to FIGS. 32A and 32B, whereby the wavelength region where the resonance phenomenon occurs can be increased. That is, the configuration of the split wire element in the second embodiment can provide an excellent polarization contrast ratio over a widened wavelength range. A description will be made of results of a simulation that supports the advantageous effect described above.

<Dependence of Split Wire Element on Wavelength in Blue Wavelength Band>

Figure 34A:
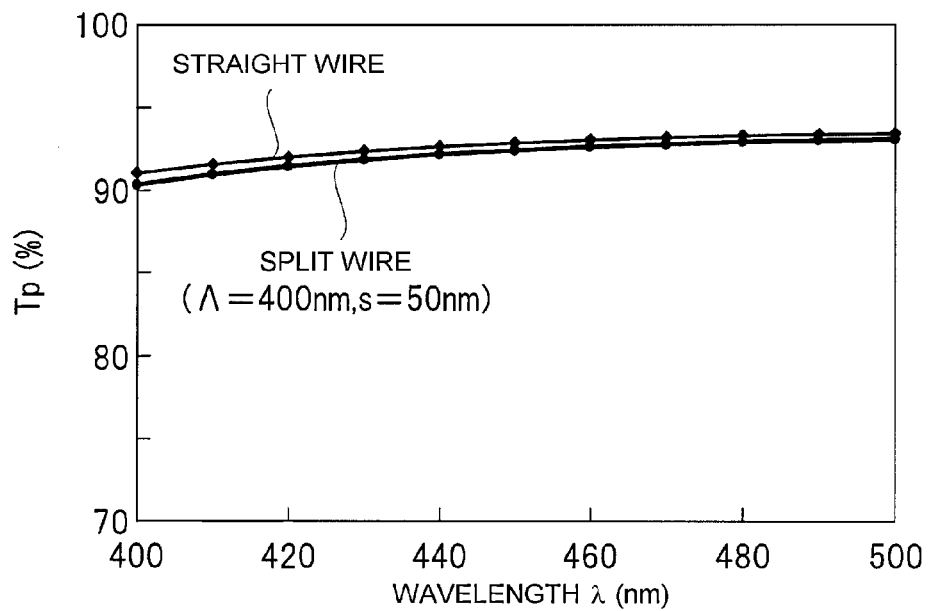
FIG. 34A shows graphs illustrating the relationship between the wavelength of incident light and the transmittance for p-polarized light.
Figure 34B:
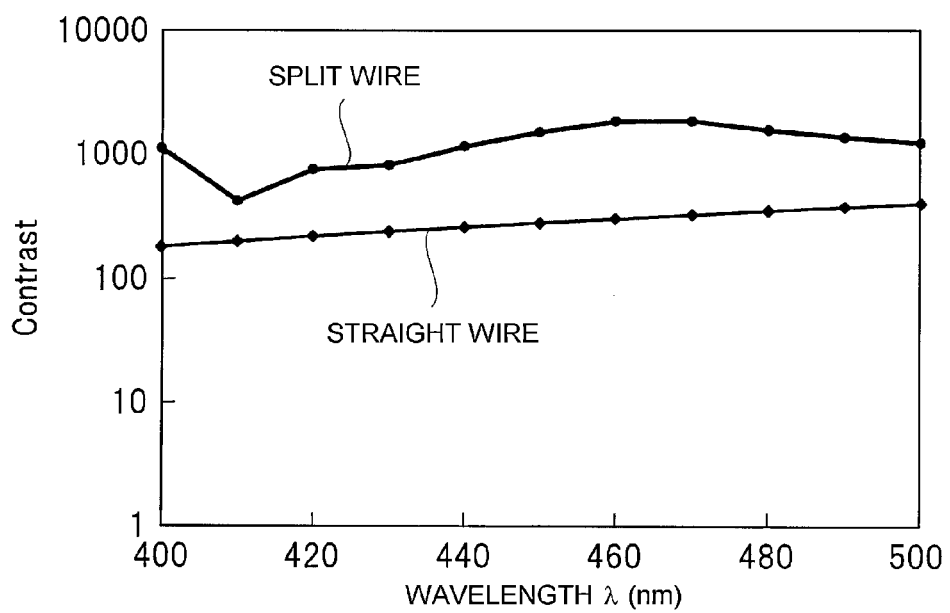
FIG. 34B shows graphs illustrating the relationship between the wavelength of the incident light and the polarization contrast ratio.

FIGS. 34A and 34B show simulation results showing dependence of the split wire element in the second embodiment on the wavelength in the blue wavelength band. Parameters necessary for the simulation are set as follows: The period p1 in the x direction between a split wire and a straight wire adjacent to each other is 135 nm; the width w of the split wires and the straight wires is 45 nm; the height h of the split wires and the straight wires is 130 nm; the period Λ in the y direction in each of the split wires is 400 nm; and the size of the gaps s is 50 nm. FIGS. 34A and 34B also show results of the simulation on a wire-grid element formed of straight wires for comparison purposes.

FIG. 34A shows graphs illustrating the relationship between the wavelength of incident light and the transmittance for p-polarized light. As shown in FIG. 34A, Tp of the split wire element in the second embodiment substantially agrees with Tp of the wire-grid element.

FIG. 34B shows graphs illustrating the relationship between the wavelength of the incident light and the polarization contrast ratio. FIG. 34B shows that the polarization contrast ratio of the split wire element in the second embodiment is greater than that of the wire-grid element formed of straight wires over the entire blue wavelength band.

As described above, according to the split wire element in the second embodiment, it is found that the simulation results also support that the polarization contrast ratio can be improved over a wide wavelength range including, for example, the blue wavelength band.

<Wavelength Dependence for Obliquely Incident Light>

Figure 35:
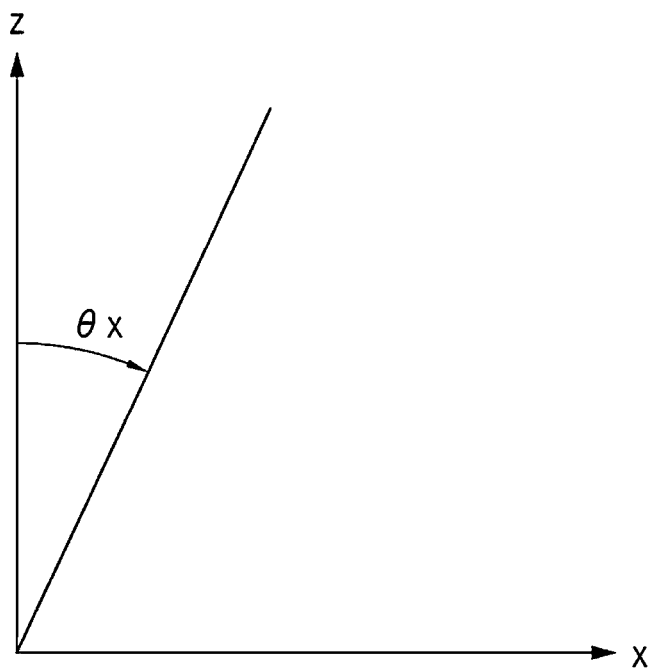
FIG. 35 describes the angle of incidence of incident light inclined toward the x direction.

A description will subsequently be made of wavelength dependence of the split wire element in the second embodiment on which incident light is obliquely incident. The description will be specifically made, for example, of a case where the incident light is inclined toward the x direction by 20 degrees ($\theta x=20°$). FIG. 35 describes the angle of incidence of the incident light inclined toward the x direction. In the present specification, the angle of incidence $\theta x$ of the incident light inclined toward the x direction is defined to be the angle with respect to the z axis in the xz plane, as shown in FIG. 35.

Figure 36A:
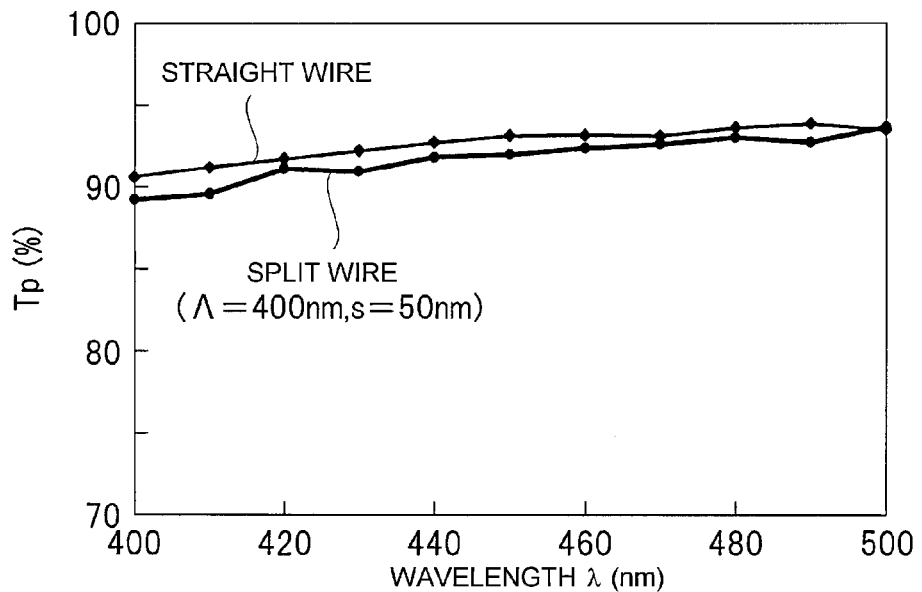
FIG. 36A shows graphs illustrating the relationship between the wavelength of the incident light and the transmittance for p-polarized light.
Figure 36B:
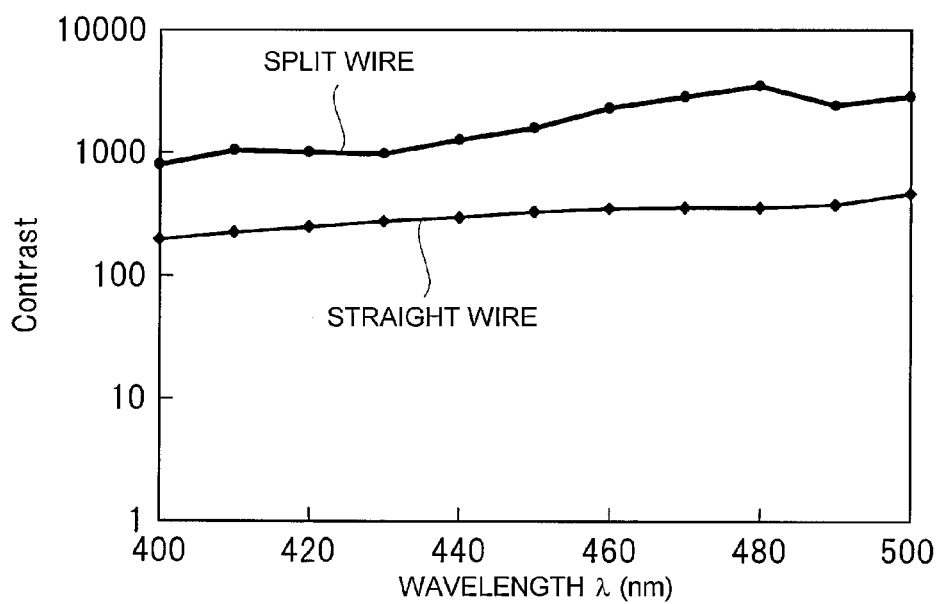
FIG. 36B shows graphs illustrating the relationship between the wavelength of the incident light and the polarization contrast ratio.

FIGS. 36A and 36B show simulation results showing the dependence of the split wire element in the second embodiment on the wavelength in the blue wavelength band. FIG. 36A shows graphs illustrating the relationship between the wavelength of the incident light and the transmittance for p-polarized light. FIG. 36A shows that Tp of the split wire element in the second embodiment substantially agrees with Tp of the wire-grid element even when the incident light is inclined toward the x direction by 20 degrees.

FIG. 36B shows graphs illustrating the relationship between the wavelength of the incident light and the polarization contrast ratio. FIG. 36B shows that the polarization contrast ratio of the split wire element in the second embodiment is greater than that of the wire-grid element formed of straight wires over the entire blue wavelength band.

Figure 37:
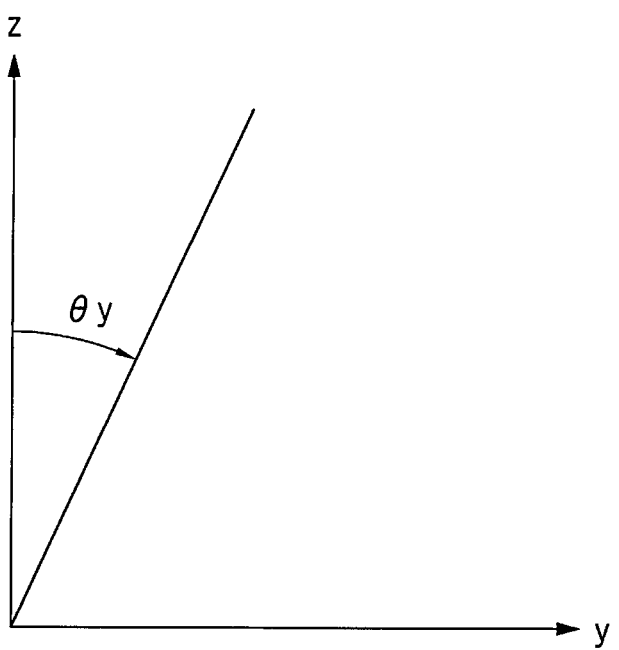
FIG. 37 describes the angle of incidence of incident light inclined toward the y direction.

A description will next be made of a case where the incident light is inclined toward the y direction by 20 degree ($\theta y=20°$). FIG. 37 describes the angle of incidence of the incident light inclined toward the y direction. In the present specification, the angle of incidence $\theta y$ of the incident light inclined toward the y direction is defined to be the angle with respect to the z axis in the yz plane, as shown in FIG. 37.

Figure 38A:
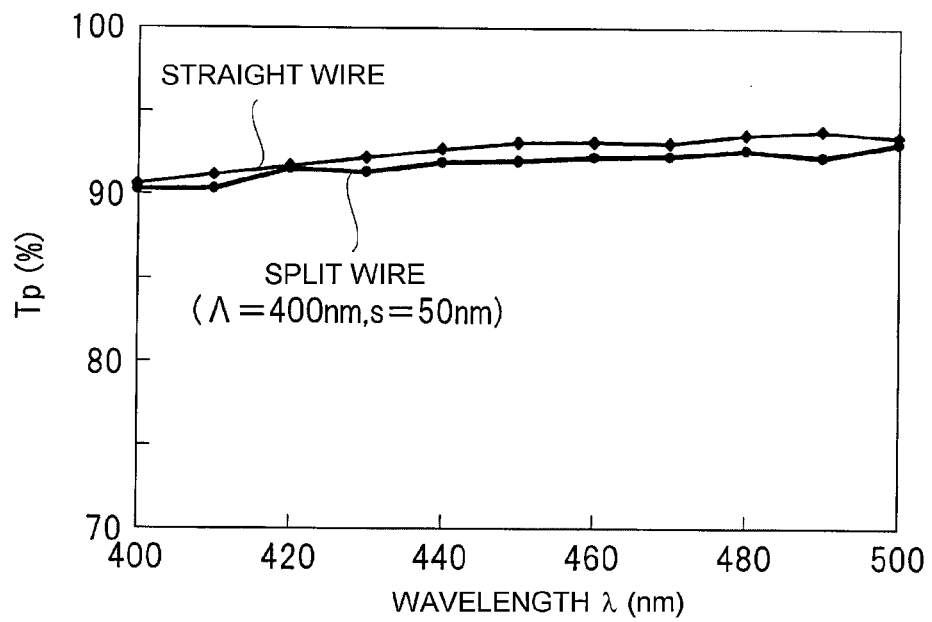
FIG. 38A shows graphs illustrating the relationship between the wavelength of the incident light and the transmittance for p-polarized light.
Figure 38B:
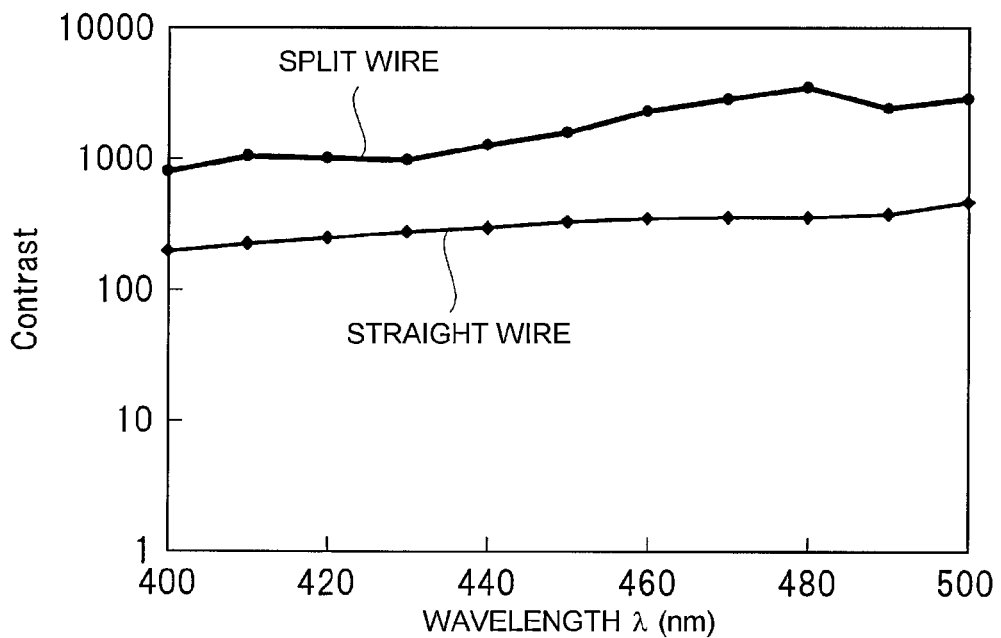
FIG. 38B shows graphs illustrating the relationship between the wavelength of the incident light and the polarization contrast ratio.

FIGS. 38A and 38B show simulation results showing the dependence of the split wire element in the second embodiment on the wavelength in the blue wavelength band. FIG. 38A shows graphs illustrating the relationship between the wavelength of the incident light and the transmittance for p-polarized light. FIG. 38A shows that Tp of the split wire element in the second embodiment substantially agrees with Tp of the wire-grid element also when the incident light inclined toward the y direction by 20 degrees is incident on the split wire element.

FIG. 38B shows graphs illustrating the relationship between the wavelength of the incident light and the polarization contrast ratio. FIG. 38B shows that the polarization contrast ratio of the split wire element in the second embodiment is undesirably smaller than that of the wire-grid element in a wavelength range from 420 nm to 450 nm. The phenomenon can be interpreted as follows: That is, the phenomenon results, for example, from the fact that oblique incidence inclined toward the y direction causes a component of the wave number vector of s-polarized light, specifically, the component in the z direction to have a value $k \cos \theta y$ and another component of the wave number vector, specifically, the component in the y direction to have a value $k \sin \theta y$, where k represent the magnitude of the wave number vector of s-polarized light. That is, the wave number affected by the period Λ of the split wire element is fixed at $2\lambda/\Lambda$, whereas oblique incidence causes the wave number vector in the y direction and the wave number vector in the z direction to differ from those in the case of perpendicular incidence. It is believed in this case that a change in the resonance condition causes the phenomenon described above to occur.

As described above, the split wire element in the second embodiment can provide a satisfactory polarization contrast ratio over a widened wavelength range (over entire blue wavelength band) as compared with the split wire element in the first embodiment described above. On the other hand, since the polarization contrast ratio decreases depending on the wavelength in the case of oblique incidence inclined toward the y direction as described with reference to FIG. 38B, it can be said that the split wire element in the second embodiment is suitably applied to an optical apparatus on which incident light is incident at an angle of incidence of roughly 90 degrees, for example, at θy smaller than about 10 degrees. In the second embodiment, there is room for improvement in the performance for oblique incidence inclined toward the y direction, and an idea about the improvement will be described in the following third embodiment.

Third Embodiment

<Basic Idea in Third Embodiment>

In a third embodiment, a description will be made of a split wire element that is intended to be used in a liquid crystal projector and can not only provide an excellent polarization contrast ratio over the blue wavelength band including the wavelength range from 400 nm to 500 nm but also maintain the polarization contrast ratio over an incident angle range up to 20 degrees.

In the split wire element in the second embodiment described above, the polarization contrast ratio decreases depending on the wavelength in the case of oblique incidence inclined toward the y direction, as described above. The reason for this is conceivably that the wave number vector in the y direction and the wave number vector in the z direction in the case of oblique incidence differ from those in the case of perpendicular incidence, which causes the resonance condition to change and hence prevent the resonance phenomenon from occurring in the case of oblique incidence, unlike the case of perpendicular incidence where the resonance phenomenon occurs.

In view of the fact described above, it is believed, for example, that the polarization contrast ratio can be improved even in the case of oblique incidence if the resonance phenomenon that allows an increase in the amount of reflection or absorption of s-polarized light is allowed to occur even in the case of oblique incidence. That is, it is believed that the polarization contrast ratio can be improved in the case of oblique incidence by configuring a split wire element in such a way that a wavelength region of interest still falls within the range where the resonance phenomenon occurs even when the oblique incidence changes the resonance condition. This means that the resonance phenomenon that allows an increase in the amount of reflection or absorption of s-polarized light only needs to be allowed to occur in a still wider wavelength region than in the second embodiment described above. A basic idea in the third embodiment resides in this point. An outline of the basic idea will be described.

Figure 39:
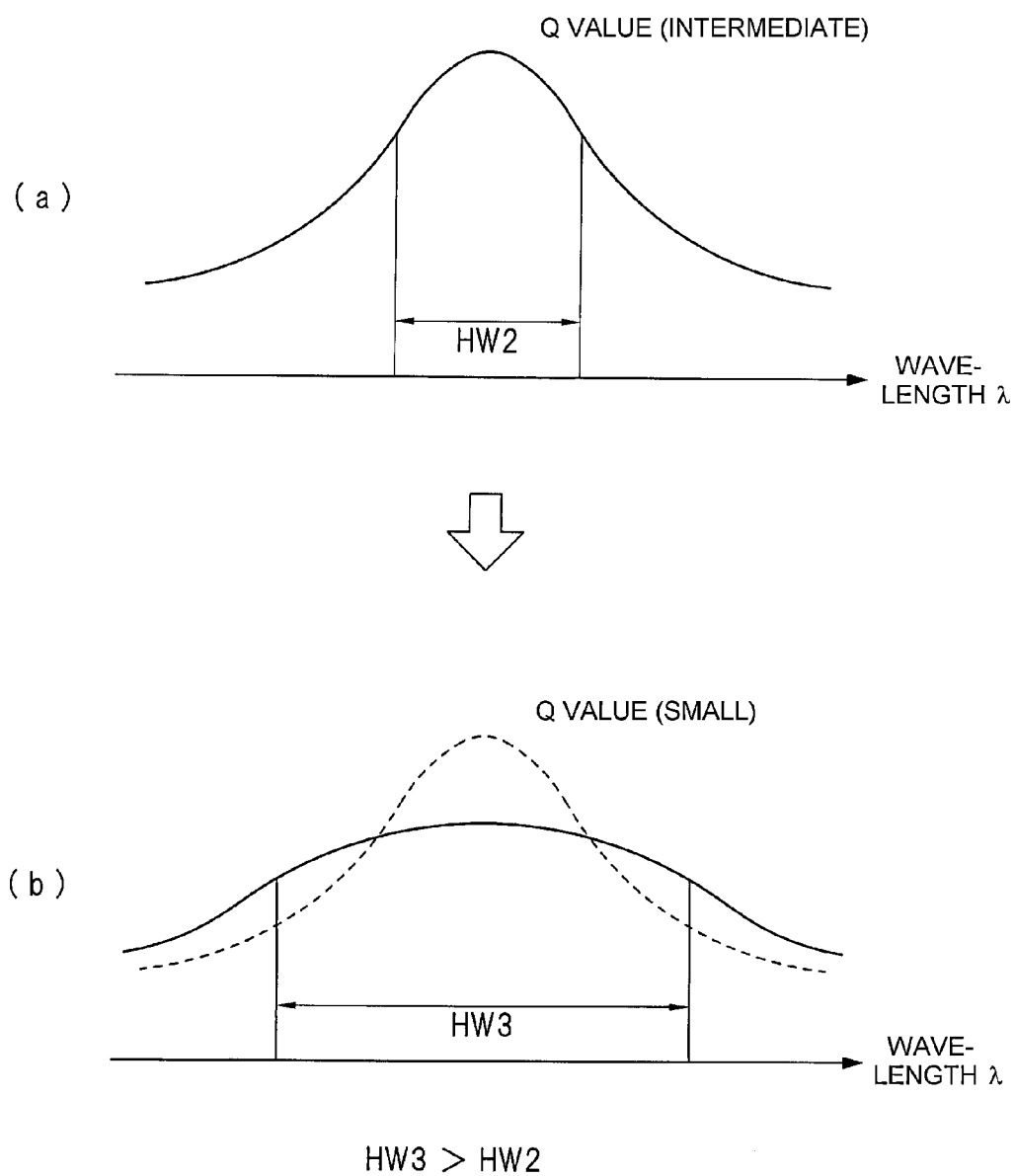
FIG. 39 shows diagrammatic views wherein (a) shows a case where the resonance phenomenon has an intermediate Q value in correspondence with the second embodiment, and (b) shows a case where the resonance phenomenon has a Q value further smaller than the Q value in (a) in FIG. 39.

(a) in FIG. 39 is a diagrammatic view showing a case where the resonance phenomenon has an intermediate Q value in correspondence with the second embodiment described above. As shown in (a) in FIG. 39, when the Q value is an intermediate value, the resonance phenomenon occurs primarily in the wavelength range within the half width HW2.

In this regard, (b) in FIG. 39 is a diagrammatic view showing a case where the resonance phenomenon has a Q value further smaller than in the case in (a) in FIG. 39. As shown in (b) in FIG. 39, when the Q value is smaller, the peak is further gentler, and a half width HW3 is wider than the half width HW2 in (a) in FIG. 39. This means that the wavelength range within the half width HW3 increases, which means that the wavelength region where the resonance phenomenon occurs increases. In this case, it is believed that the wavelength region where the resonance phenomenon that allows an increase in the amount of reflection or absorption of s-polarized light increases, whereby the wavelength region where the polarization contrast ratio is improved is further increased.

As described above, the basic idea in the third embodiment is that the resonance phenomenon that allows an increase in the amount of reflection or absorption of s-polarized light is allowed to occur over a still widened wavelength range by further lowering the Q value as compared with the Q value in the second embodiment described above to increase the wavelength range within the half width HW3. In the following sections, a description will be made of the configuration of the split wire element in the third embodiment that realizes the basic idea.

<Configuration of Split Wire Element in Third Embodiment>

Figure 40:
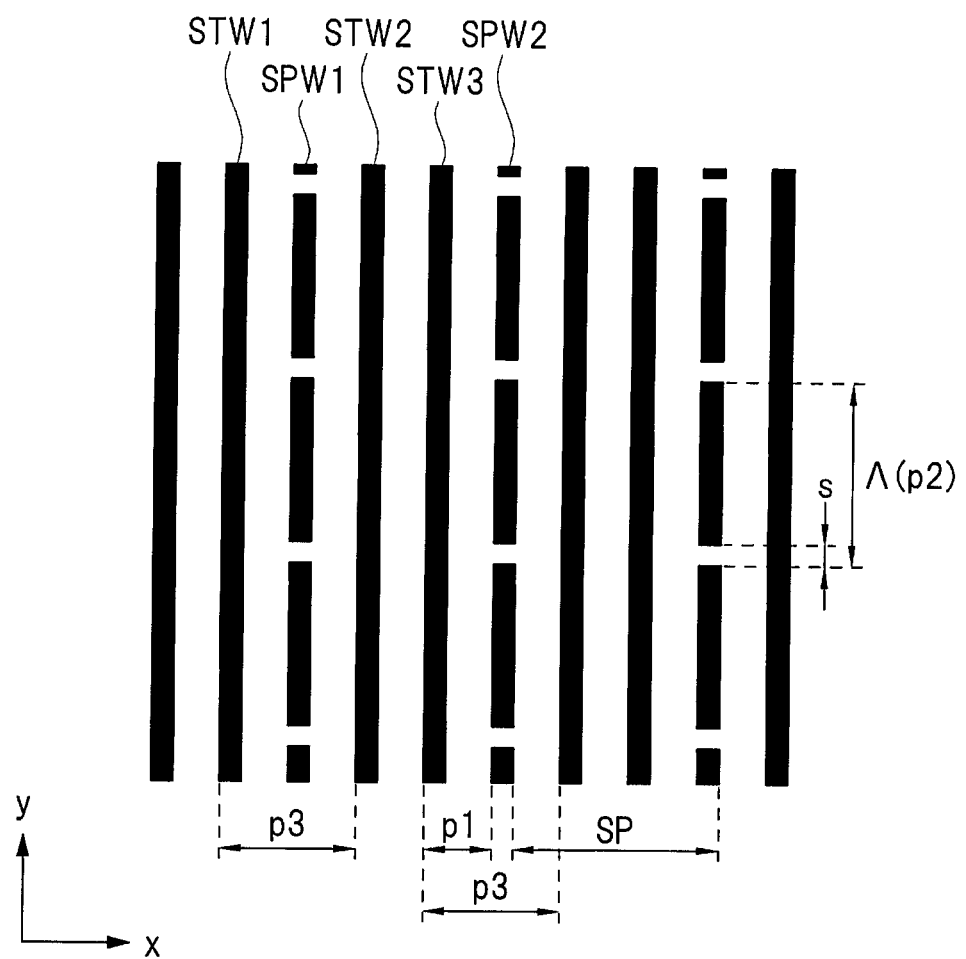
FIG. 40 is a plan view showing the configuration of a split wire element in a third embodiment.

FIG. 40 is a plan view showing the configuration of the split wire element in the third embodiment. In the split wire element in the third embodiment, two straight wires STW2 and STW3 are so disposed that they are sandwiched between a split wire SPW1 and a split wire SPW2, each of which has gaps s periodically formed in the y direction, as shown in FIG. 40. In the thus configured split wire element in the third embodiment, the structural period includes a period p1 between the split wire SPW1 and a straight wire STW1 adjacent to each other, a period Λ between the gaps s in the y direction, and a period p3 (=2×p1) between a straight wire STW1 and the straight wire STW2, which sandwich gaps s. Further, a skip period SP (=3×p1) between the split wire SPW1 and the split wire SPW2 is also present in the third embodiment.

In this configuration, the period Λ is greater than or equal to $\lambda/n$, where λ represents the wavelength of an incident electromagnetic wave and n represents the refractive index of the substrate. Further, the period p1 in the x direction is smaller than $\lambda/n$, whereas the period p3 in the x direction is greater than $\lambda/n$.

The third embodiment is characterized in that the two straight wires STW2 and STW3 are so disposed that they are sandwiched between the split wire SPW1 and the split wire SPW2. As a result, in the split wire element in the third embodiment, the number of straight wires sandwiched between split wires is greater than the number in the split wire element in the second embodiment described above.

It is believed as described in the above second embodiment that the more the number of split wires that affect the resonance phenomenon, the greater the Q value in the resonance phenomenon. That is, in the split wire element in the third embodiment, in which the number of straight wires sandwiched between a pair of split wires is greater than the number in the second embodiment described above, the number of split wires that affect the resonance phenomenon substantially decreases. As a result, according to the split wire element in the third embodiment, the Q value in the resonance phenomenon can be further lowered than in the second embodiment described above. This means that the half width HW3 increases, as described with reference to FIGS. 39A and 39B, whereby the wavelength region where the resonance phenomenon occurs can be increased. That is, the configuration of the split wire element in the third embodiment can provide an excellent polarization contrast ratio over a wide wavelength range in consideration of obliquely incident light. A description will be made of results of a simulation that supports the advantageous effect described above.

<Dependence of Split Wire Element on Wavelength in Blue Wavelength Band>

Figure 41A:
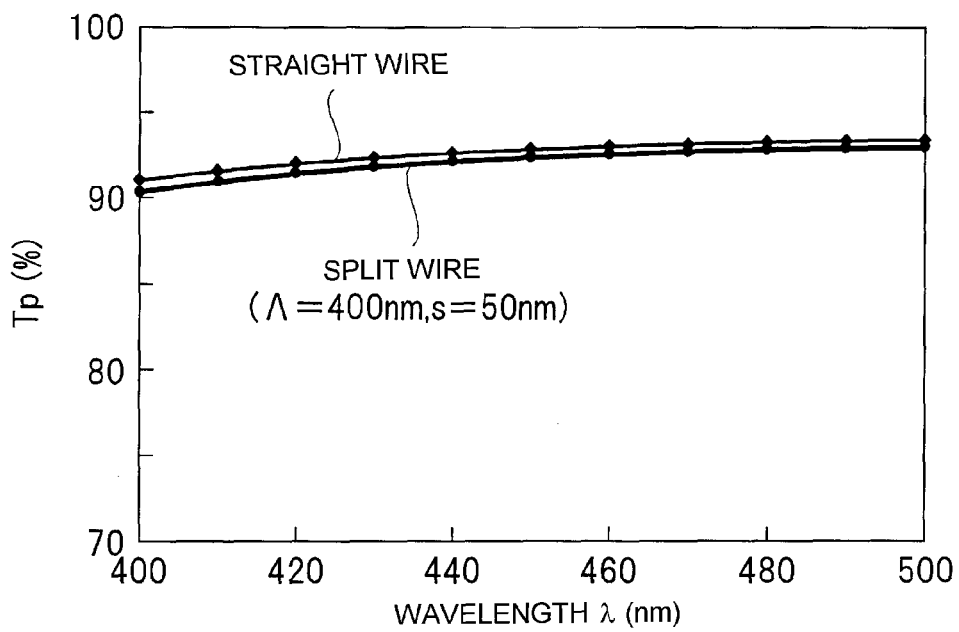
FIG. 41A shows graphs illustrating the relationship between the wavelength of incident light and the transmittance for p-polarized light.
Figure 41B:
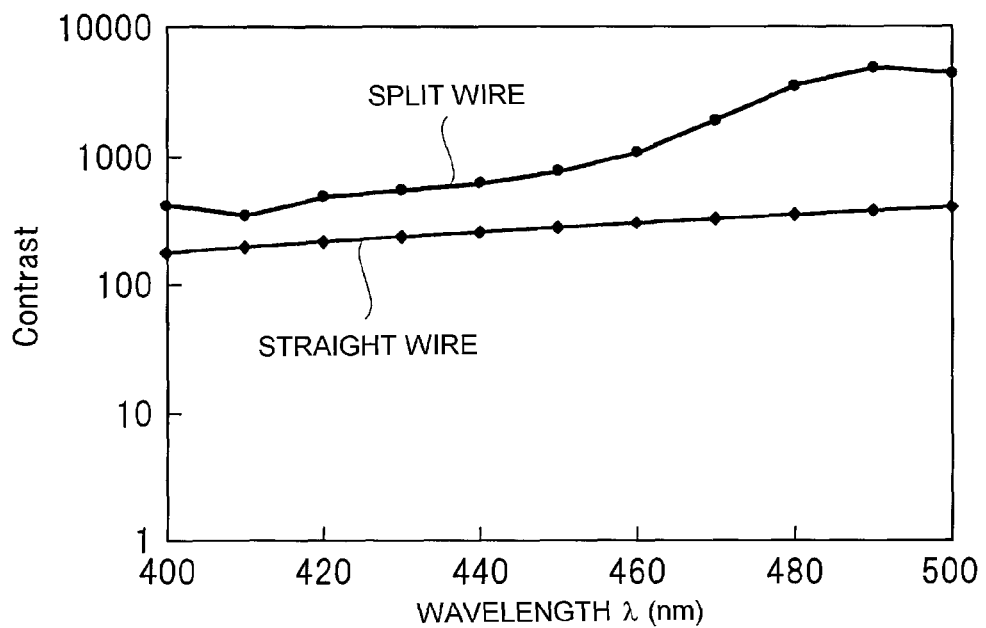
FIG. 41B shows graphs illustrating the relationship between the wavelength of the incident light and the polarization contrast ratio.

FIGS. 41A and 41B show simulation results illustrating the dependence of the split wire element in the third embodiment on the wavelength in the blue wavelength band. The results are obtained assuming that light is incident on the split wire element in the direction perpendicular thereto. Parameters necessary for the simulation are set as follows: The period p1 in the x direction between a split wire and a straight wire adjacent to each other is 135 nm; the width w of the split wires and the straight wires is 45 nm; the height h of the split wires and the straight wires is 130 nm; the period Λ in the y direction is 400 nm; and the size of the gaps s is 50 nm. FIGS. 41A and 41B also show results of the simulation on a wire-grid element formed of straight wires for comparison purposes.

FIG. 41A shows graphs illustrating the relationship between the wavelength of the incident light and the transmittance for p-polarized light. FIG. 41A shows that Tp of the split wire element in the third embodiment substantially agrees with Tp of the wire-grid element.

FIG. 41B shows graphs illustrating the relationship between the wavelength of the incident light and the polarization contrast ratio. FIG. 41B shows that the polarization contrast ratio of the split wire element in the third embodiment is greater than that of the wire-grid element formed of straight wires over the entire blue wavelength band.

<Wavelength Dependence for Obliquely Incident Light>

A description will subsequently be made of wavelength dependence of the split wire element in the third embodiment on which incident light is obliquely incident. The description will be specifically made, for example, of a case where the incident light is inclined toward the x direction by 20 degrees ($\theta x=20°$).

Figure 42A:
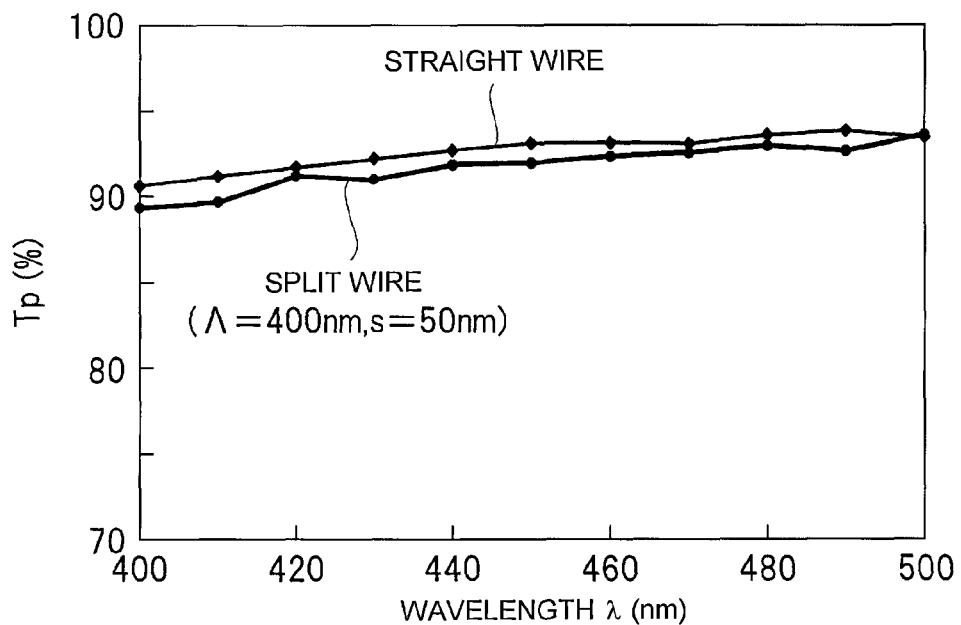
FIG. 42A shows graphs illustrating the relationship between the wavelength of the incident light and the transmittance for p-polarized light.
Figure 42B:
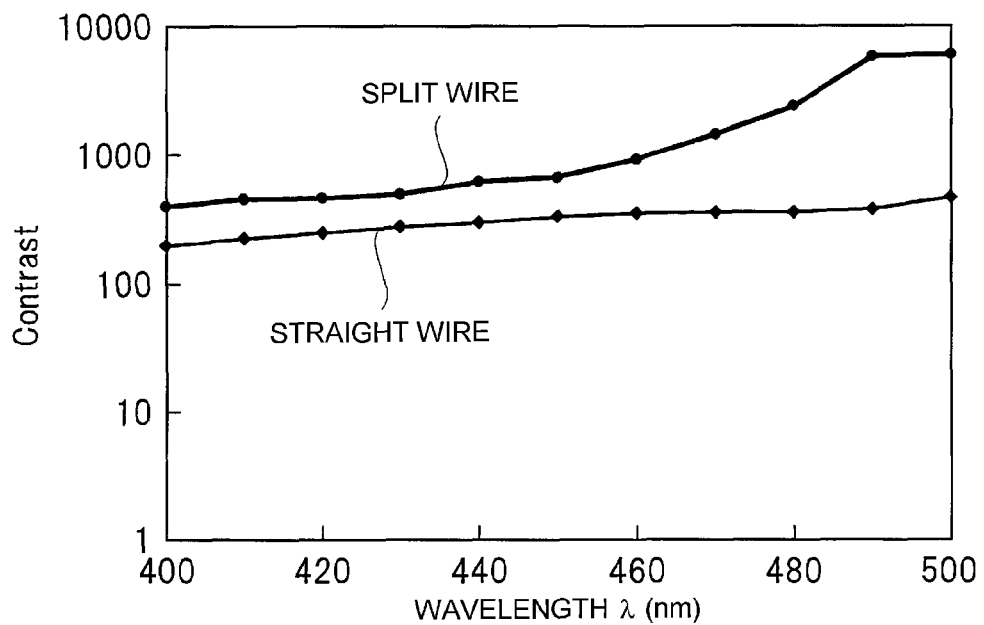
FIG. 42B shows graphs illustrating the relationship between the wavelength of the incident light and the polarization contrast ratio.

FIGS. 42A and 42B show simulation results illustrating the dependence of the split wire element in the third embodiment on the wavelength in the blue wavelength band. FIG. 42A shows graphs illustrating the relationship between the wavelength of the incident light and the transmittance for p-polarized light. FIG. 42A shows that Tp of the split wire element in the third embodiment substantially agrees with Tp of the wire-grid element even when the incident light is inclined toward the x direction by 20 degrees.

FIG. 42B shows graphs illustrating the relationship between the wavelength of the incident light and the polarization contrast ratio. FIG. 42B shows that the polarization contrast ratio of the split wire element in the third embodiment is greater than that of the wire-grid element formed of straight wires over the entire blue wavelength band.

A description will next be made of a case where the incident light is inclined toward the y direction by 20 degree ($\theta y=20°$).

Figure 43A:
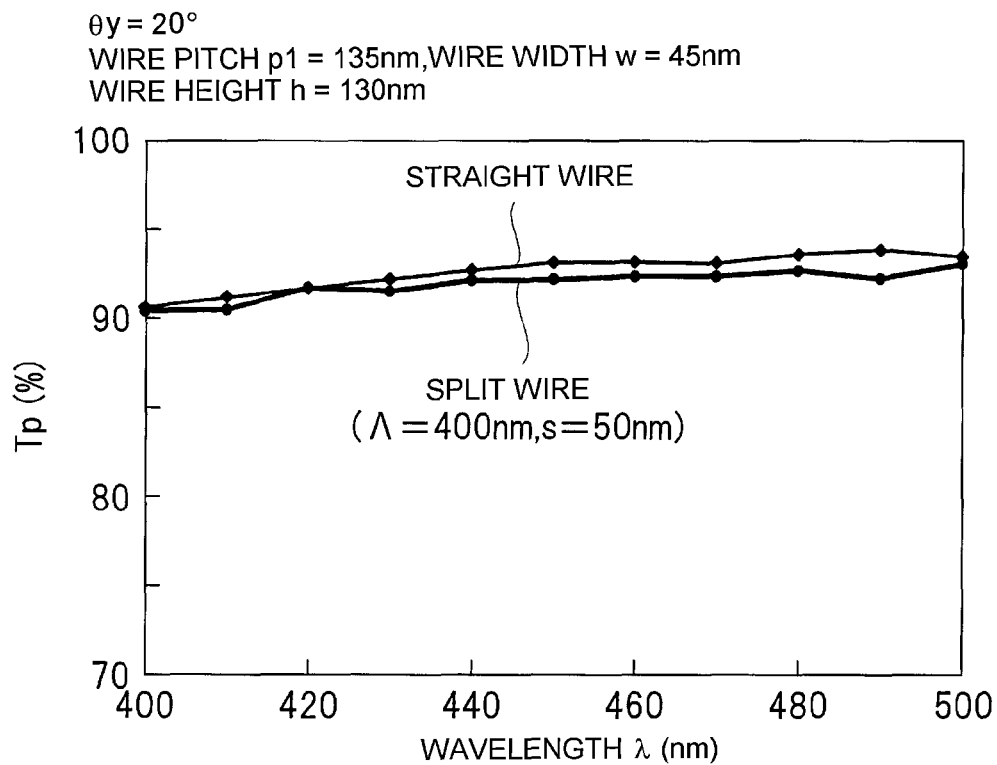
FIG. 43A shows graphs illustrating the relationship between the wavelength of the incident light and the transmittance for p-polarized light.
Figure 43B:
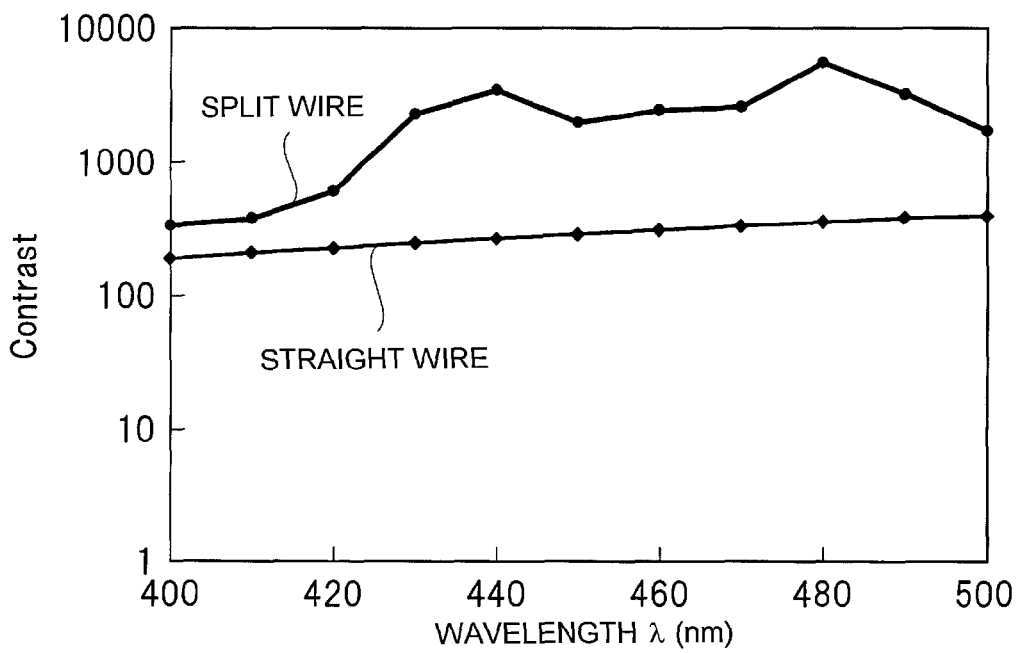
FIG. 43B shows graphs illustrating the relationship between the wavelength of the incident light and the polarization contrast ratio.

FIGS. 43A and 43B show simulation results illustrating the dependence of the split wire element in the third embodiment on the wavelength in the blue wavelength band. FIG. 43A shows graphs illustrating the relationship between the wavelength of the incident light and the transmittance for p-polarized light. FIG. 43A shows that Tp of the split wire element in the third embodiment substantially agrees with Tp of the wire-grid element even when the incident light is inclined toward the y direction by 20 degrees.

FIG. 43B shows graphs illustrating the relationship between the wavelength of the incident light and the polarization contrast ratio. As shown in FIG. 43B, the split wire element in the third embodiment differs from the split wire element in the second embodiment described above in that the polarization contrast ratio of the split wire element is greater than that of the wire-grid element formed of straight wires over the entire blue wavelength band even when the incident light is inclined toward the y direction by 20 degrees. The split wire element in the third embodiment is thus improved as compared with the split wire element in the second embodiment described above in terms of optical characteristics according to an application.

Any of the split wire elements described above can provide a large polarization contrast ratio as compared with a wire-grid element by allowing a selective resonance effect to occur in response to s-polarized light as shown by using an equivalent circuit. Further, inserting a straight wire between split wires each having periodic gaps formed in the y direction to change the skip period in the x direction between the split wires allows control of the Q value in the resonance phenomenon, whereby the wavelength range, the angle of incidence, and the polarization contrast ratio can be designed in accordance with an application. In the following sections, a description will be made of a limitation of applicability of the method for controlling the Q value described above.

<Limitation of Applicability of Method for Controlling Q Value>

Consider now the skip period in the x direction between split wires each having periodic gaps formed in the y direction with one or more straight wires inserted between the split wires. The skip period in the x direction is expressed by $(n+1) \times p1$, where p1 represents the period between a split wire and a straight wire adjacent to each other and n represent the number of inserted straight wires. That is, when the number of straight wires inserted between split wires increases, the skip period increases. In this case, when the number of inserted straight wires increases and the skip period increases accordingly, diffracted light that passes through the substrate may occur depending on the skip period in some cases.

Figure 44:
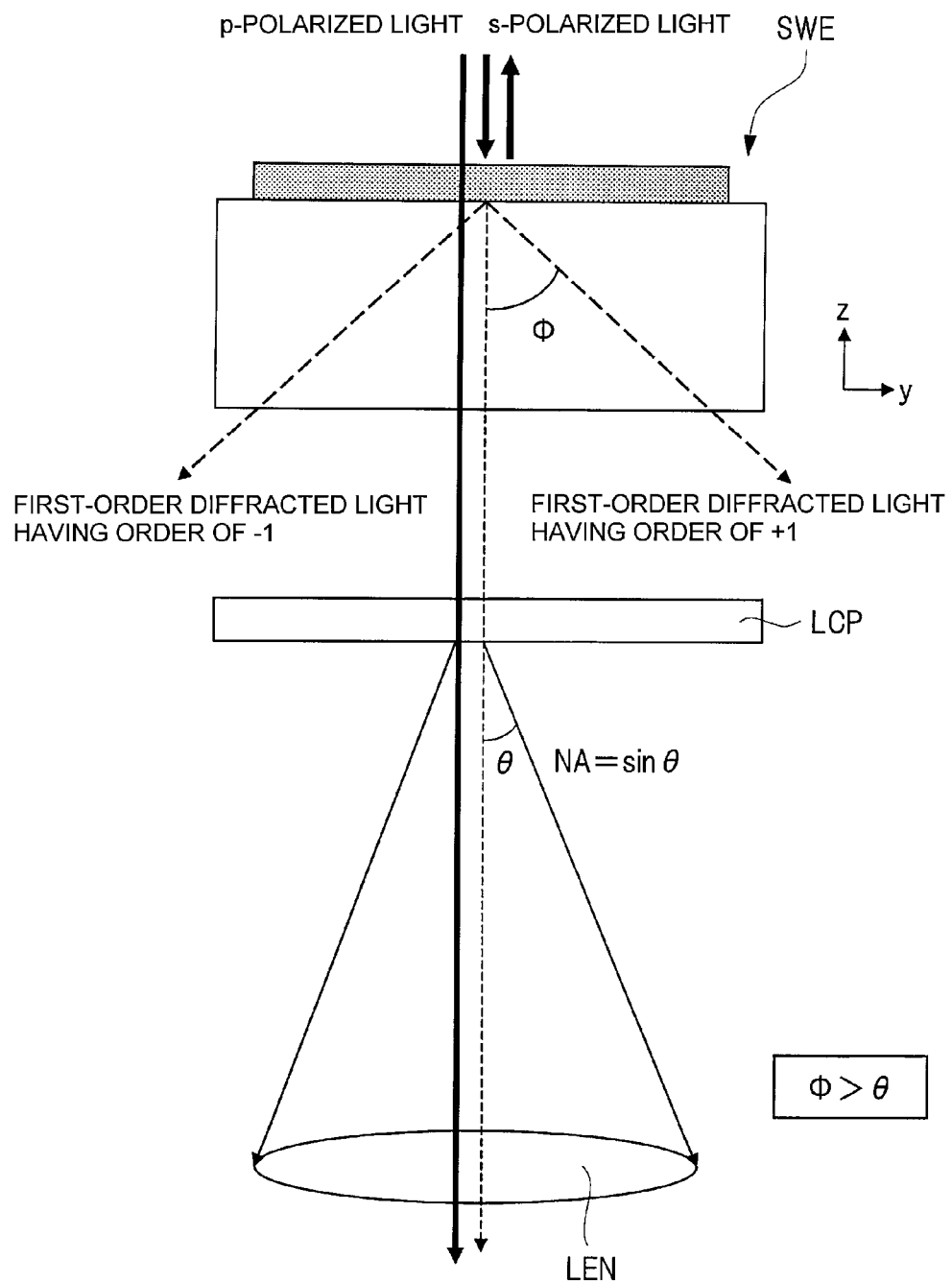
FIG. 44 diagrammatically shows an effect of diffracted light assuming that a split wire element is used in a liquid crystal projector.

FIG. 44 diagrammatically shows an effect of the diffracted light assuming that the split wire element is used in a liquid crystal projector. As shown in FIG. 44, when a split wire element SWE produces transmission diffracted light that is diffracted at an angle Φ, the angle of diffraction Φ is expressed by $\sin \Phi = m\lambda/SP$, where SP represents the skip period, λ represent the wavelength, and m represents an integer. In particular, transmission diffracted light that affects an optical apparatus is primarily first-order diffracted light having an order m of ±1.

In this description, for example, consider a case where light having passed through the split wire element SWE and a liquid crystal panel LCP is focused through a projection lens LEN as shown in FIG. 44. The case corresponds to a simplified configuration applied, for example, to a typical liquid crystal projector. In this case, when the numerical aperture of the projection lens LEN is NA ($=\sin \theta$) and the angle of diffraction Φ satisfies Φ>θ, the diffracted light will not be focused on a screen through the projection lens LEN.

That is, setting the skip period SP of the split wire element in such a way that the condition of $\Phi > \theta$ (NA=sin $\theta$) is satisfied prevents the diffracted light from being projected on the screen. It is typically believed that the value of $\theta$ ranges from about 10 to 20 degrees.

Figure 45:
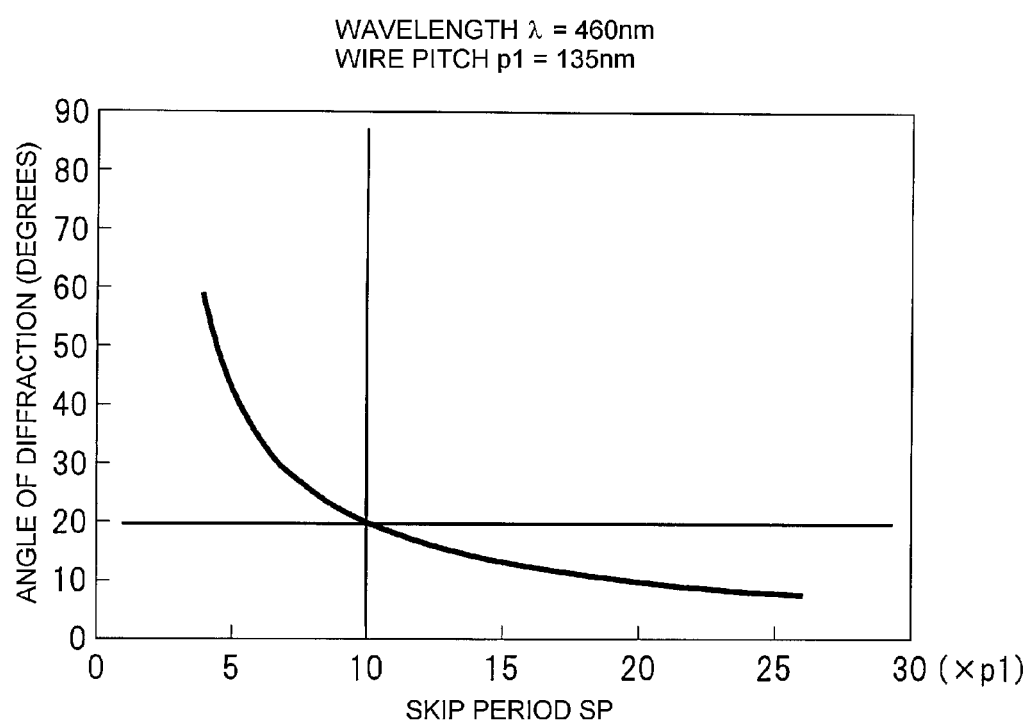
FIG. 45 shows a graph illustrating the relationship between a skip period according to which split wires are arranged and the angle of diffraction according to which perpendicularly incident light is diffracted.

FIG. 45 shows a graph illustrating the relationship between the skip period SP according to which split wires are arranged and the angle of diffraction according to which perpendicularly incident light is diffracted. When the wavelength $\lambda$ is 460 nm and the period p1 between a split wire and a straight wire adjacent to each other is 135 nm, the angle of diffraction is smaller than or equal to 20 degrees for a skip period SP greater than 10×p1, as shown in FIG. 45. Therefore, to control the Q value by using the skip period SP, the skip period SP is desirably set to a value smaller than or equal to 10×p1. Although the relationship described above changes with the structural period, the wavelength to be used, the numerical aperture of the projection lens, and other factors, following the procedure described above generally prevents the diffracted light from forming what is called a ghost image on the screen.

As described above, increasing the number of straight wires inserted between split wires can lower the Q value in the resonance phenomenon, whereby the wavelength region where the resonance phenomenon occurs can be increased. On the other hand, increasing the number of straight wires inserted between split wires increases the skip period between the split wires, resulting in generation of transmission diffracted light. When the skip period is too large, the angle of diffraction at which the transmission diffracted light is diffracted decreases, undesirably resulting in a ghost image formed on the screen due to the transmission diffracted light in some cases. The control method for lowering the Q value in the resonance phenomenon to a small value to increase the wavelength region where the resonance phenomenon occurs therefore needs to be performed under a condition that no ghost image due to transmission diffracted light is formed. It is thus understood that there is a limitation (restriction) of applicability of the method for controlling the Q value.

<Influence of Diffracted Light Produced by Obliquely Incident Light>

Figure 46:
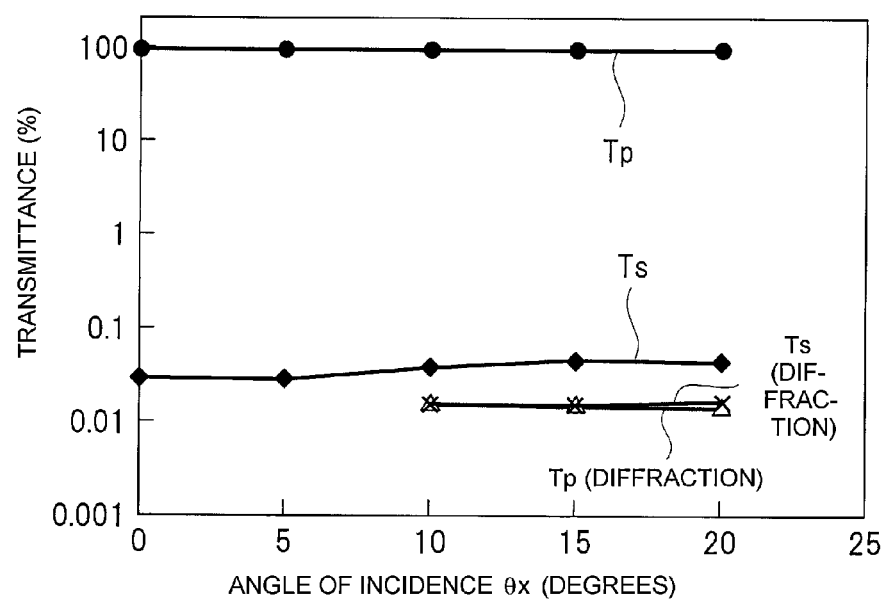
FIG. 46 shows simulation results illustrating the relationship between the angle of incidence of light incident on the split wire element in the third embodiment and the transmittance of the split wire element at which it transmits light including first-order transmission diffracted light.

A description will subsequently made of an influence of diffracted light produced by obliquely incident light. FIG. 46 shows simulation results illustrating the relationship between the angle of incidence $\theta x$ of light incident on the split wire element in the third embodiment and the transmittance of the split wire element at which it transmits light including first-order transmission diffracted light. In FIG. 46, Tp represents the transmittance for p-polarized light, and Ts represents the transmittance for s-polarized light. Further, Tp (diffraction) represents the transmittance for p-polarized, first-order transmission diffracted light, and Ts (diffraction) represents the transmittance for s-polarized, first-order transmission diffracted light. The results shown in FIG. 46 are obtained assuming that the wavelength $\lambda$ of the incident light is 460 nm.

As shown in FIG. 46, the transmission diffracted light that passes through the substrate is produced when the angle of incidence $\theta x$ is greater than or equal to 10 degrees. In other words, when the angle of incidence $\theta x$ is smaller than 10 degrees, no transmission diffracted light is produced.

As shown in FIG. 46, the transmittance for the transmission diffracted light (Tp (diffraction), Ts (diffraction)) is about 0.015%, which is about one-third the transmittance for s-polarized light and gives a contrast ratio of about 10,000 with respect to the transmittance for p-polarized light. Based on these values, the influence of the transmission diffracted light can be substantially ignored in the split wire element in the third embodiment.

The split wire elements according to the embodiments of the invention have been described above. The values shown in the first to third embodiments are not presented in a limited sense. For example, the structural period can be adjusted to change the corresponding wavelength region, or a metal material other than aluminum can be used. Further, any of the split wire elements can be covered with a dielectric material for improved environmental resistance. Moreover, the amount of reflection of s-polarized light can be reduced by forming an antireflection structure made of a transparent dielectric material or a light absorbent material on the upper side of any of the split wire elements, and the resultant split wire element can be used, for example, as a polarizing filter disposed downstream of a liquid crystal device in a liquid crystal projector.

Fourth Embodiment

In a fourth embodiment, a description will be made of an optical apparatus that uses any of the split wire elements in the above first to third embodiments with reference to the drawings. The fourth embodiment will be described with reference particularly to, among a variety of optical apparatus, a liquid crystal projector, which is an image projection apparatus.

<Configuration of Liquid Crystal Projector>

Figure 47:
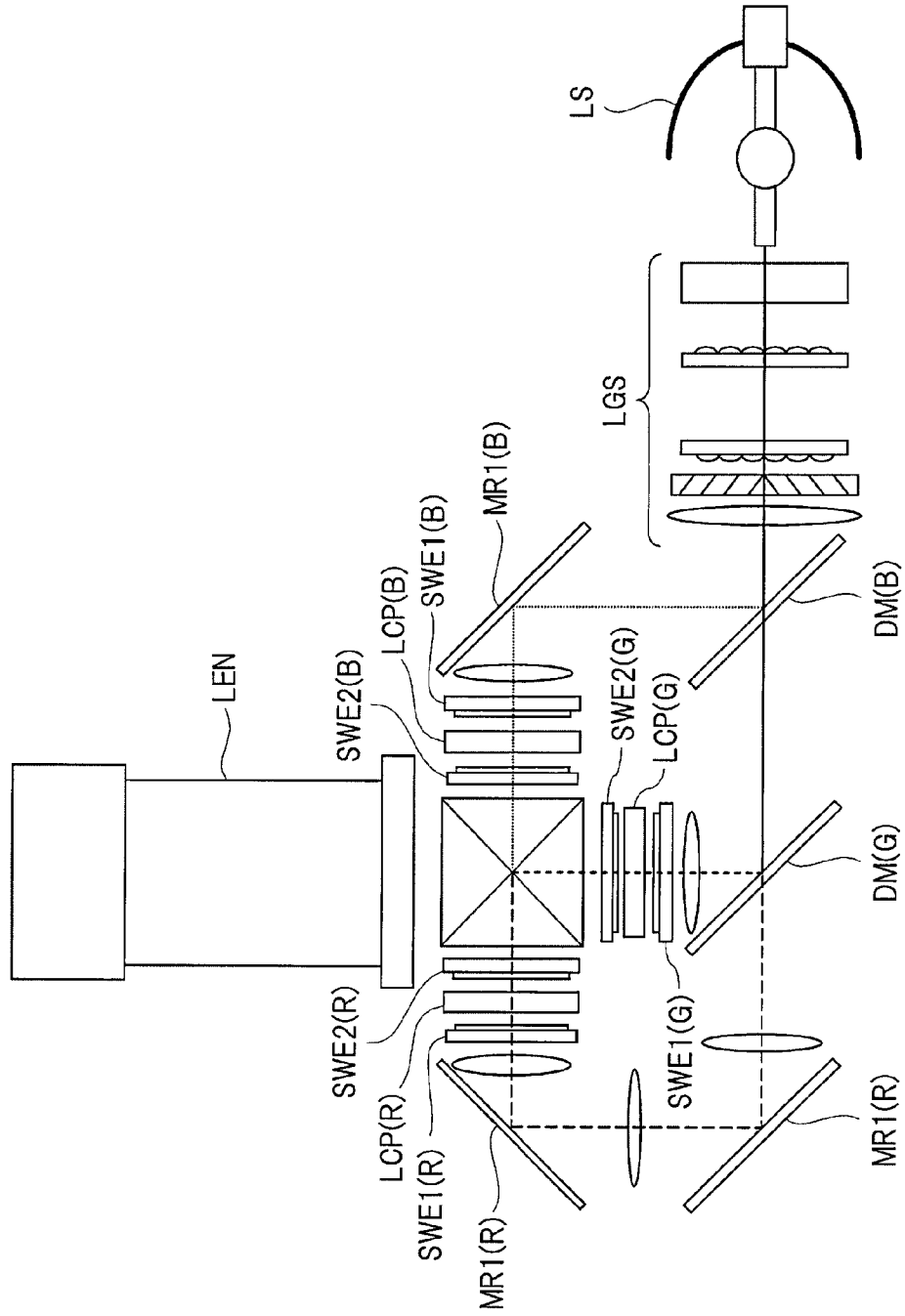
FIG. 47 is a diagrammatic view showing the optical system of a liquid crystal projector in a fourth embodiment.

FIG. 47 is a diagrammatic view showing the optical system of the liquid crystal projector in the fourth embodiment. In FIG. 47, the liquid crystal projector in the fourth embodiment includes a light source LS, a light guide system LGS, dichroic mirrors DM(B) and DM(G), reflection mirrors MR1(R), MR1(B) and MR2(R), split wire elements SWE1(B), SWE1(G), SWE1(R), SWE2(B), SWE2(G), and SWE2(R), liquid crystal panels LCP(B), LCP(G), and LCP(R), and a projection lens LEN.

The light source LS is formed, for example, of a halogen lamp and emits white light containing blue light, green light, and red light. The light guide system homogenizes the distribution of the light emitted from the light source LS, collimates the light, and otherwise processes the light.

The dichroic mirror DM(B) reflects light of a wavelength corresponding to the blue light and transmits the other light, the green light and the red light. Similarly, the dichroic mirror DM(G) reflects light of a wavelength corresponding to the green light and transmits the other light or the red light. The reflection mirror MR1(R) reflects the red light.

The split wire elements SWE1(B) and SWE2(B) receive the blue light and selectively transmit specific polarized light, and the split wire elements SWE1(G) and SWE2(G) receive the green light and selectively transmit specific polarized light. Further, the split wire elements SWE1(R) and SWE2(R) receive the red light and selectively transmit specific polarized light.

Specifically, each of the split wire elements SWE1(B), SWE1(G), SWE1(R), SWE2(B), SWE2(G), and SWE2(R) is any of the split wire elements described in the above first to third embodiments.

The reflection mirror MR1(B) reflects the blue light, and the reflection mirrors MR1(R) and MR2(R) reflect the red light.

The liquid crystal panel LCP(B) receives the polarized light having emitted out of the split wire element for blue light SWE1(B) and changes the polarization direction of the polarized light in accordance with image information. Similarly, the liquid crystal panel LCP(G) receives the polarized light having emitted out of the split wire element for green light SWE1(G) and changes the polarization direction of the polarized light in accordance with image information, and the liquid crystal panel LCP(R) receives the polarized light having emitted out of the split wire element for red light SWE1(R) and changes the polarization direction of the polarized light in accordance with image information. The liquid crystal panels LCP(B), LCP(G), and LCP(R) are electrically connected to a control circuit (not shown) that controls the liquid crystal panels, and a voltage applied to each of the liquid crystal panels is controlled based on a control signal from the control circuit. The projection lens LEN is a lens through which an image is projected.

<Operation of Liquid Crystal Projector>

The liquid crystal projector in the fourth embodiment is configured as described above, and the operation of the liquid crystal projector will be described below. First, the light source LS, which is formed, for example, of a halogen lamp, emits white light containing blue light, green light, and red light, as shown in FIG. 47. The white light emitted from the light source LS is incident on the light guide system LGS, which homogenizes the optical distribution of the white light, collimates the white light, and otherwise processes the white light. The white light having emitted out of the light guide system LGS is then first incident on the dichroic mirror DM(B). The dichroic mirror DM(B) reflects only the blue light contained in the white light and transmits the green light and the red light.

The green light and the red light having passed through the dichroic mirror DM(B) is incident on the dichroic mirror DM(G). The dichroic mirror DM(G) reflects only the green light and transmits the red light. The blue light, the green light, and the red light can thus be separated from the white light.

The separated blue light is subsequently incident on the split wire element SWE1(B) via the reflection mirror MR1 (B), and the split wire element SWE1(B) selectively transmits specific polarized light contained in the blue light. The selectively transmitted polarized light passes through the liquid crystal panel LCP(B) and then emits out of the split wire element SWE2(B). In the configuration described above, the liquid crystal panel LCP(B) controls the polarization direction of the polarized light by controlling the orientation of liquid crystal molecules based on the control signal.

Similarly, the separated green light is incident on the split wire element SWE1(G), which selectively transmits specific polarized light contained in the green light. The selectively transmitted polarized light is then incident on the liquid crystal panel LCP(G), passes therethrough, and then emits out of the split wire element SWE2(G). The liquid crystal panel LCP(G) also controls the polarization direction of the polarized light.

Further, the separated red light is incident on the split wire element SWE1(R) via the reflection mirrors MR1(R) and MR2(R), and the split wire element SWE1(R) selectively transmits specific polarized light contained in the red light. The selectively transmitted polarized light passes through the liquid crystal panel LCP(R) and then exits out of the split wire element SWE2(R). The liquid crystal panel LCP(R) also controls the polarization direction of the polarized light.

Thereafter, the polarized light having emitted out of the split wire element SWE2(B) (blue light), the polarized light having emitted out of the split wire element SWE2(G) (green light), and the polarized light having emitted out of the split wire element SWE2(R) (red light) are combined with one another, and the combined light is projected through the projection lens LEN on a screen (not shown). The liquid crystal projector in the fourth embodiment can thus projects an image.

According to the fourth embodiment, since the split wire elements are used in place of wire-grid elements of related art, a liquid crystal projector having an improved contrast ratio can be achieved. In other words, according to the fourth embodiment, the image quality of the liquid crystal projector can be improved.

The invention attained by the present inventor has been specifically described based on embodiments of the invention, but the invention is not limited to the embodiments described above, and a variety of changes can be, of course, made thereto to the extent that the changes do not depart from the substance of the invention.

For example, the above embodiments have been described with reference to an optical element and an optical apparatus that support visible light, near infrared light and light therebetween, but the light to be used is not limited thereto. The technical idea of the invention is also applicable to any electromagnetic wave descried by Maxwell's equation. Specifically, a 77-GHz wireless device uses an electromagnetic wave having a wavelength of about 4 mm, and a split wire element can, for example, be used as an optical part that handles the electromagnetic wave.

The invention attained by the present inventor has been specifically described based on embodiments of the invention, but the invention is not limited to the embodiments described above, and a variety of changes can, of course, be made thereto to the extent that the changes do not depart from the substance of the invention.

What is claimed is:

1. An optical element that functions as a polarizing filter, the optical element comprising:
   (a) a substrate transparent to an electromagnetic wave incident thereon; and
   (b) a plurality of metal wires formed on a principal surface of the substrate, arranged at first period intervals in a first direction, and extend in a second direction perpendicular to the first direction,
   wherein among the plurality of metal wires, at least part of the metal wires has a plurality of gaps formed at second period intervals in the second direction and extending to the substrate, and
   the second period interval between the plurality of gaps is greater than or equal to $\lambda/n$, where $\lambda$ represents the wavelength of the electromagnetic wave and n represents the refractive index of the substrate;
   wherein each of the metal wires that have the plurality of gaps formed therein is called a split wire,
   each of the metal wires that do not have the plurality of gaps formed therein is called a straight wire, and
   the straight wire is disposed between a first split wire and a second split wire adjacent to the first split wire, the straight wire being formed of a single straight wire having a substantially similar length as the first split wire and the second split wire.

2. The optical element according to claim 1, wherein each of the plurality of metal wires has the plurality of gaps formed at the second period intervals in the second direction.

3. The optical element according to claim 2, wherein a first formation position in the second direction where each of the plurality of gaps is formed in a first metal wire, among the plurality of metal wires, and a second formation position in the second direction where each of the plurality of gaps is formed in a second metal wire adjacent to the first metal wire are formed are shifted from each other.

4. The optical element according to claim 3,
wherein a third metal wire is disposed on the opposite side of the second metal wire to the first metal wire, among the plurality of metal wires, in a position adjacent to the second metal wire, and
the first formation position in the second direction where each of the plurality of gaps is formed in the first metal wire coincides with a third formation position in the second direction where each of the plurality of gaps is formed in the third metal wire.

5. The optical element according to claim 4,
wherein a third period interval in the first direction between the first metal wire and the third metal is twice the first period interval.

6. The optical element according to claim 5,
wherein the third period interval is greater than $\lambda/n$.

7. The optical element according to claim 1,
wherein $1\% \leq s/\Lambda \leq 10\%$ is satisfied, where $\Lambda$ represents the second period interval and S represents the width of the plurality of gaps in the second direction.

8. The optical element according to claim 1,
wherein a third period interval in the first direction between the first split wire and the second split wire is twice the first period interval, and
the third period interval is greater than $\lambda/n$.

9. An optical element that functions as a polarizing filter, the optical element comprising:
   (a) a substrate transparent to an electromagnetic wave incident thereon; and
   (b) a plurality of metal wires formed on a principal surface of the substrate, arranged at first period intervals in a first direction, and extend in a second direction perpendicular to the first direction,
   wherein among the plurality of metal wires, at least part of the metal wires has a plurality of gaps formed at second period intervals in the second direction and extending to the substrate, and
   the second period interval between the plurality of gaps is greater than or equal to $\lambda/n$, where $\lambda$ represents the wavelength of the electromagnetic wave and n represents the refractive index of the substrate;
   wherein each of the metal wires that have the plurality of gaps formed therein is called a split wire,
   each of the metal wires that do not have the plurality of gaps formed therein is called a straight wire, and
   the straight wire is disposed between a first split wire and a second split wire adjacent to the first split wire, the straight wire being formed of a plurality of straight wires each having a substantially similar length as the first split wire and the second split wire.

10. The optical element according to claim 9,
wherein a third period interval between a first straight wire adjacent to the first split wire and a second straight wire on the opposite side of the first split wire to the first straight wire and adjacent to the first split wire is twice the first period interval, and
the third period interval is greater than $\lambda/n$.

11. The optical element according to claim 9,
wherein a skip period interval in the first direction between the first split wire and the second split wire is smaller than or equal to a value 10 times greater the first period interval.

12. The optical element according to claim 1,
wherein the first period interval is smaller than $\lambda/n$, and
the second period interval is greater than or equal $\lambda/n$ but smaller than or equal to $2\times\lambda/n$.

13. An optical apparatus comprising:
   (a) a light source;
   (b) a first polarizing element that receives light emitted from the light source and selectively transmits specific polarized out of the received light;
   (c) a liquid crystal panel that receives the polarized light having emitted out of the first polarizing element and changes the polarization direction of the polarized light;
   (d) a second polarizing element that receives the polarized light having the polarization direction changed when the polarized light passes through the liquid crystal panel; and
   (e) a projection lens that receives the polarized light having emitted out of the second polarizing element and projects the polarized light to form an image,
   wherein each of the first polarizing element and the second polarizing element is an optical element that functions as a polarizing filter and includes,
   a substrate transparent to an electromagnetic wave incident thereon, and
   a plurality of metal wires formed on a principal surface of the substrate, arranged at first period intervals in a first direction, and extend in a second direction perpendicular to the first direction,
   among the plurality of metal wires, at least part of the metal wires has a plurality of gaps formed at second period intervals in the second direction, and
   the second period interval between the plurality of gaps is greater than or equal to $\lambda/n$, where $\lambda$, represents the wavelength of the electromagnetic wave and n represents the refractive index of the substrate.

* * * * *